United States Patent
Hattrup et al.

(10) Patent No.: US 10,832,015 B2
(45) Date of Patent: *Nov. 10, 2020

(54) ON-THE-FLY MARKING SYSTEMS FOR CONSUMER PACKAGED GOODS

(71) Applicant: Fastechnology Group, LLC, Glen Carbon, IL (US)

(72) Inventors: Joseph A. Hattrup, Plano, TX (US); Ralph P. French, Maryville, IL (US); Nathaniel Evert Lawson, Collinsville, IL (US); Gregory J. Allen, O'Fallon, IL (US)

(73) Assignee: Joseph A. Hattrup Trust dated July 16, 1996, as Amended, Plano, TX (US)

( * ) Notice: Subject to any disclaimer, the term of this patent is extended or adjusted under 35 U.S.C. 154(b) by 516 days.

This patent is subject to a terminal disclaimer.

(21) Appl. No.: 15/692,878

(22) Filed: Aug. 31, 2017

(65) Prior Publication Data
US 2018/0025185 A1 Jan. 25, 2018

Related U.S. Application Data

(63) Continuation-in-part of application No. 15/252,469, filed on Aug. 31, 2016, now Pat. No. 10,685,191, and
(Continued)

(51) Int. Cl.
| | |
|---|---|
| *G06Q 10/00* | (2012.01) |
| *G06K 1/12* | (2006.01) |
| *G06K 15/02* | (2006.01) |
| *G06Q 10/08* | (2012.01) |
| *G06Q 30/02* | (2012.01) |
| *G06Q 50/28* | (2012.01) |

(Continued)

(52) U.S. Cl.
CPC ........ *G06K 1/121* (2013.01); *G06F 16/9554* (2019.01); *G06K 15/024* (2013.01); *G06K 15/1835* (2013.01); *G06K 15/1859* (2013.01); *G06K 19/06037* (2013.01); *G06Q 10/0833* (2013.01); *G06Q 30/02* (2013.01); *G06Q 50/28* (2013.01)

(58) Field of Classification Search
CPC combination set(s) only.
See application file for complete search history.

(56) References Cited

U.S. PATENT DOCUMENTS

| | | |
|---|---|---|
| 1,949,903 A | 3/1934 | Fales |
| 4,121,818 A | 10/1978 | Riley et al. |

(Continued)

OTHER PUBLICATIONS

Atwood, URL Shortening: Hashes in Practice (Aug. 21, 2007, https://blog.codinghorror.com/url-shortening-hashes-in-practice, pp. 1-4 (Year: 2007).*

(Continued)

*Primary Examiner* — Rutao Wu
*Assistant Examiner* — Scott M Ross
(74) *Attorney, Agent, or Firm* — Stinson LLP

(57) ABSTRACT

An on-the-fly package label printing system for a variety of packages containing a variety of products printed on each package of a web of successive packages a permanent record indicative of the product weight and product ingredients in the package. The system comprises a package handling device, a clock, and a printer system.

16 Claims, 43 Drawing Sheets

Related U.S. Application Data a continuation-in-part of application No. 14/700,409, filed on Apr. 30, 2015, now abandoned, said application No. 15/252,469 is a continuation of application No. 14/574,872, filed on Dec. 18, 2014, now Pat. No. 9,436,770, which is a continuation-in-part of application No. 14/202,982, filed on Mar. 10, 2014, now abandoned, and a continuation-in-part of application No. 13/417,593, filed on Mar. 12, 2012, now abandoned.

(60) Provisional application No. 62/381,661, filed on Aug. 31, 2016, provisional application No. 62/062,611, filed on Oct. 10, 2014, provisional application No. 61/987,029, filed on May 1, 2014, provisional application No. 61/944,939, filed on Feb. 26, 2014, provisional application No. 61/799,284, filed on Mar. 15, 2013, provisional application No. 61/558,533, filed on Nov. 11, 2011, provisional application No. 61/451,225, filed on Mar. 10, 2011.

(51) Int. Cl.
  *G06K 19/06* (2006.01)
  *G06F 16/955* (2019.01)

(56) References Cited

U.S. PATENT DOCUMENTS

| | | | |
|---|---|---|---|
| 4,796,180 A | 1/1989 | Riley | |
| 5,025,610 A | 6/1991 | Graushar | |
| 5,029,830 A | 7/1991 | Quadracci | |
| 5,039,075 A | 8/1991 | Mayer | |
| 5,114,128 A | 5/1992 | Harris, Jr. et al. | |
| 5,143,362 A | 9/1992 | Doane et al. | |
| 5,502,636 A | 3/1996 | Clarke | |
| 5,547,175 A | 8/1996 | Graushar et al. | |
| 5,950,401 A | 9/1999 | Blohm et al. | |
| 5,974,396 A | 10/1999 | Anderson et al. | |
| 5,978,773 A | 11/1999 | Hudetz et al. | |
| 5,988,620 A | 11/1999 | Graushar | |
| 6,167,326 A | 12/2000 | Graushar et al. | |
| 6,199,048 B1 | 3/2001 | Hudetz et al. | |
| 6,240,334 B1 | 5/2001 | Duke et al. | |
| 6,385,592 B1 | 5/2002 | Angles et al. | |
| 6,484,146 B2 | 11/2002 | Day et al. | |
| 6,594,642 B1 | 7/2003 | Lemchen | |
| 6,694,219 B2 | 2/2004 | Graushar et al. | |
| 6,842,604 B1 | 1/2005 | Cook et al. | |
| 7,047,207 B2 | 5/2006 | Stavrulov | |
| 7,096,088 B2 | 8/2006 | Graushar et al. | |
| 7,206,820 B1* | 4/2007 | Rhoads | G06Q 30/06 709/217 |
| 7,207,481 B2 | 4/2007 | Barenburg et al. | |
| 7,246,798 B2 | 7/2007 | Graushar et al. | |
| 7,249,067 B2 | 7/2007 | Doerksen et al. | |
| 7,278,094 B1 | 10/2007 | Dreyer et al. | |
| 7,304,677 B2 | 12/2007 | Keelan et al. | |
| 7,333,878 B2 | 2/2008 | Graushar et al. | |
| 7,337,127 B1 | 2/2008 | Smith et al. | |
| 7,383,209 B2 | 6/2008 | Hudetz et al. | |
| 7,614,546 B2 | 11/2009 | Grant et al. | |
| 7,715,041 B2 | 5/2010 | Henke et al. | |
| 7,765,126 B2 | 7/2010 | Hudetz et al. | |
| 7,766,240 B1 | 8/2010 | Grant | |
| 7,770,783 B2 | 8/2010 | Grant et al. | |
| 7,823,768 B2 | 11/2010 | Self et al. | |
| 7,909,239 B2 | 3/2011 | Grant et al. | |
| 7,992,772 B2 | 8/2011 | Grant et al. | |
| 3,045,753 A1 | 10/2011 | Adams et al. | |
| 8,121,338 B2 | 2/2012 | Clermont et al. | |
| 8,131,597 B2 | 3/2012 | Hudetz et al. | |
| 8,152,063 B1 | 4/2012 | Grant et al. | |
| 8,155,313 B2 | 4/2012 | Grant | |
| 8,196,827 B1 | 6/2012 | Grant | |
| 8,210,430 B1 | 7/2012 | Grant et al. | |
| 8,240,564 B2 | 8/2012 | Grant et al. | |
| 8,245,927 B2 | 8/2012 | Grant et al. | |
| 8,261,973 B2 | 9/2012 | Grant et al. | |
| 8,286,869 B1 | 10/2012 | Grant | |
| 8,300,806 B2 | 10/2012 | Grant | |
| 8,342,393 B2 | 1/2013 | Grant et al. | |
| 8,428,773 B1 | 4/2013 | Carr et al. | |
| 8,474,714 B1 | 7/2013 | Grant et al. | |
| 8,500,015 B2 | 8/2013 | Grant et al. | |
| 8,573,476 B2 | 11/2013 | Grant et al. | |
| 8,649,512 B2 | 2/2014 | Grant | |
| 8,708,221 B1* | 4/2014 | Sprague | G06Q 10/08 235/375 |
| 8,798,313 B2 | 8/2014 | Simske et al. | |
| 8,825,516 B2 | 9/2014 | Grant et al. | |
| 8,833,654 B1 | 9/2014 | Grant | |
| 2001/0023406 A1 | 9/2001 | Engel et al. | |
| 2001/0037624 A1 | 11/2001 | Graushar et al. | |
| 2002/0028321 A1 | 3/2002 | Feilen, Sr. et al. | |
| 2002/0040374 A1 | 4/2002 | Kent | |
| 2002/0046089 A1 | 4/2002 | Zorn | |
| 2002/0100253 A1 | 8/2002 | Graushar et al. | |
| 2002/0147635 A1 | 10/2002 | Lawson | |
| 2002/0191775 A1 | 12/2002 | Boies et al. | |
| 2004/0117728 A1 | 6/2004 | Gromer | |
| 2004/0133542 A1 | 7/2004 | Doerksen et al. | |
| 2004/0148053 A1 | 7/2004 | Graushar et al. | |
| 2004/0215480 A1* | 10/2004 | Kadaba | B07C 3/00 705/338 |
| 2004/0220855 A1* | 11/2004 | Carignan | B65C 9/1869 705/14.49 |
| 2004/0265095 A1 | 12/2004 | Blohm et al. | |
| 2005/0044025 A1 | 2/2005 | Tutty et al. | |
| 2005/0105134 A1 | 5/2005 | Moneypenny et al. | |
| 2006/0020578 A1* | 1/2006 | Hood | G06F 9/4493 |
| 2006/0064312 A1 | 3/2006 | Chandaria | |
| 2006/0173896 A1 | 8/2006 | Lyon et al. | |
| 2006/0255146 A1 | 11/2006 | Mase et al. | |
| 2007/0024907 A1 | 2/2007 | Henke et al. | |
| 2007/0050081 A1 | 3/2007 | Brown et al. | |
| 2007/0112460 A1 | 5/2007 | Kiselik | |
| 2007/0205258 A1 | 9/2007 | Self et al. | |
| 2007/0210164 A1 | 9/2007 | Conlon et al. | |
| 2007/0215685 A1 | 9/2007 | Self et al. | |
| 2008/0010115 A1 | 1/2008 | Ho et al. | |
| 2008/0010137 A1 | 1/2008 | Ho et al. | |
| 2008/0011841 A1 | 1/2008 | Self et al. | |
| 2008/0021582 A1 | 1/2008 | Graushar et al. | |
| 2008/0093788 A1 | 4/2008 | Graushar | |
| 2008/0131176 A1 | 6/2008 | Snyder | |
| 2008/0243608 A1 | 10/2008 | Chatow et al. | |
| 2008/0243614 A1 | 10/2008 | Tu et al. | |
| 2008/0258370 A1 | 10/2008 | Warmus | |
| 2008/0275761 A1 | 11/2008 | Seifer et al. | |
| 2009/0000440 A1 | 1/2009 | Graushar et al. | |
| 2009/0065568 A1 | 3/2009 | Grant et al. | |
| 2009/0112610 A1 | 4/2009 | Simons et al. | |
| 2009/0216660 A1 | 8/2009 | Westphal | |
| 2009/0228914 A1 | 9/2009 | Wong et al. | |
| 2009/0266735 A1 | 10/2009 | Moore | |
| 2009/0277815 A1 | 11/2009 | Kohl | |
| 2010/0049611 A1 | 2/2010 | Rojas et al. | |
| 2010/0049613 A1 | 2/2010 | Angles et al. | |
| 2010/0059917 A1 | 3/2010 | Graushar | |
| 2010/0188702 A1 | 7/2010 | Henke et al. | |
| 2011/0018253 A1 | 1/2011 | Birsztejn et al. | |
| 2011/0084127 A1 | 4/2011 | Grant | |
| 2011/0084129 A1 | 4/2011 | Grant | |
| 2011/0132986 A1 | 6/2011 | Shigeta | |
| 2011/0154626 A1 | 6/2011 | VanDenBogart | |
| 2011/0270681 A1 | 11/2011 | Outten et al. | |
| 2012/0059660 A1 | 3/2012 | Grant et al. | |
| 2012/0280042 A1 | 11/2012 | Grant et al. | |
| 2012/0298741 A1 | 11/2012 | Grant et al. | |
| 2014/0136291 A1 | 5/2014 | Bolene et al. | |
| 2014/0188666 A1 | 7/2014 | Grant et al. | |
| 2014/0266626 A1 | 9/2014 | Moulin et al. | |

(56) References Cited

U.S. PATENT DOCUMENTS

2014/0367295 A1   12/2014   Murray
2015/0066187 A1    3/2015   Berg et al.
2017/0109772 A1*  4/2017   Sundman ........... G06Q 30/0214

OTHER PUBLICATIONS

Quad/Graphics to Advance Co-Mail Capabilities with IntelliTrim; http://www.printingnews.com/online/printer.jsp?id=5412, Sep. 11, 2008 (Article posted on Jul. 8, 2008), 2 pages.
Introducing More Ways to Co-Mail Savings, Innovative People Driving Print, QuadGraphics, Date Unknown (circa 2008), 1 page.
Co-Mail Solutions, Increasing your presort savings and building better pallets, QuadGraphics, http://www.qg.com/services/mailing_and_distribution/comail_solutions.asp, Sep. 11, 2008, 2 pages.
Simple Samples Program, Frequently Asked Questions, Version 1, Dec. 6, 2012, 1 page.
Analysis Production Printing & Media, HP Launches "Global Product Authentication Service" InfoTrends Mar. 2013, 10 pages.
URL Shortening: Hashes in Practice, Jeff Atwood, Jun. 9, 2016, 21 pages, https://blogs.codinghorror.com/url-shortening-hashes-in-practice.

* cited by examiner

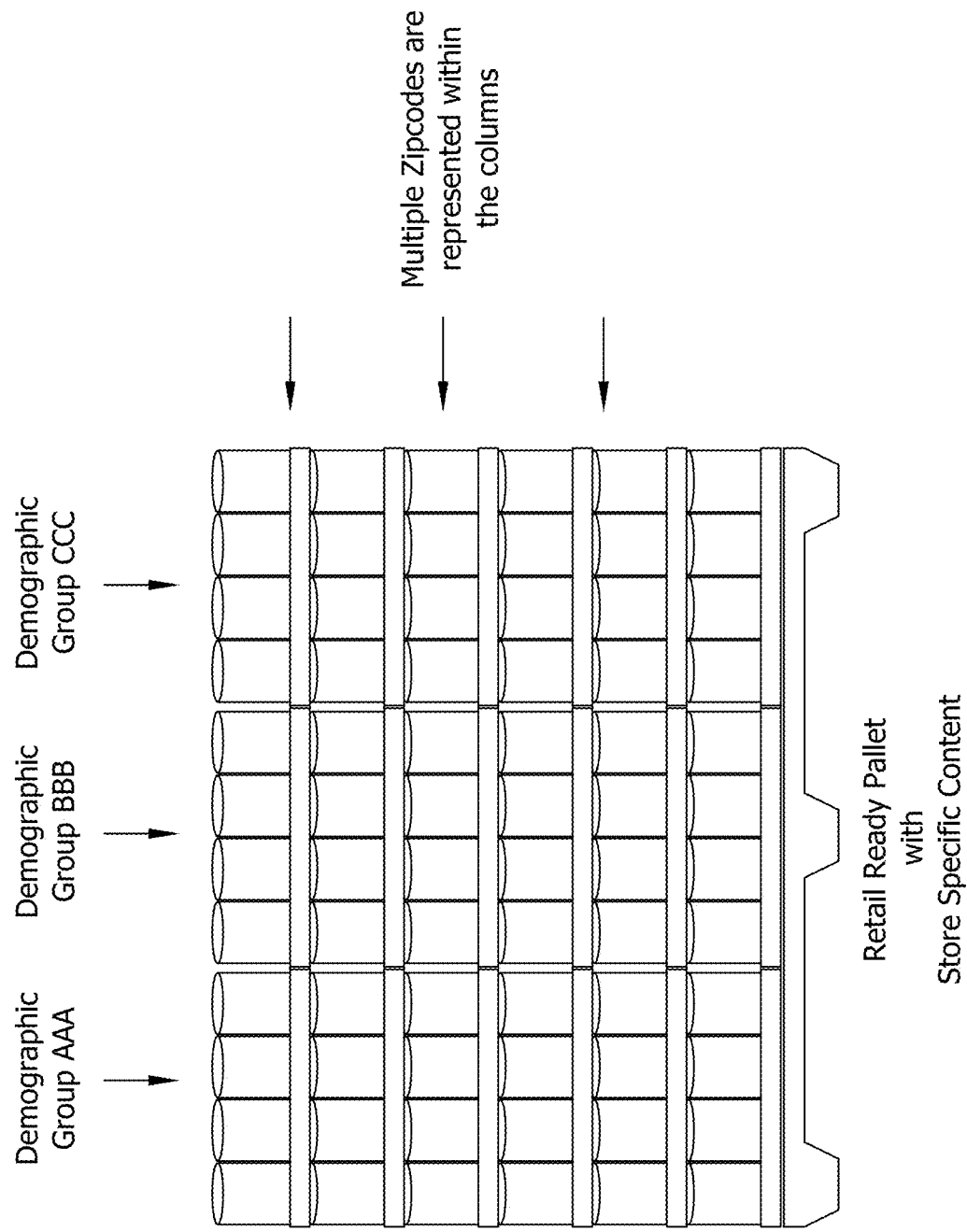

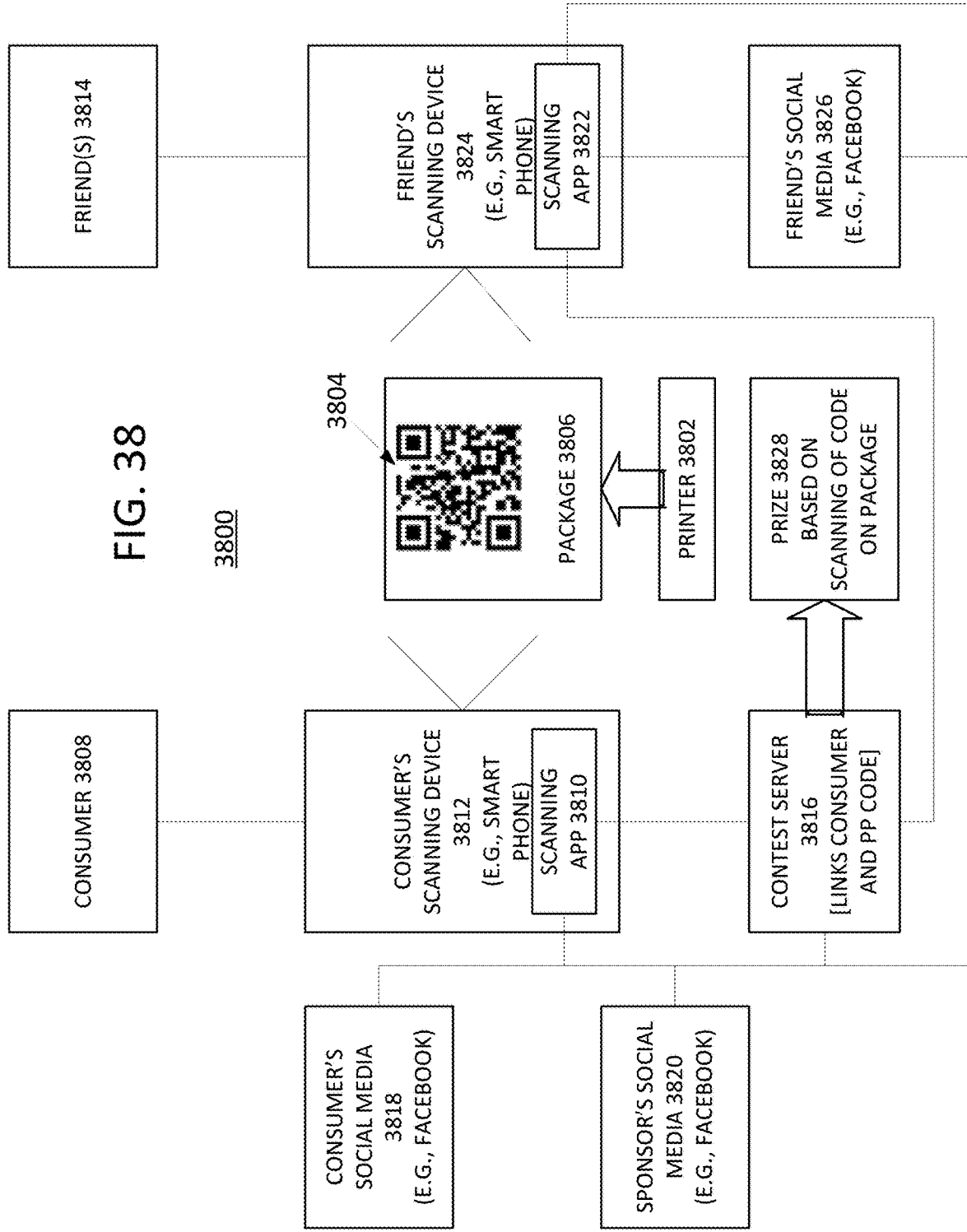

ON-THE-FLY MARKING SYSTEMS FOR CONSUMER PACKAGED GOODS

BACKGROUND OF THE INVENTION

The present invention generally relates to database driven systems and methods of manufacturing, marking (including labeling), packaging, distributing, tracking and/or collecting feedback of customized, individualized, personalized consumer products in-line during the actual packaging process, group, cartoning and/or eventual palletization. In particular, the present invention relates to on-the-fly systems and methods and immediate versioning systems and methods which individualize and/or personalize products and/or packaging for particular consumers in a particular market, targeted demographic, or locale for consumers with a particular affinity interest, or micro-demographic.

The invention relates to systems and methods for providing consumer packaged goods (CPG) product information and for providing convenient CPG product reordering.

There is need for consumers to easily and quickly obtain product information. In addition, there is a need for consumers to have the capability to quickly and efficient reorder products. Also, there is a need for consumers to have individualized product information for each particular package they purchase.

SUMMARY OF THE INVENTION

An on-the-fly package label printing system for a variety of packages containing a variety of products printed on each package of a web of successive packages a permanent record indicative of the product attributes in the package. In one form, the system comprises a package handling device, a clock, and a printer system.

Other objects and features will be in part apparent and in part pointed out hereinafter.

BRIEF DESCRIPTION OP THE DRAWINGS

FIGS. 4A and 4B are illustrations of embodiments of a route sequenced, customized pallet according to the invention.

FIG. 5 illustrates an embodiment with an applied scratch-off layer printed on packages.

Figure 6:
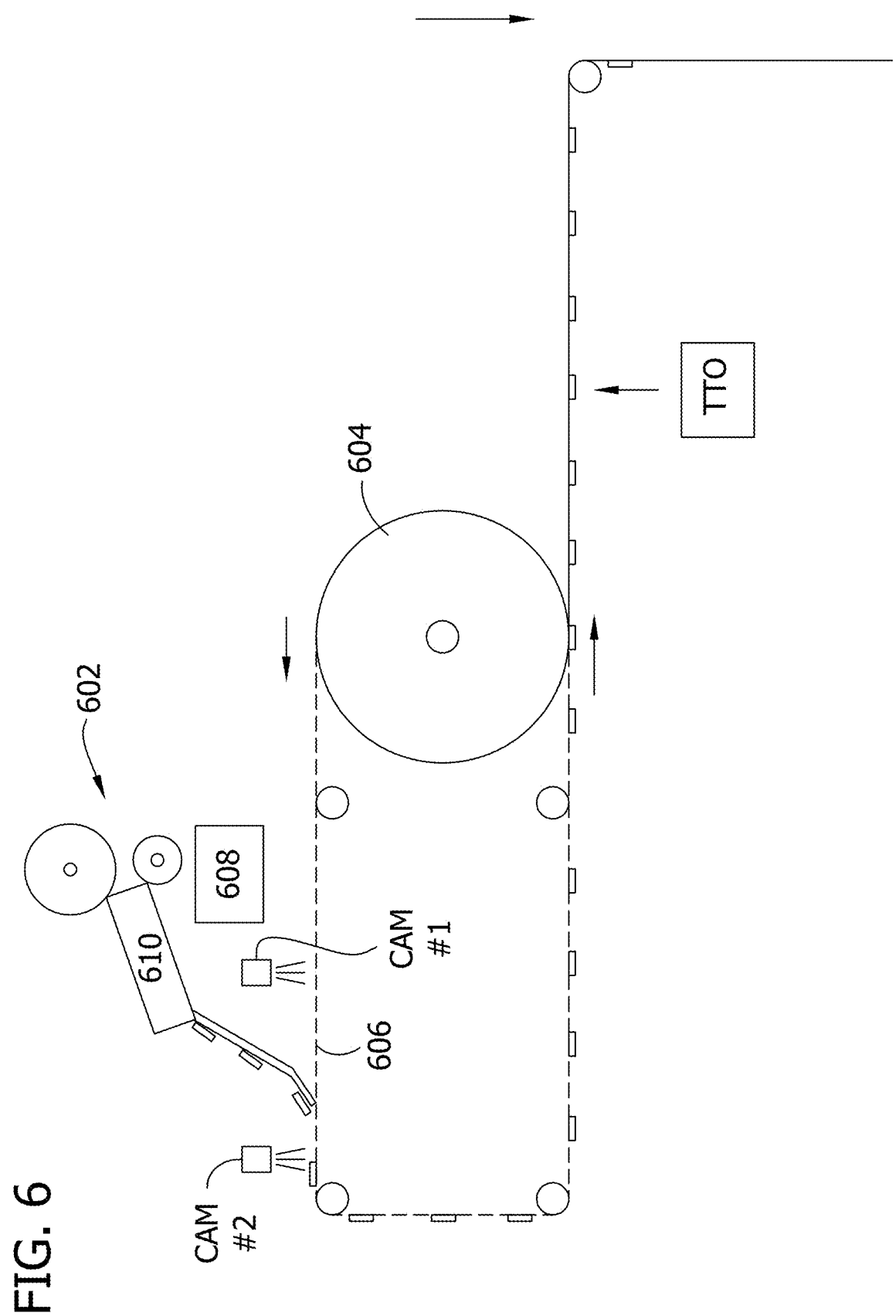

FIG. 6 is an illustration of one embodiment of the invention added to an existing packaging line, such as a form, fill and seal machine. In this embodiment, a mobile personalization module (MPM) is added to the existing packaging line to add a private label, gaming and/or targeted promotion or initiative to the packaging of products as the products are being manufactured. In particular, FIG. 6 illustrates an embodiment with an applied thermal transfer overprinting (TTO) layer applied to packaging on the fly as the packaging is being prepared to receive products.

Figure 7:
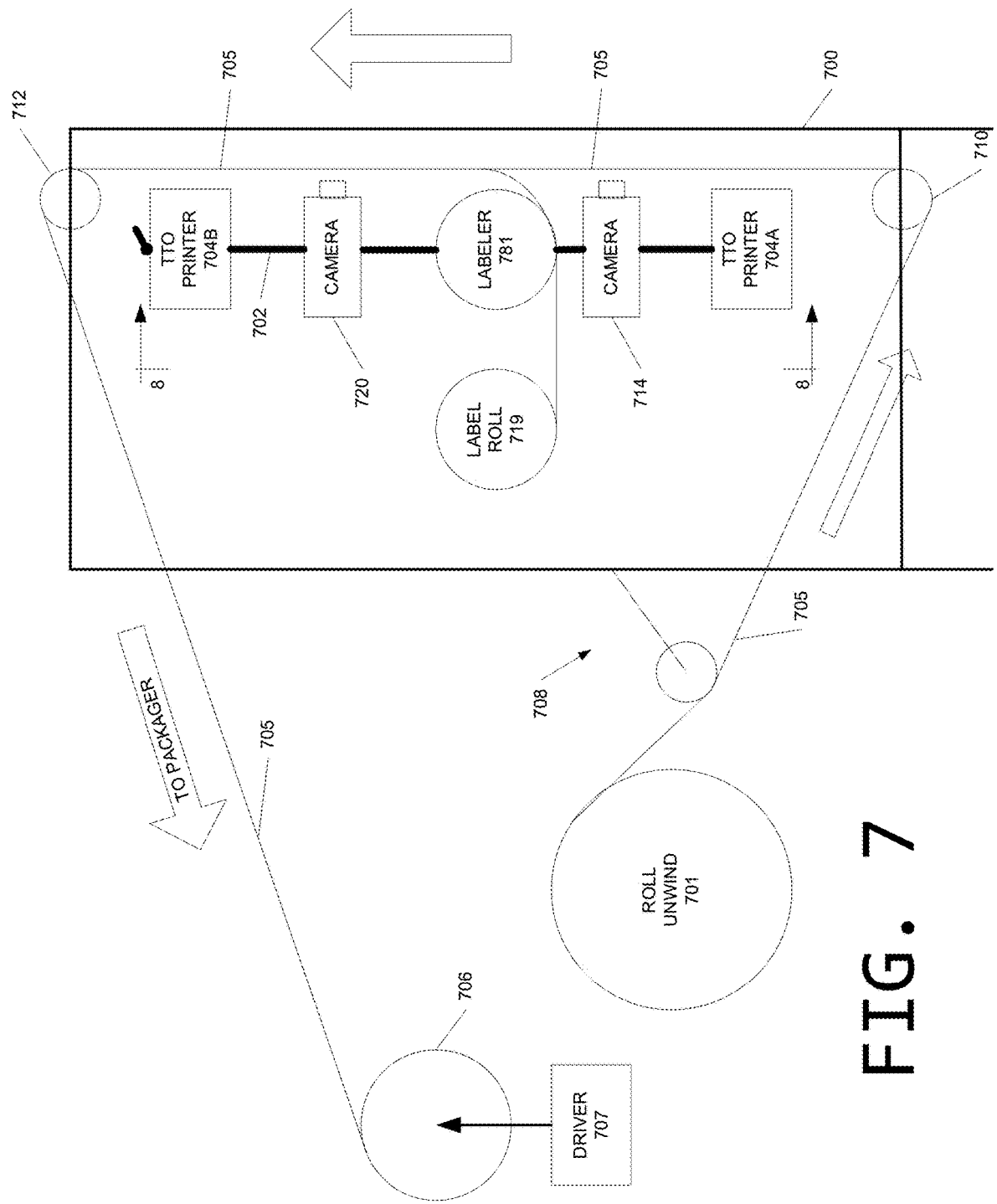

FIG. 7 illustrates a stand-alone module for use in conjunction with a typical roll of product packaging material (PPM) packages, according to one embodiment of the invention.

Figure 8:
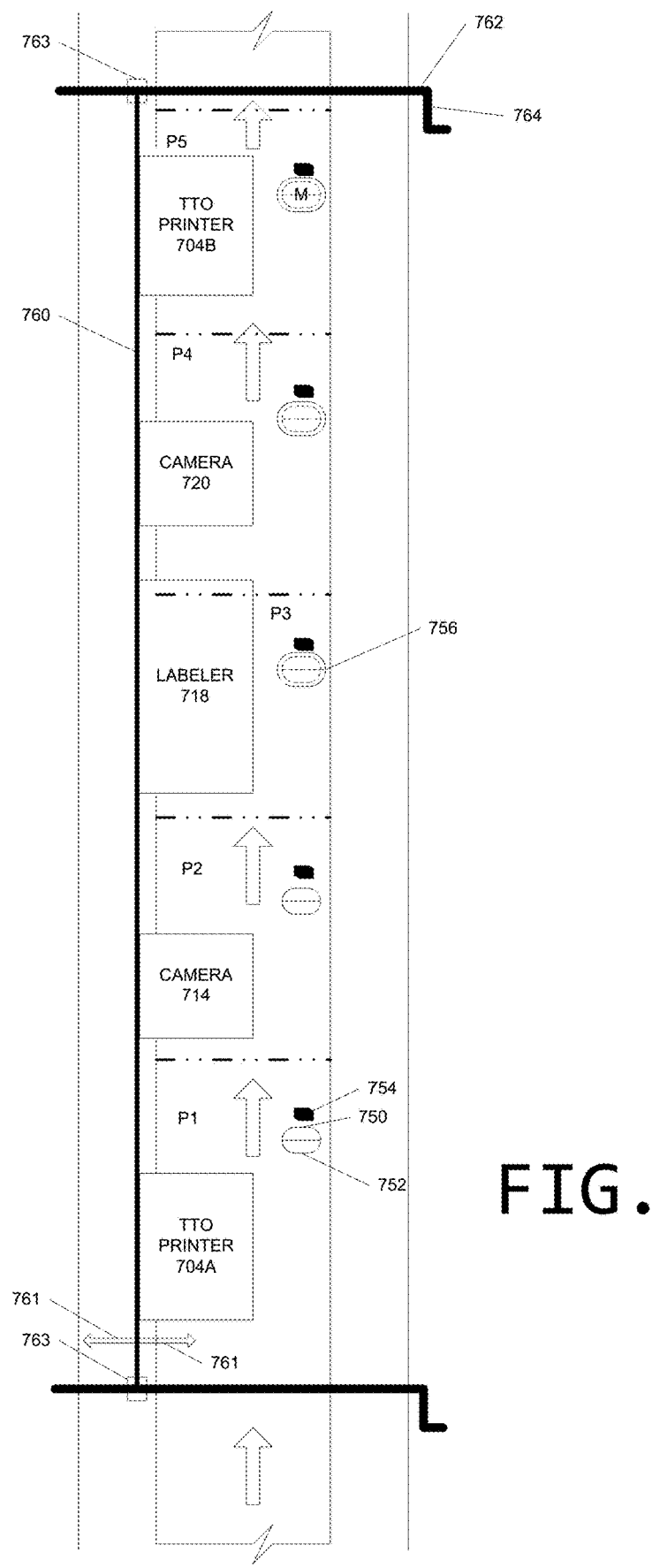

FIG. 8 is a view of the stand-alone module of FIG. 7 taken along lines 8-8 of FIG. 7.

Figure 9:
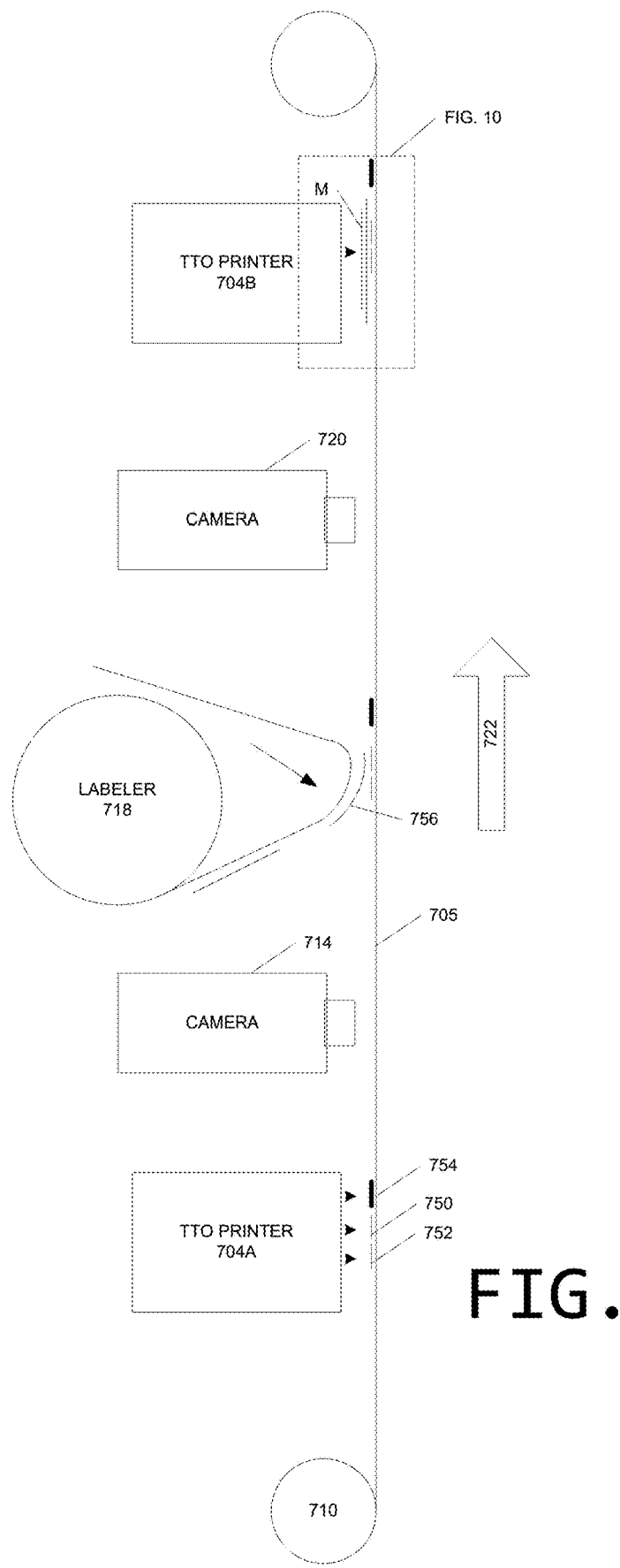

FIG. 9 is a partial Side view of the stand-alone module of FIG. 7.

Figure 10:
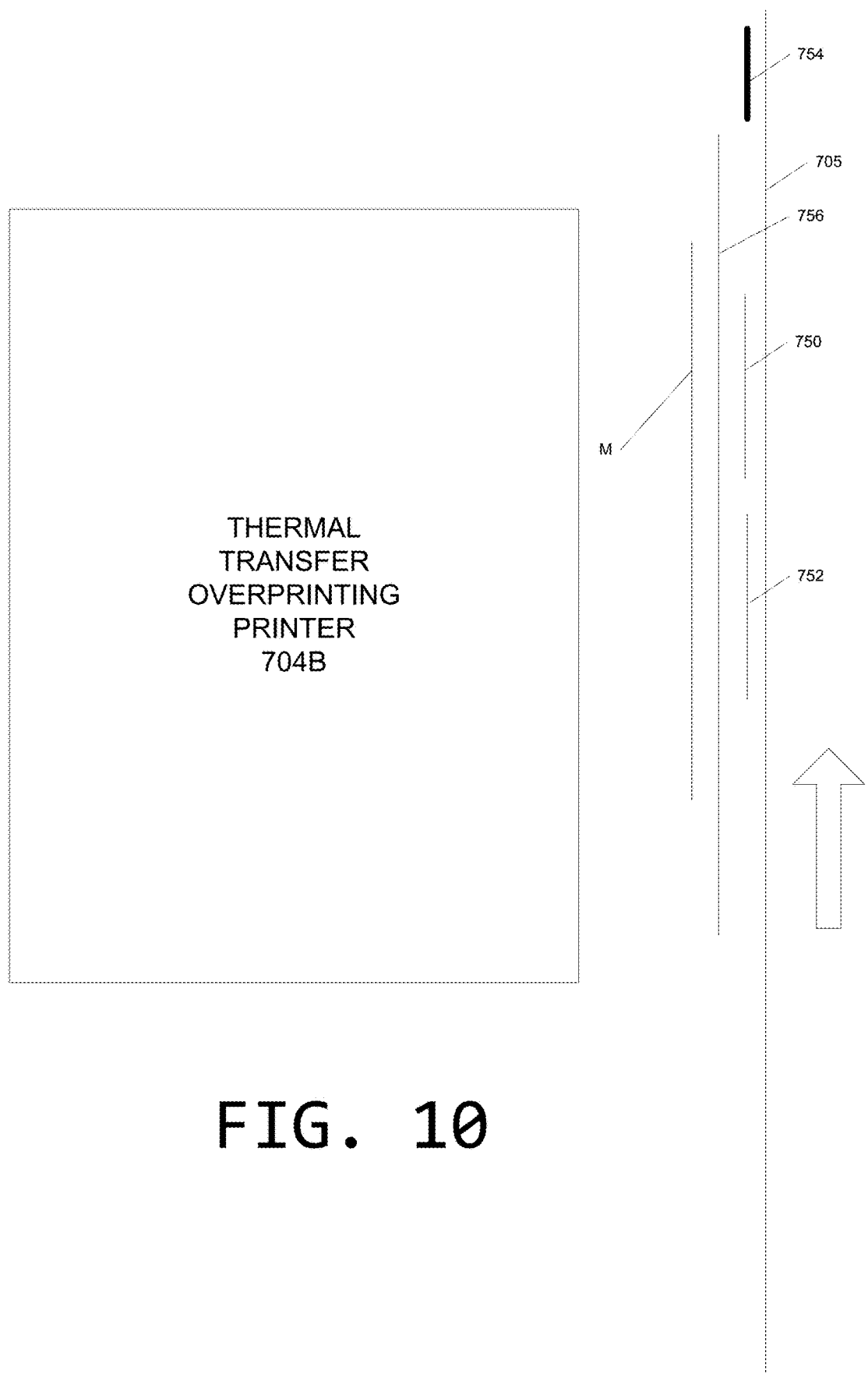

FIG. 10 is a partial side view of the thermal transfer overprinter and the web of PPM package after the images and scratch layer have been applied.

Figure 11:
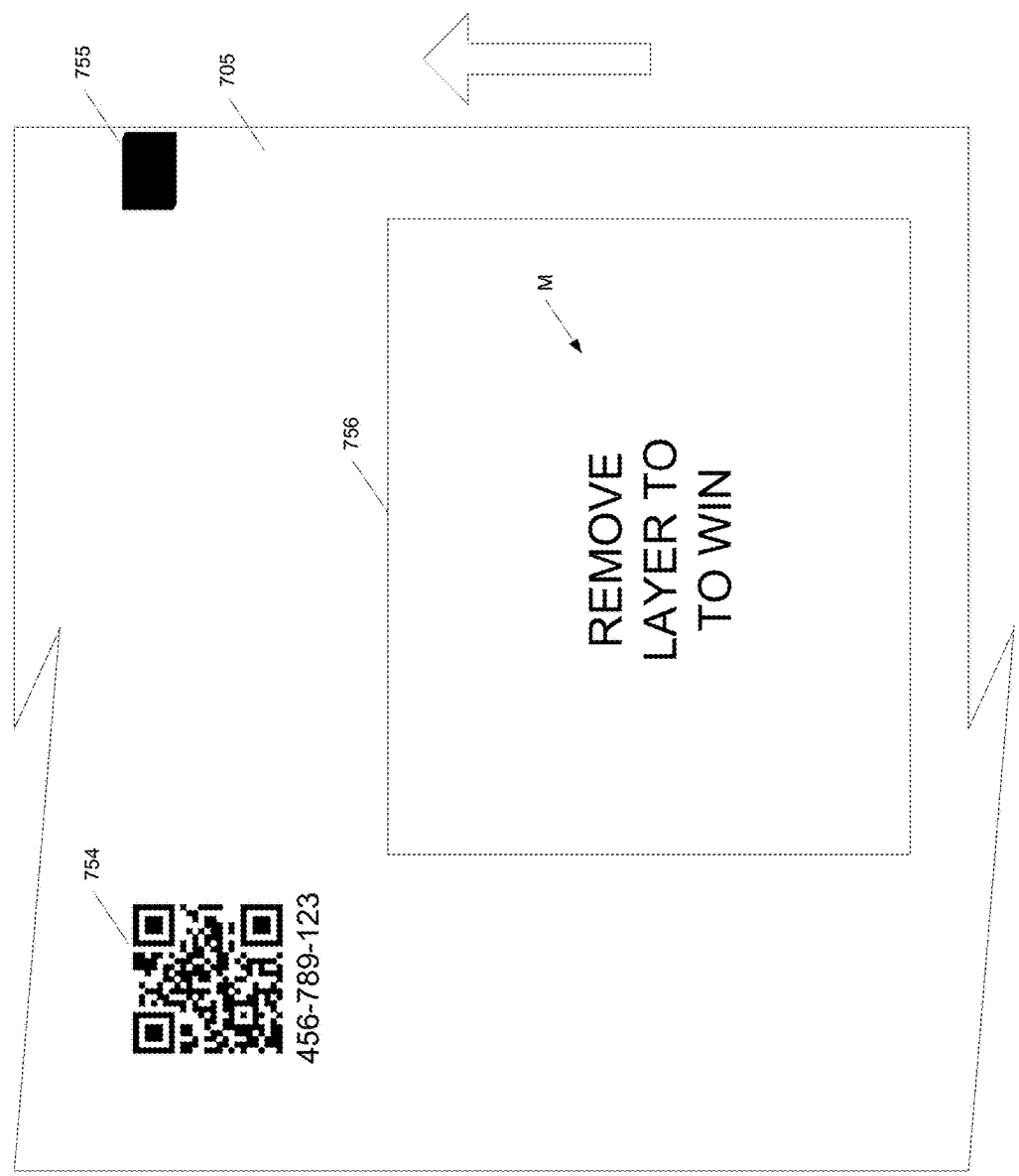

FIG. 11 is a plan view of an image on a web, according to one embodiment of the invention.

Figure 12A:
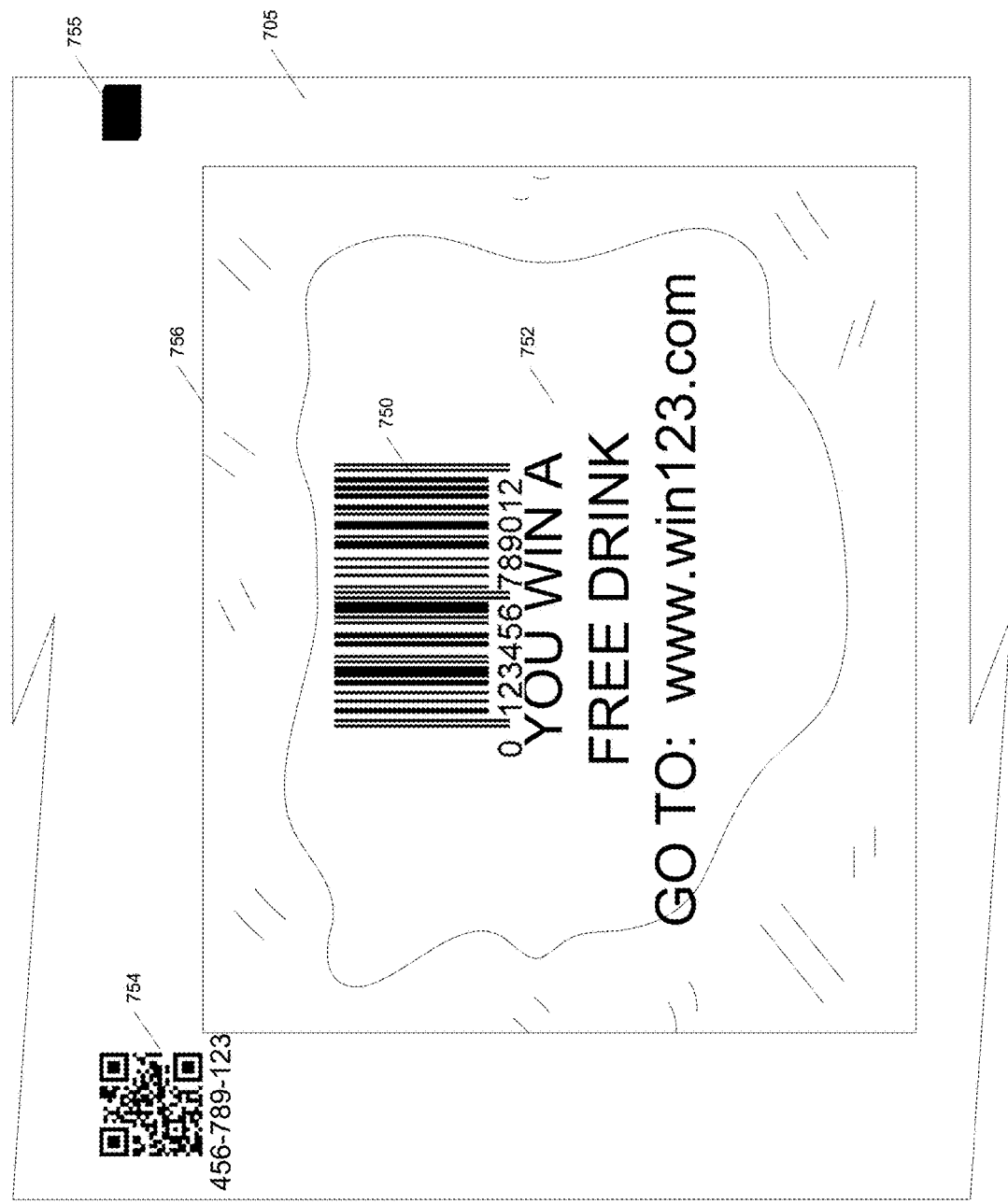

FIG. 12A is a plan view of the image of FIG. 11, with part of the scratch layer removed.

Figure 12B:
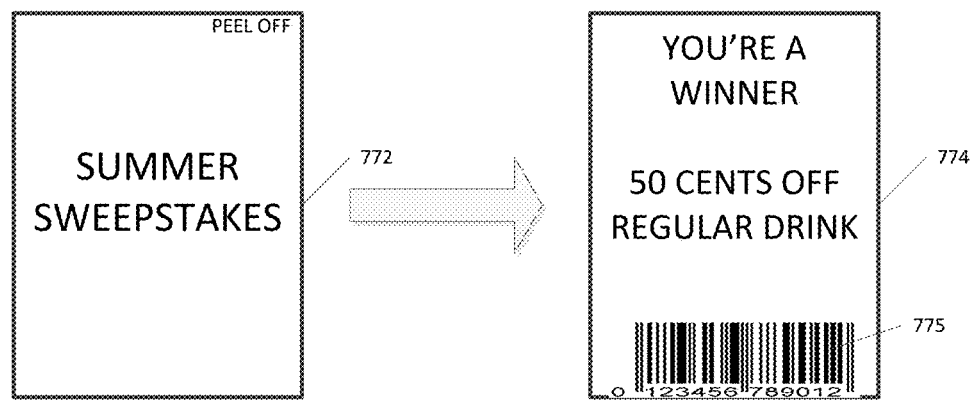
Figure 12C:
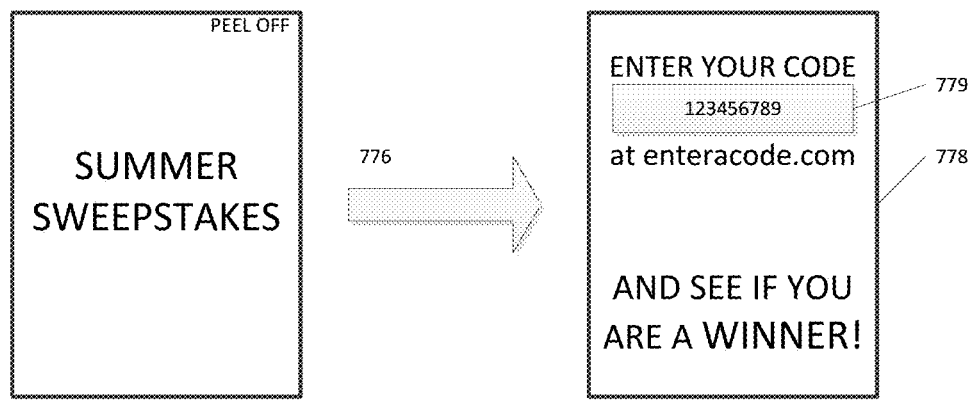

FIGS. 12B and 12C are a plan view of an instant win version and a non-instant win version of FIG. 12A.

Figure 13:
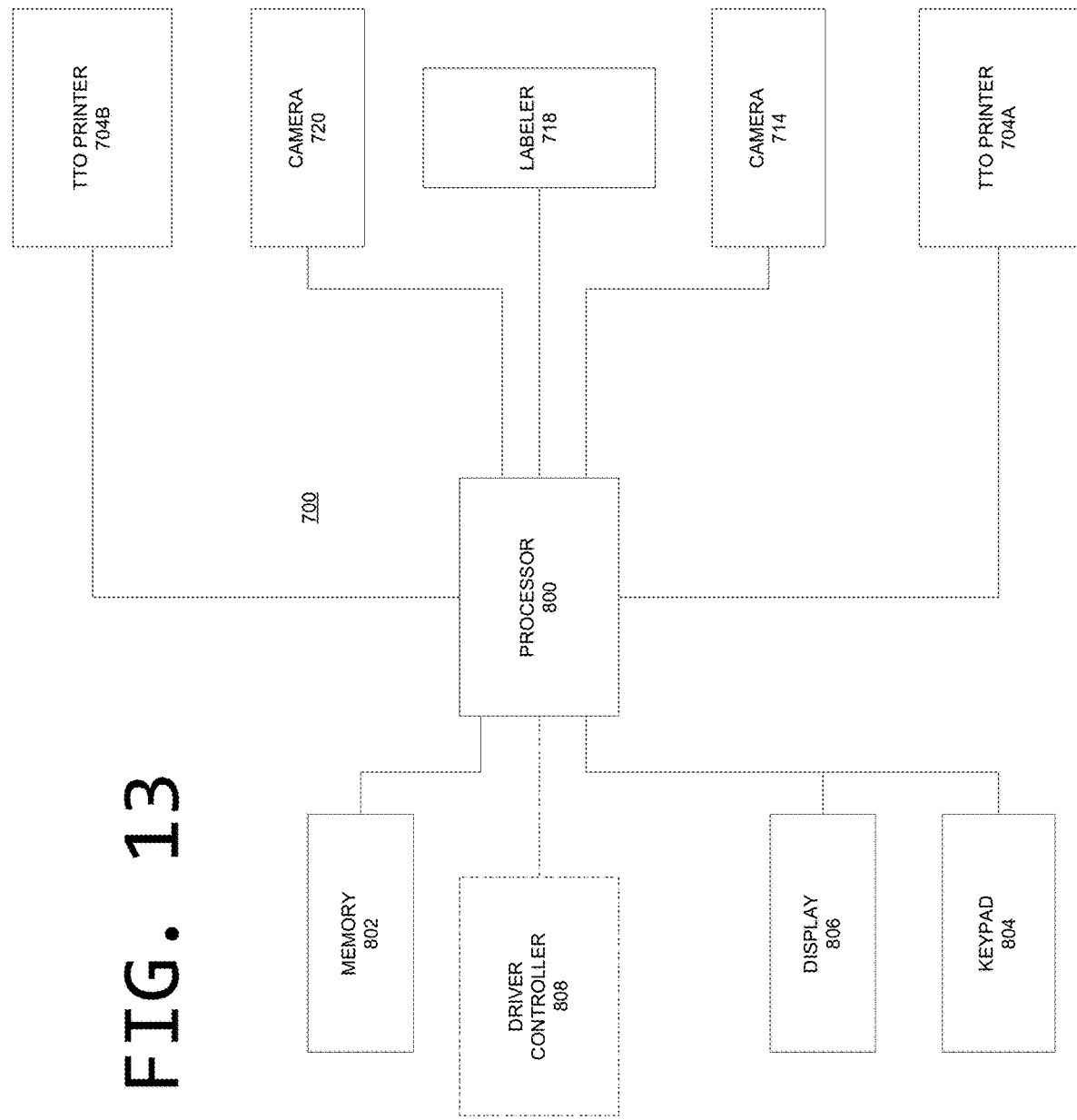

FIG. 13 is a block diagram of the stand-alone module of FIG. 7, according to one embodiment of the invention.

Figure 14:
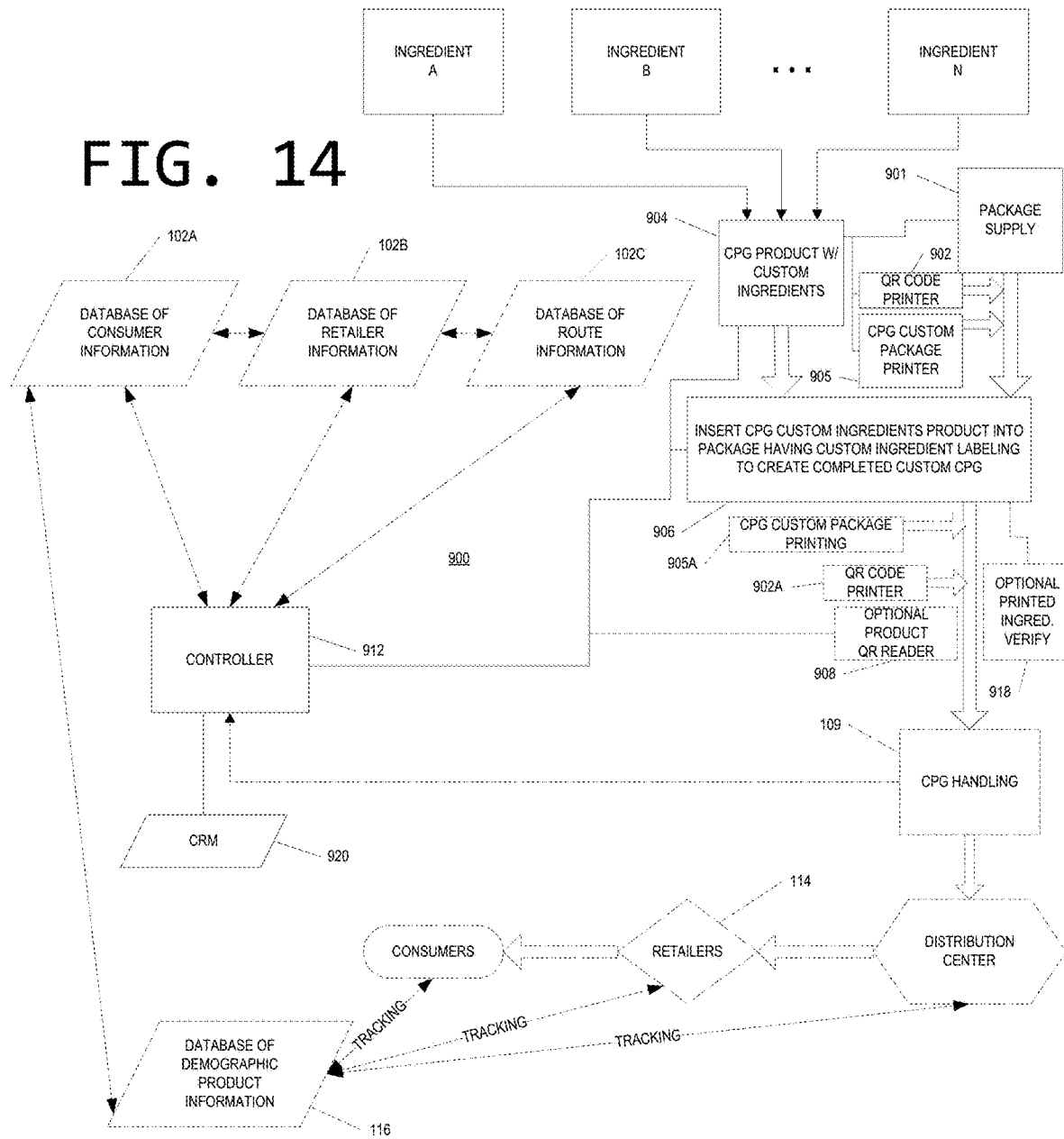

FIG. 14 is a block diagram of one embodiment of systems and methods of the invention for the manufacture of CPG products having custom ingredients, optionally based on at least one of consumer information, retainer information, demographic product information and demographic package information.

Figure 15:
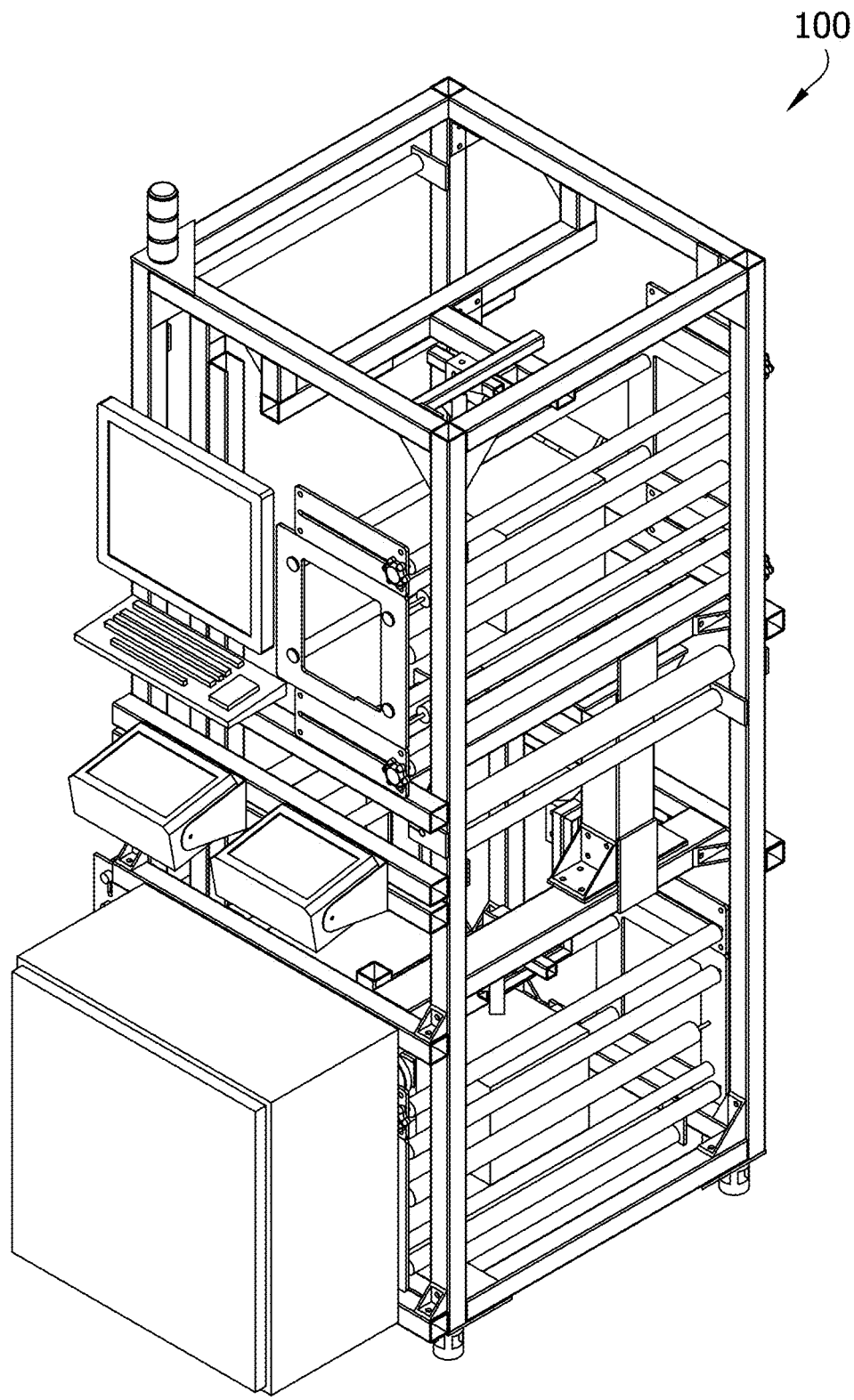

FIG. 15 illustrates a front perspective view another embodiment of a stand-alone module for use in conjunction with a typical web of product packaging material (PPM) packages, according to one embodiment of the invention.

Figure 16:
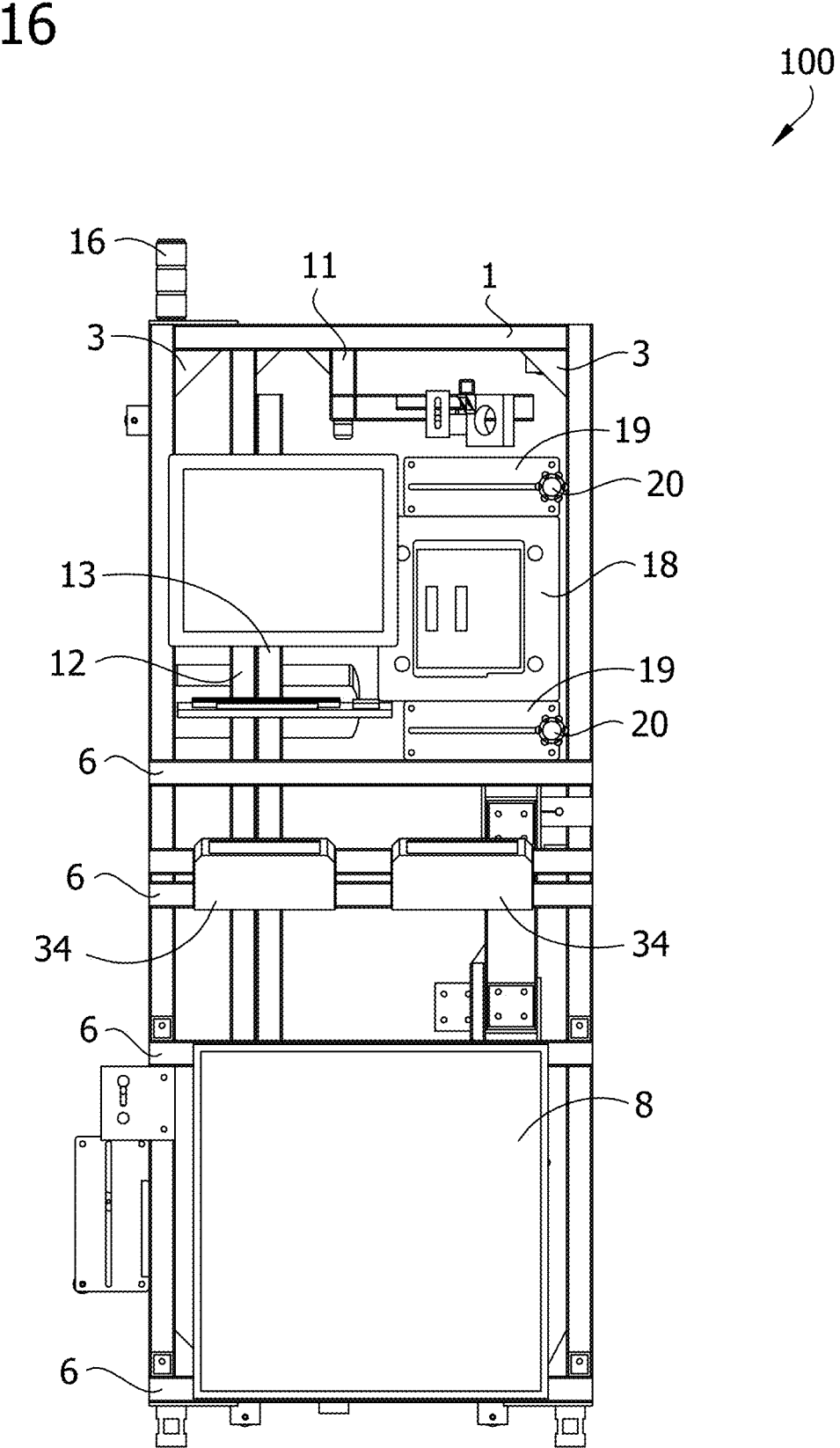

FIG. 16 illustrates a front side elevational view of the module of FIG. 15.

Figure 17:
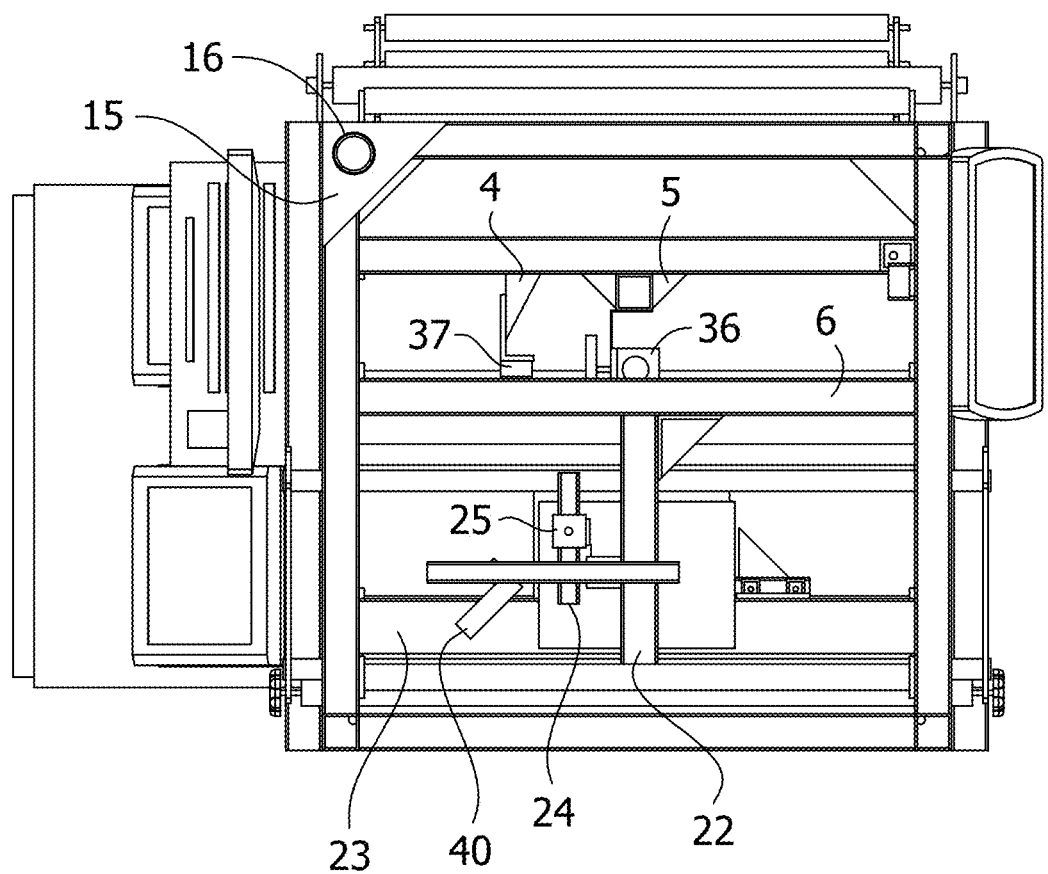

FIG. 17 illustrates a top elevational view of the module of FIG. 15.

Figure 18:
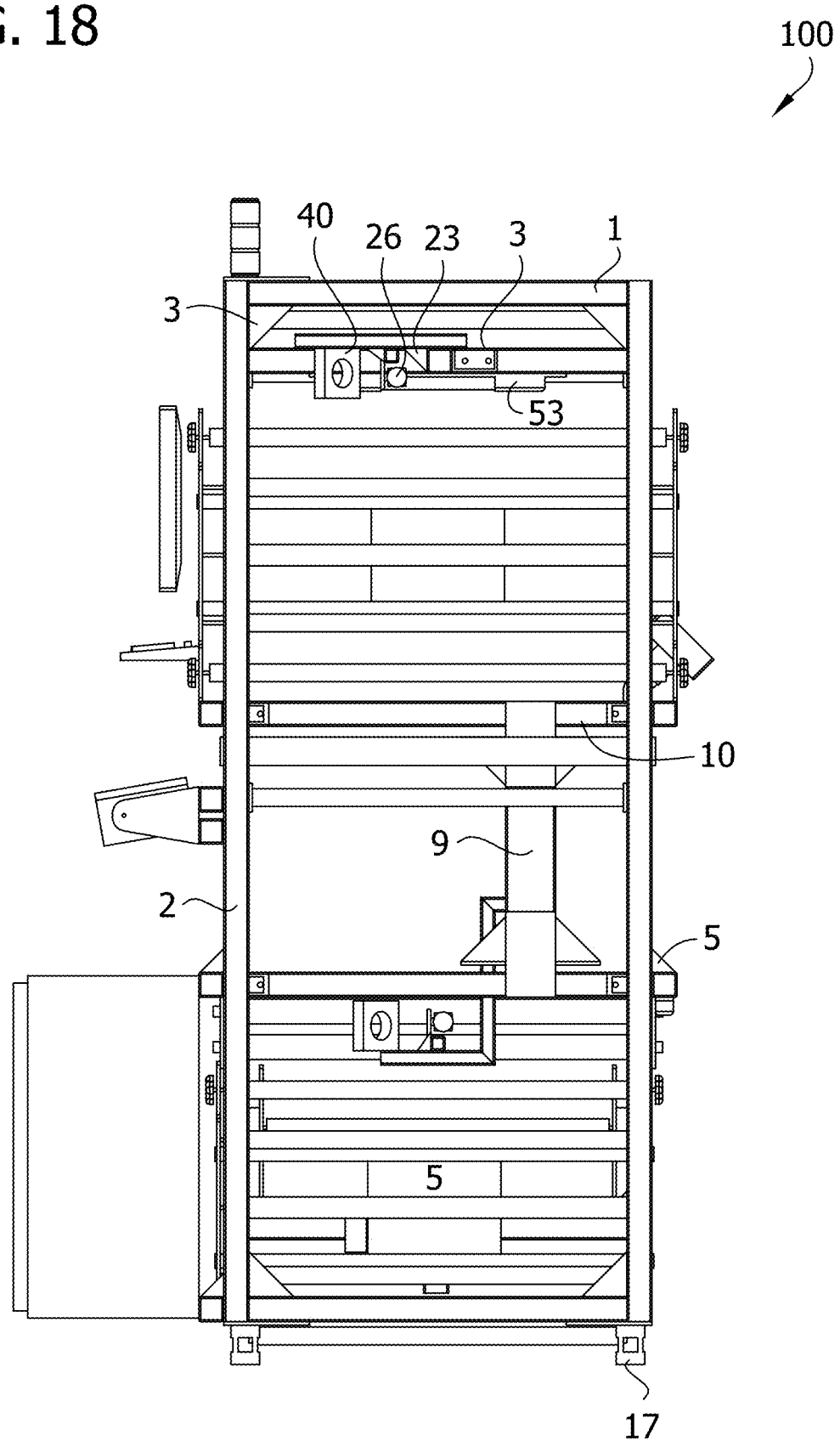

FIG. 18 illustrates a right side elevational view of the module of FIG. 15.

Figure 19:
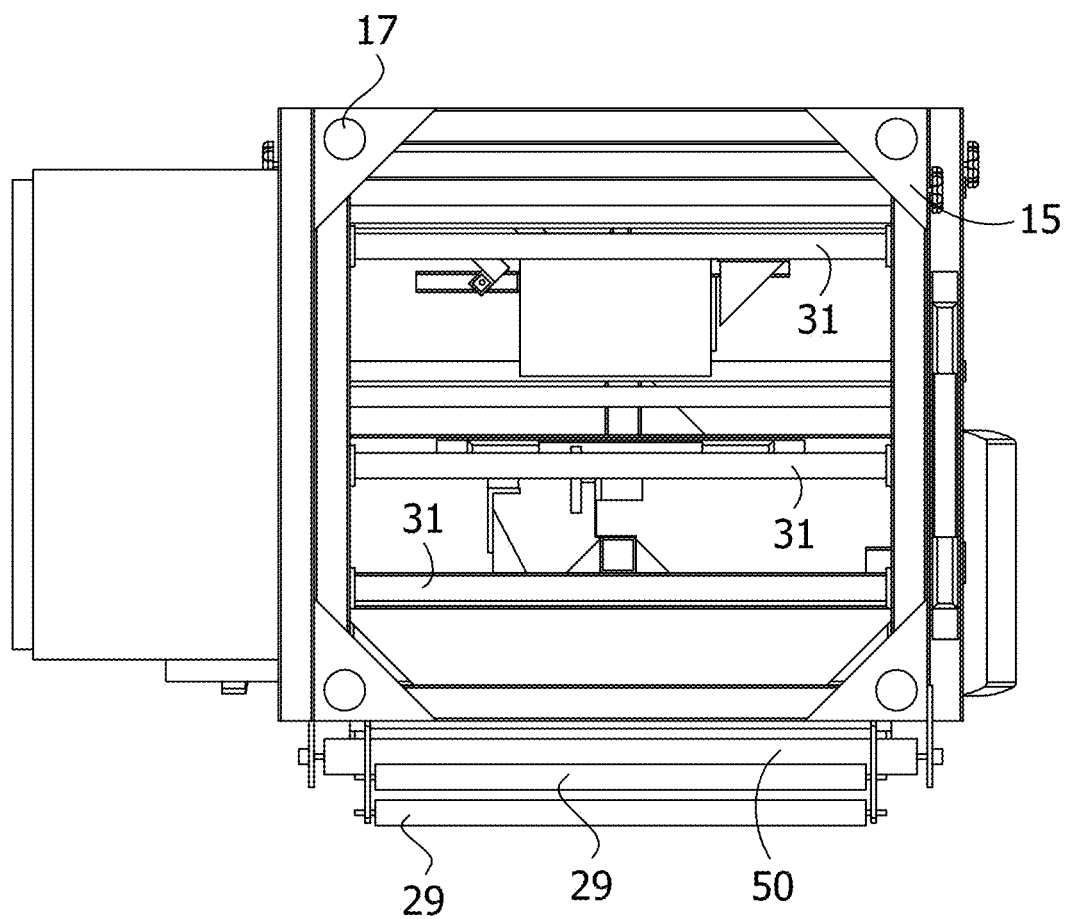

FIG. 19 illustrates a bottom elevational view of the module of FIG. 15.

Figure 20:
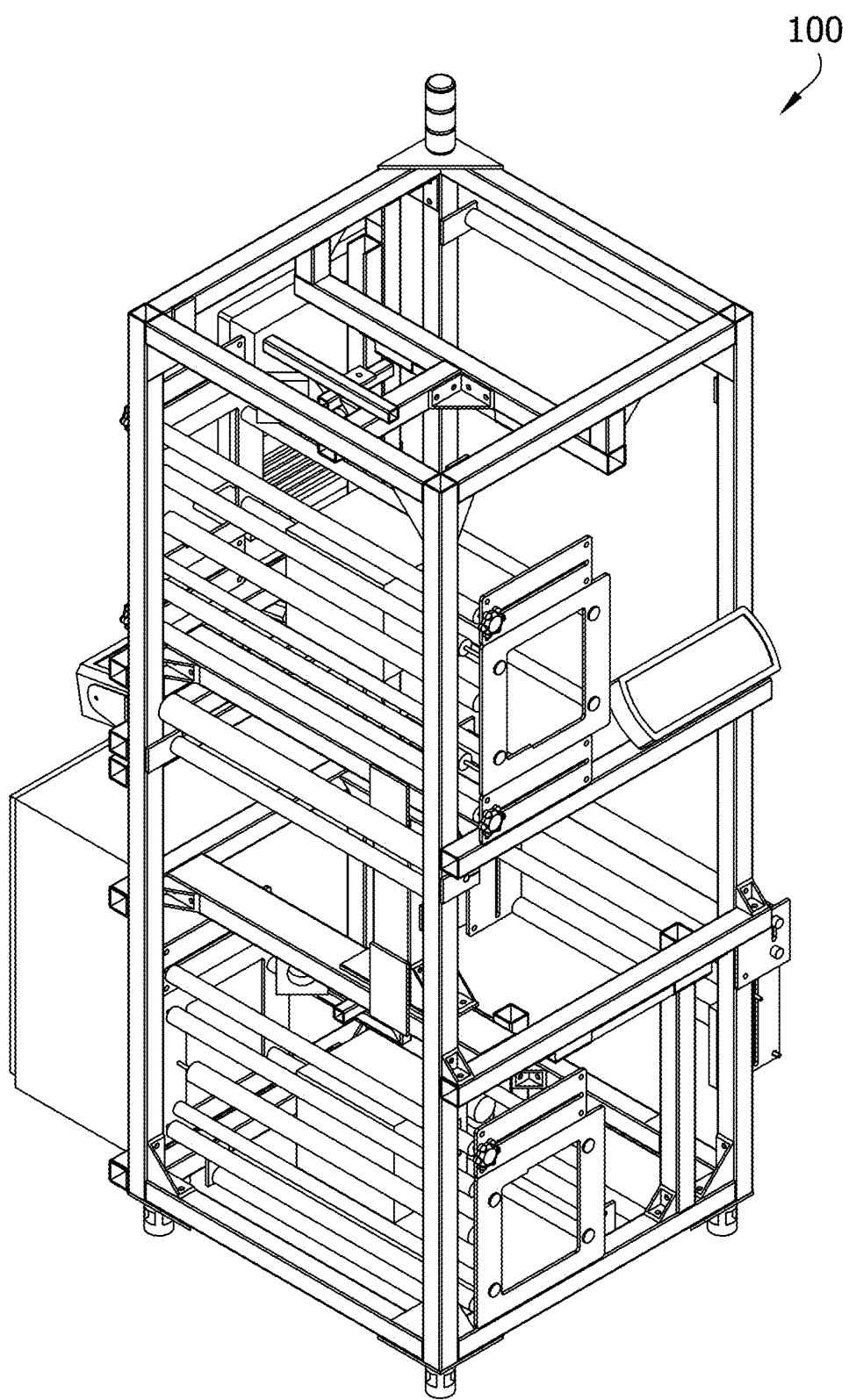

FIG. 20 illustrates a rear perspective view of the module of FIG. 15.

Figure 21:
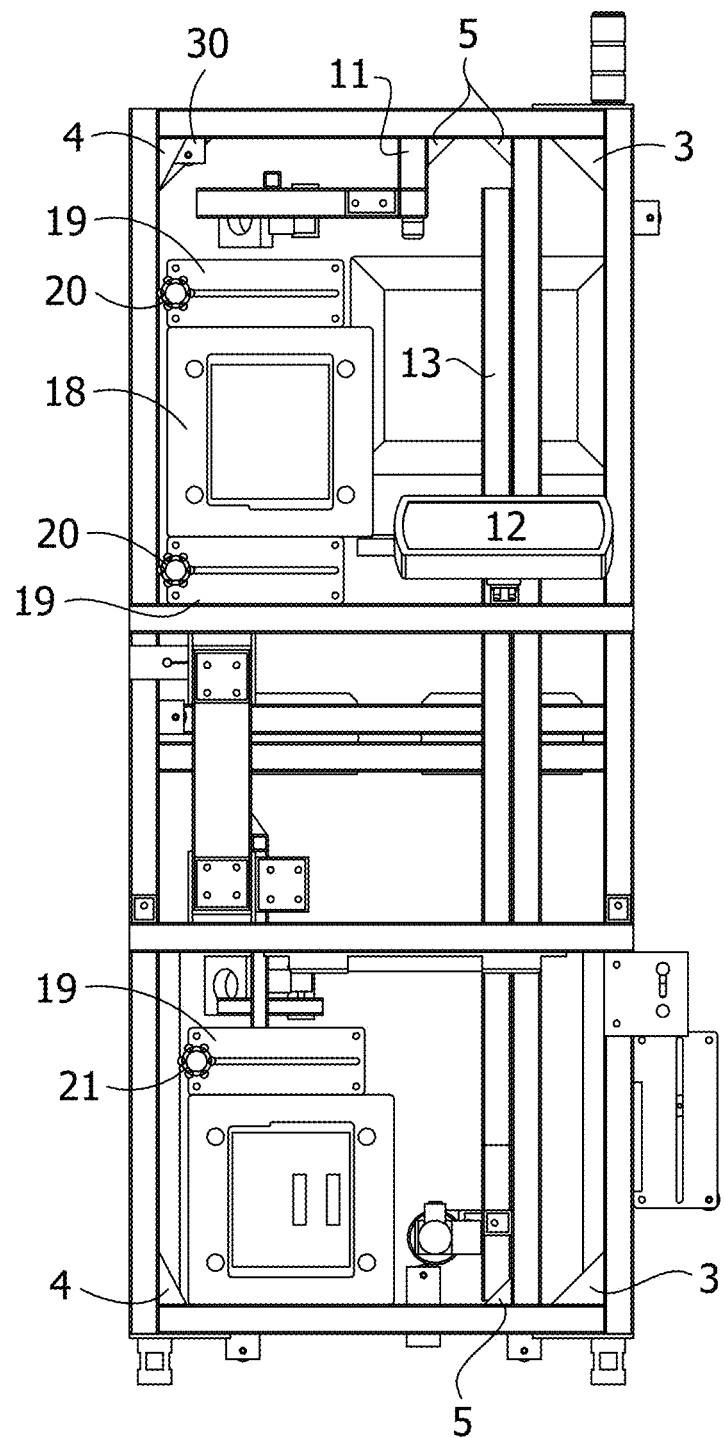

FIG. 21 illustrates a rear side elevational view of the module of FIG. 15.

Figure 22:
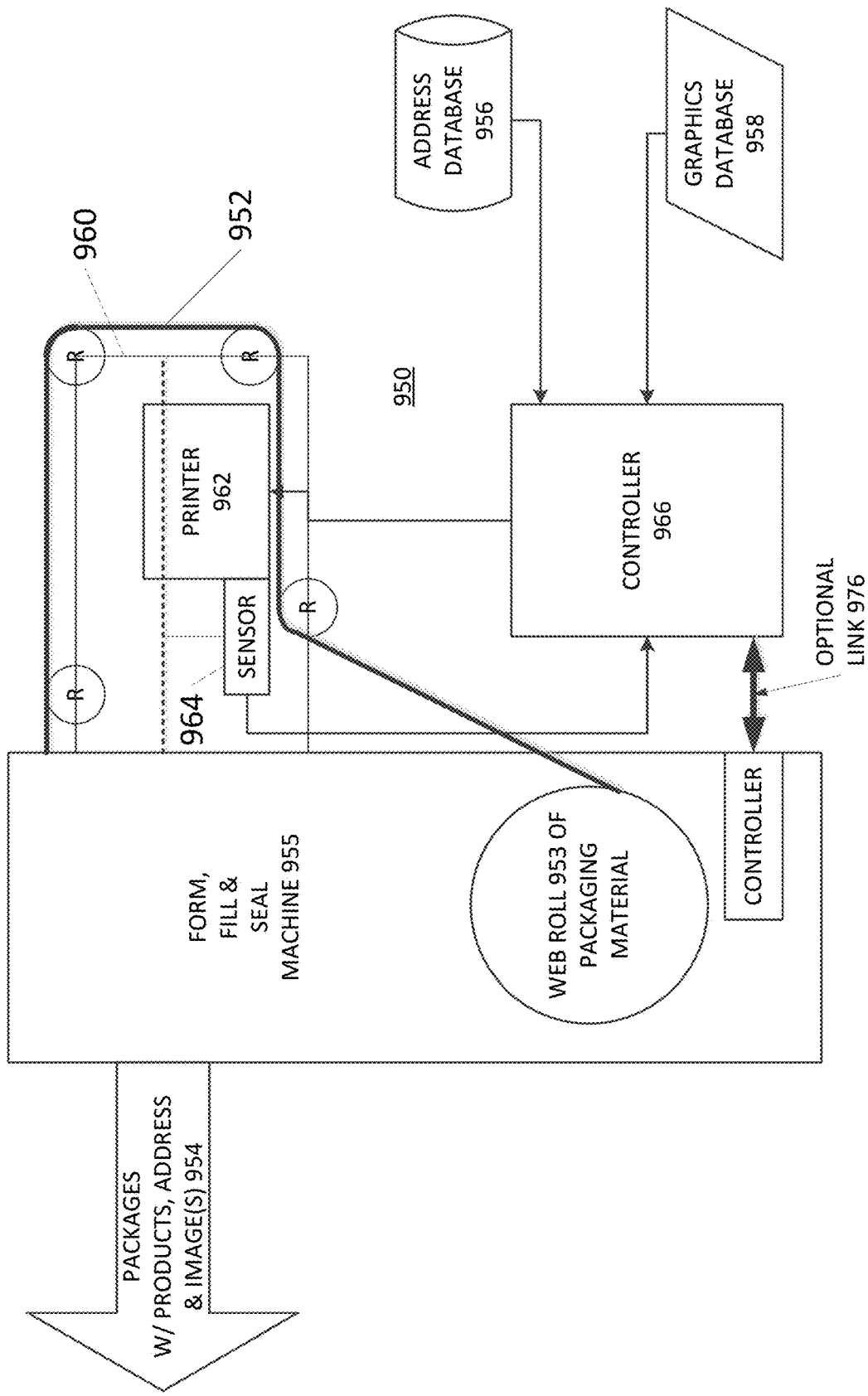

FIG. 22 is an illustration of one embodiment of the invention added to a form, fill and seal machine.

Figure 23:
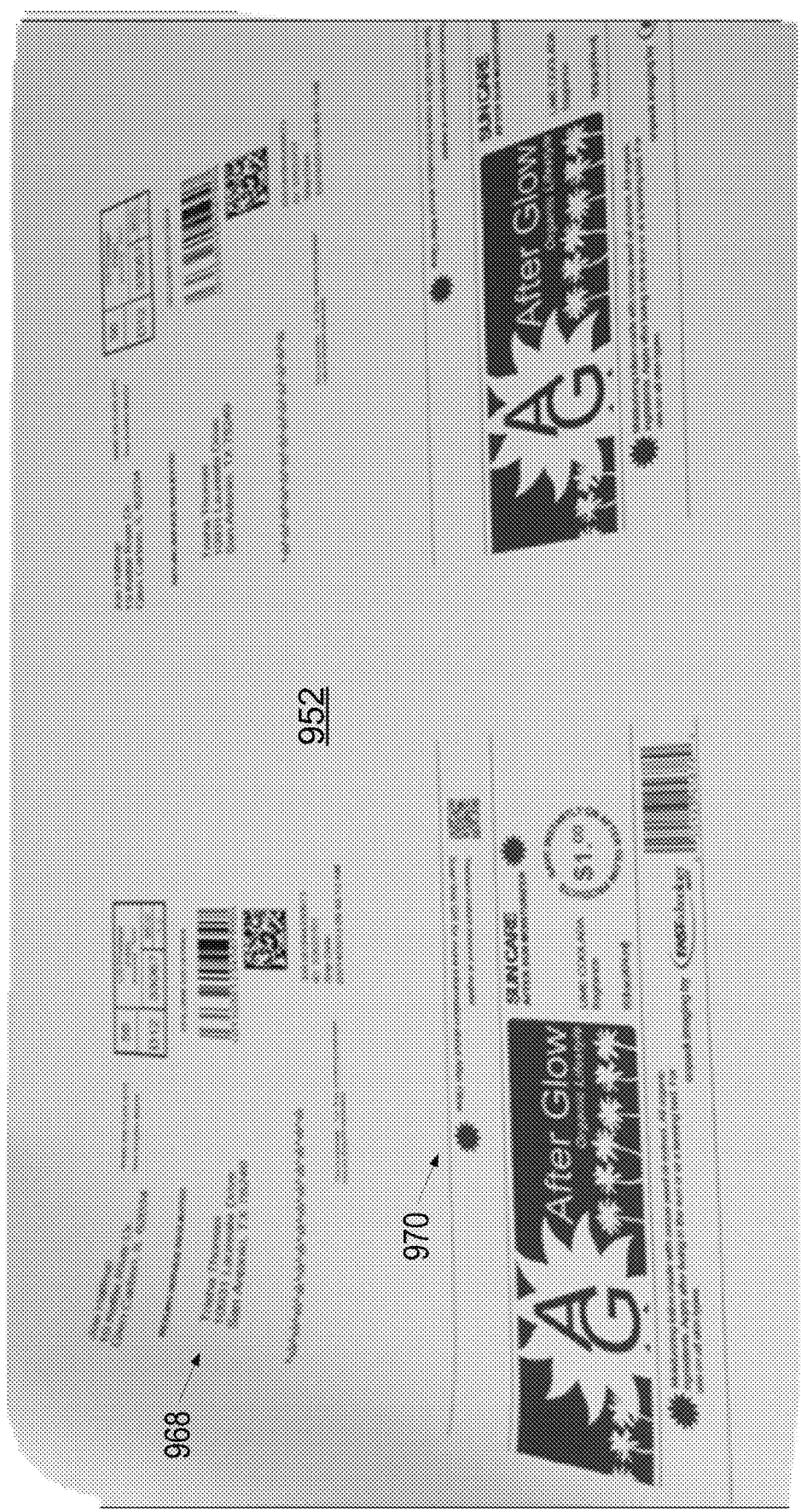

FIG. 23 is a photo of an exemplary web for use in a form, fill & seal machine for create a package, the web having an address and a graphics image printed thereon in accordance with the systems and methods herein.

Figure 24:
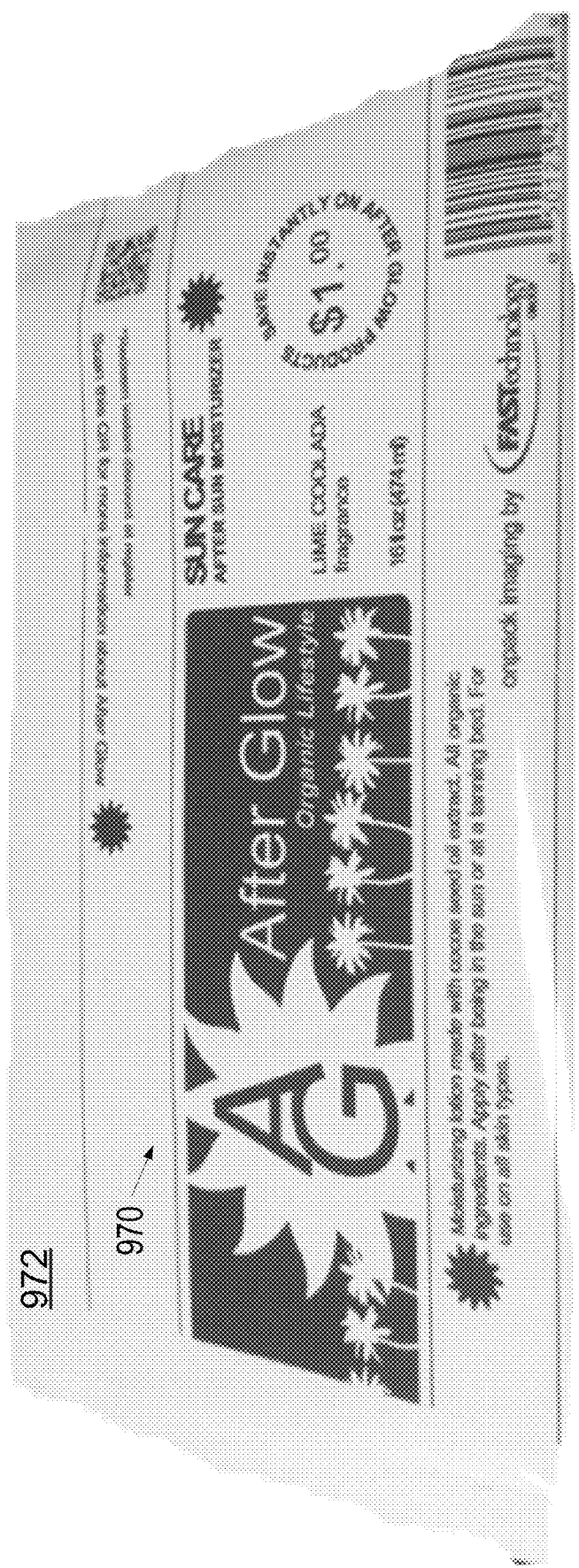

FIG. 24 is a photo of the front of an exemplary form, fill & seal package having a lotion sample therein and having been formed from the web pictured in FIG. 23.

Figure 25:

FIG. 25 is a photo of the back of the exemplary form, fill & seal package having a lotion sample therein pictured in FIG. 24 and having been formed from the web pictured in FIG. 23.

Figure 26:
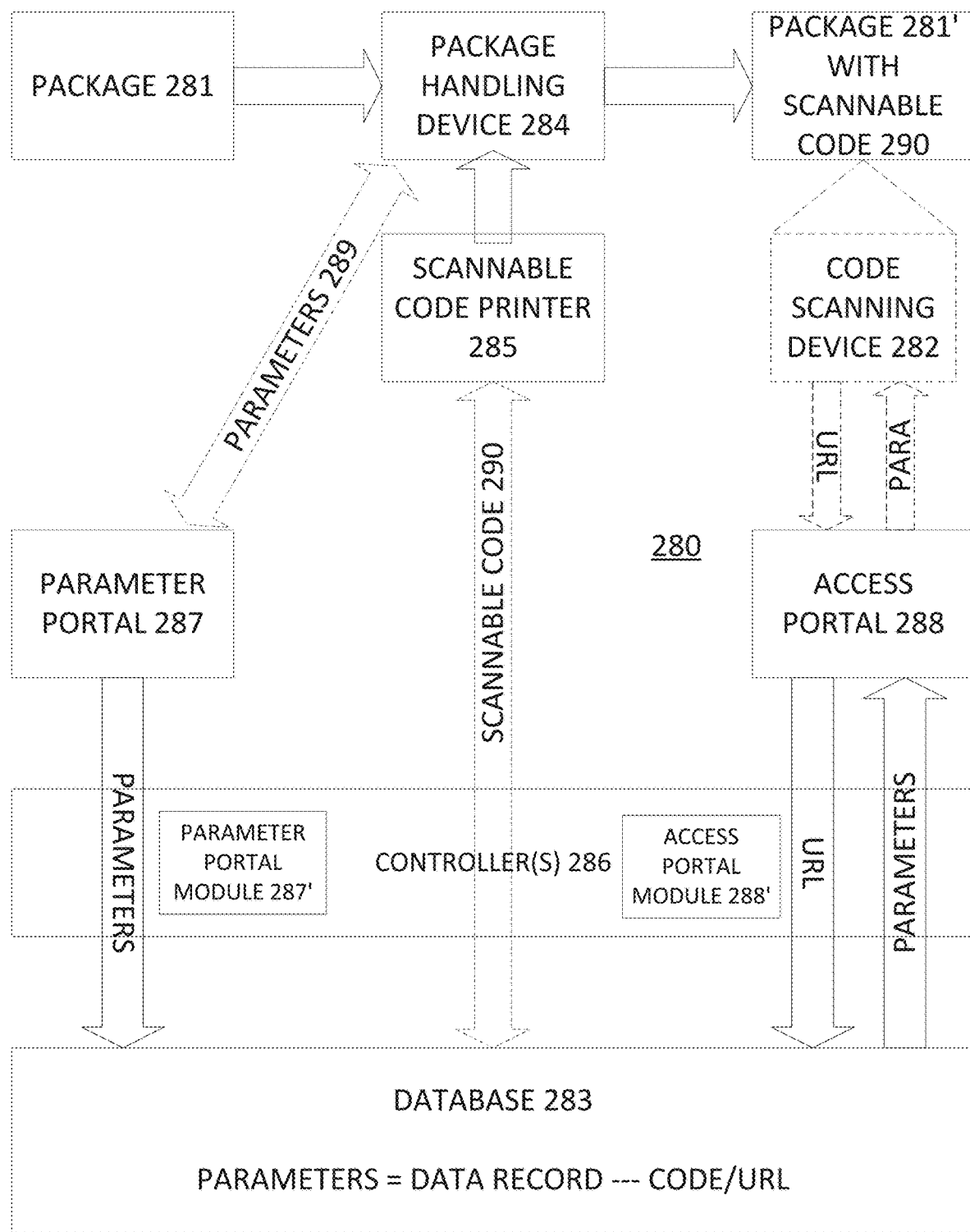

FIG. 26 illustrates one embodiment of systems and methods for use with product packages having scannable codes and for use with a code scanning device for scanning the scannable codes of the product packages.

Figure 27:
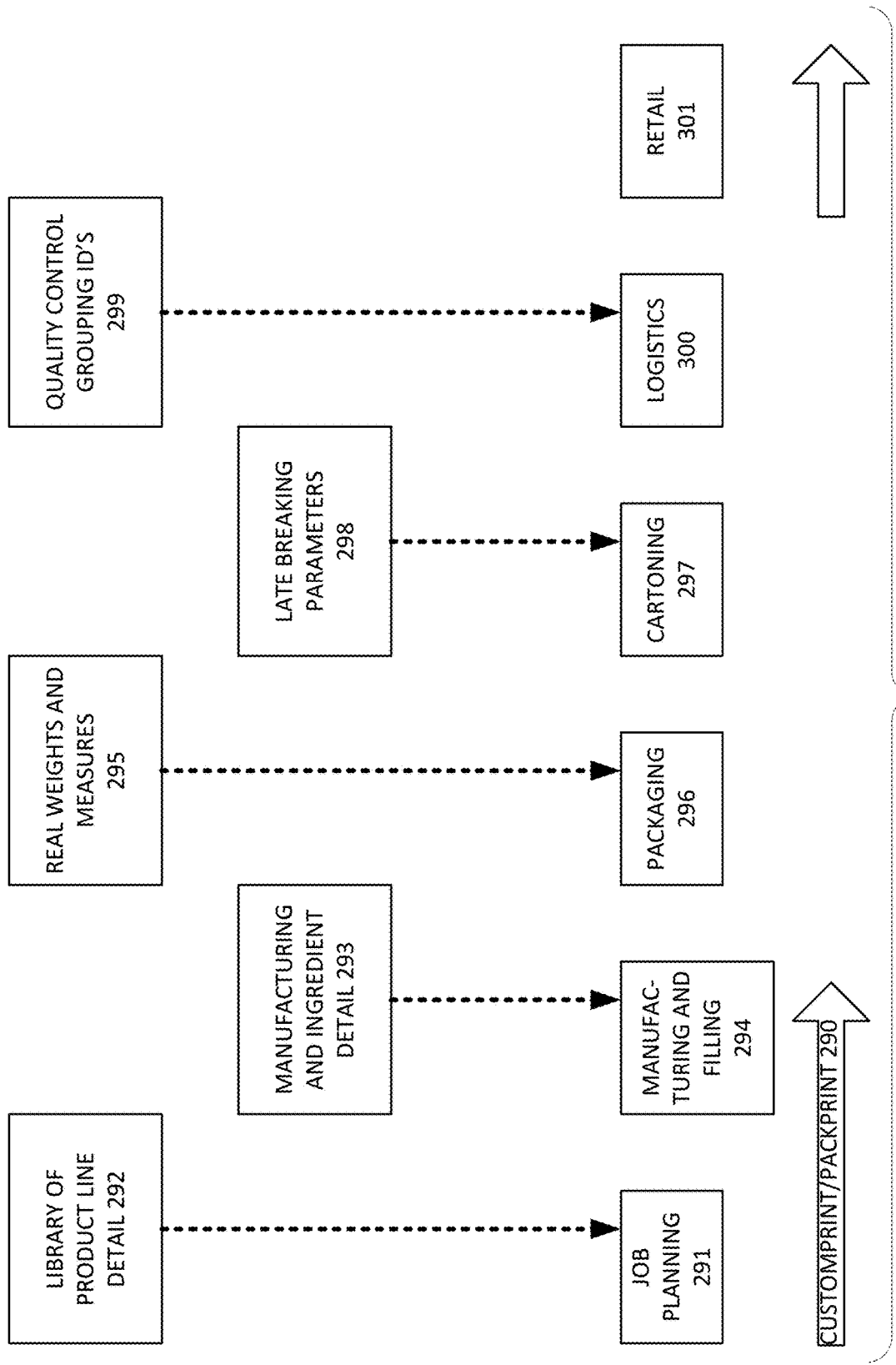

FIG. 27 is a diagram illustrating various database inputs and their sources.

Figure 28:
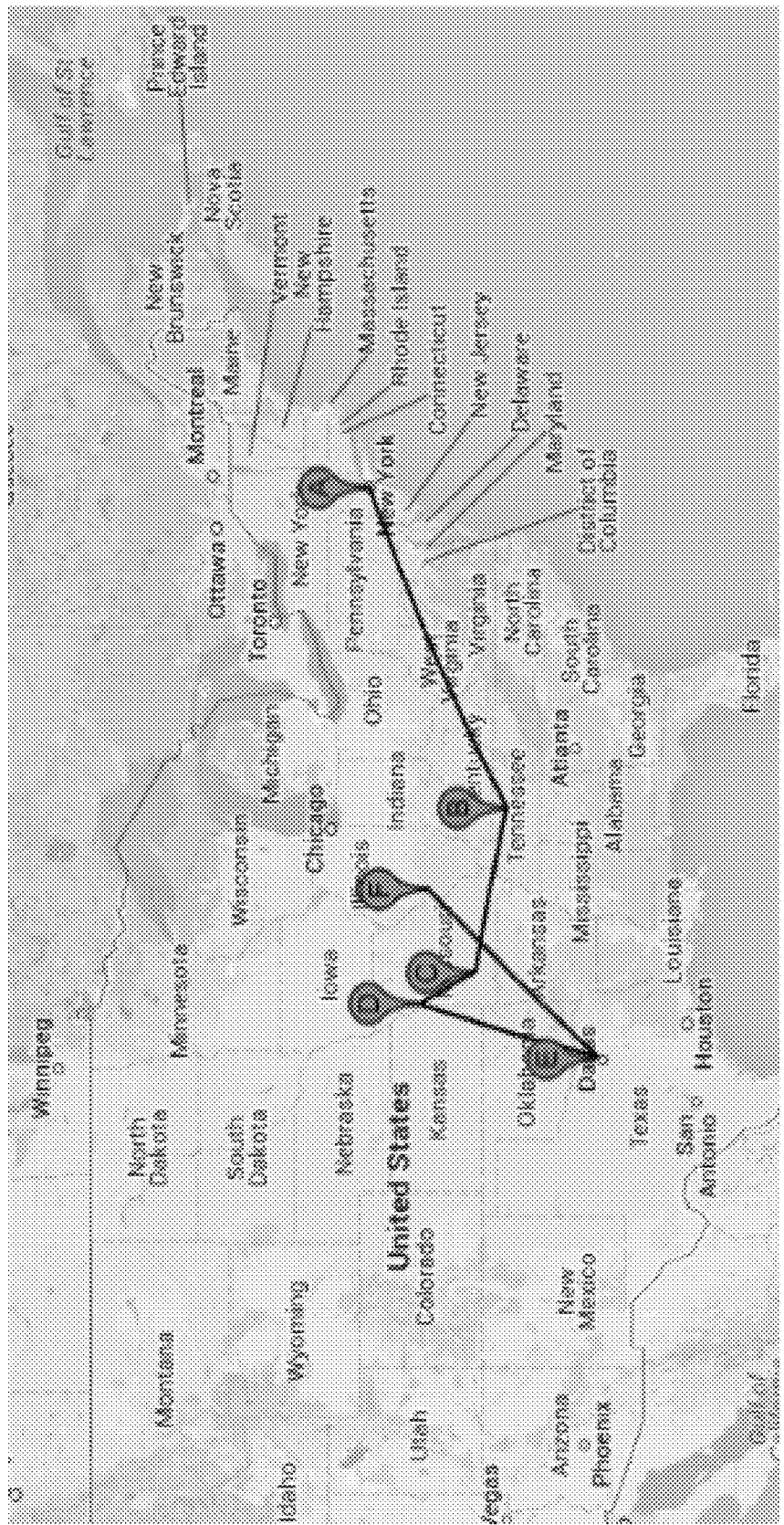

FIG. 28 is a photo of a screen shot of My Product journey.

Figure 29:
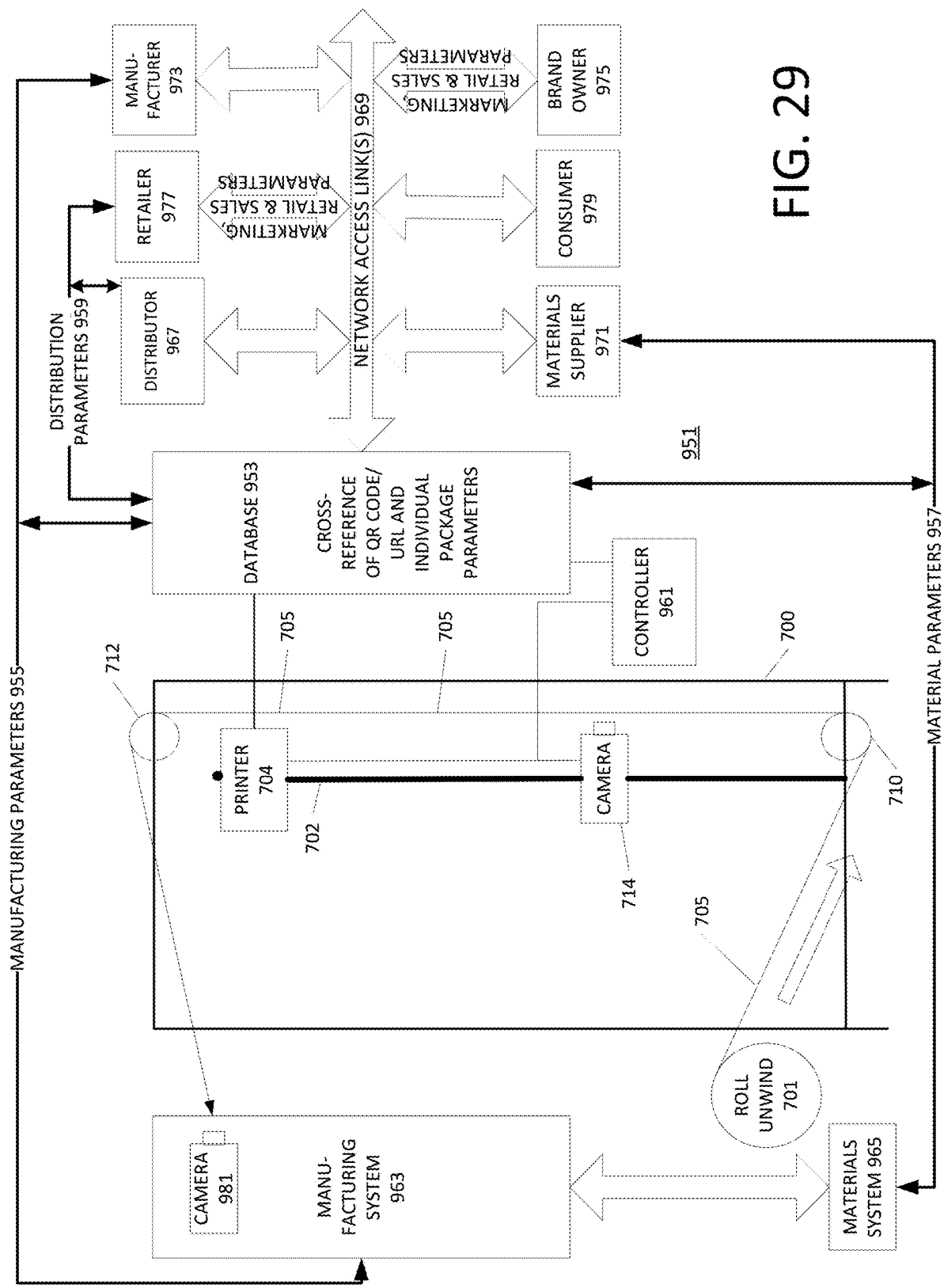

FIG. 29 illustrates one embodiment of systems and methods of the invention for printing individual QR codes on a continuous web from which individual consumer packages are formed. A database cross-references the QR code/URL of each package to its unique package parameters so that so that each data record is assigned to a unique URL. The package parameters includes one of more of manufacturing parameters, material parameters, distribution parameters, marketing parameters, retail parameters, and/or sales parameters.

Figure 30:
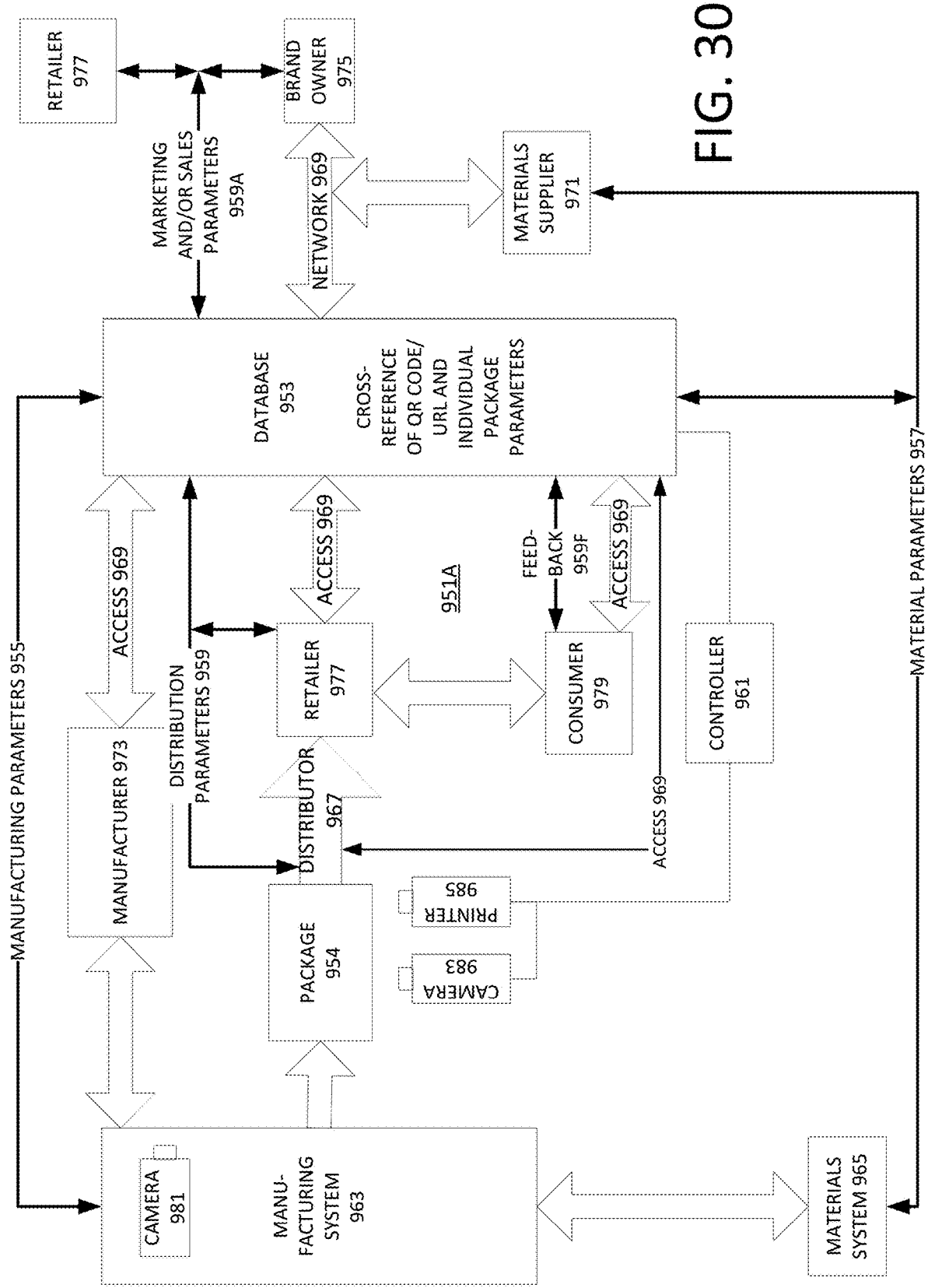

FIG. 30 illustrates one embodiment of systems and methods of the invention for printing individual QR codes on individual consumer packages after the packages are manufactured. A database cross-references the QR code/URL of each package to its unique package parameters. The package parameters includes one of more of manufacturing parameters, material parameters, distribution parameters, marketing parameters, retail parameters, and/or sales parameters.

Figure 31:
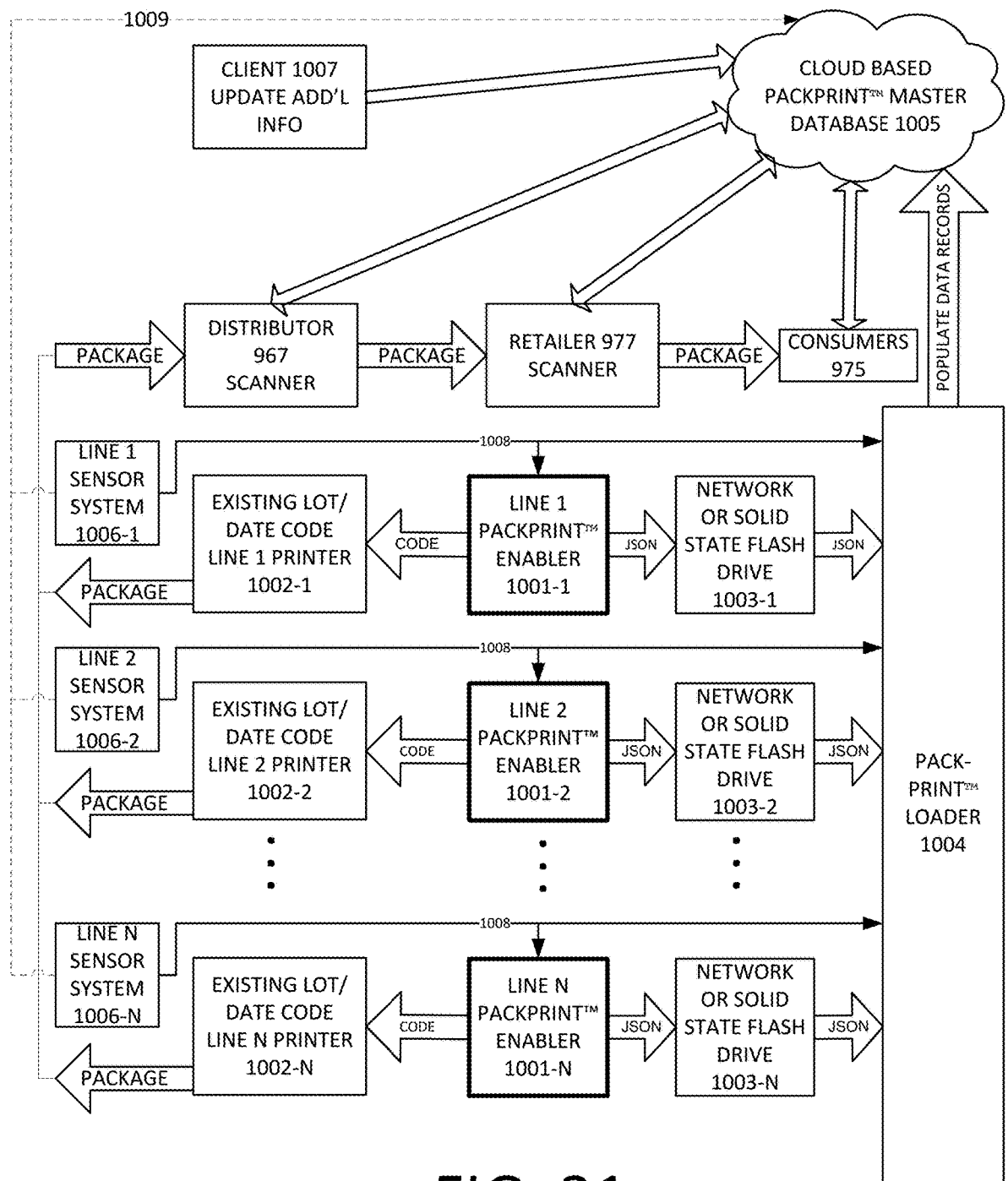

FIG. 31 illustrates one embodiment of systems and methods of the invention in which a solid suite memory is used to transfer data records.

Figure 32:
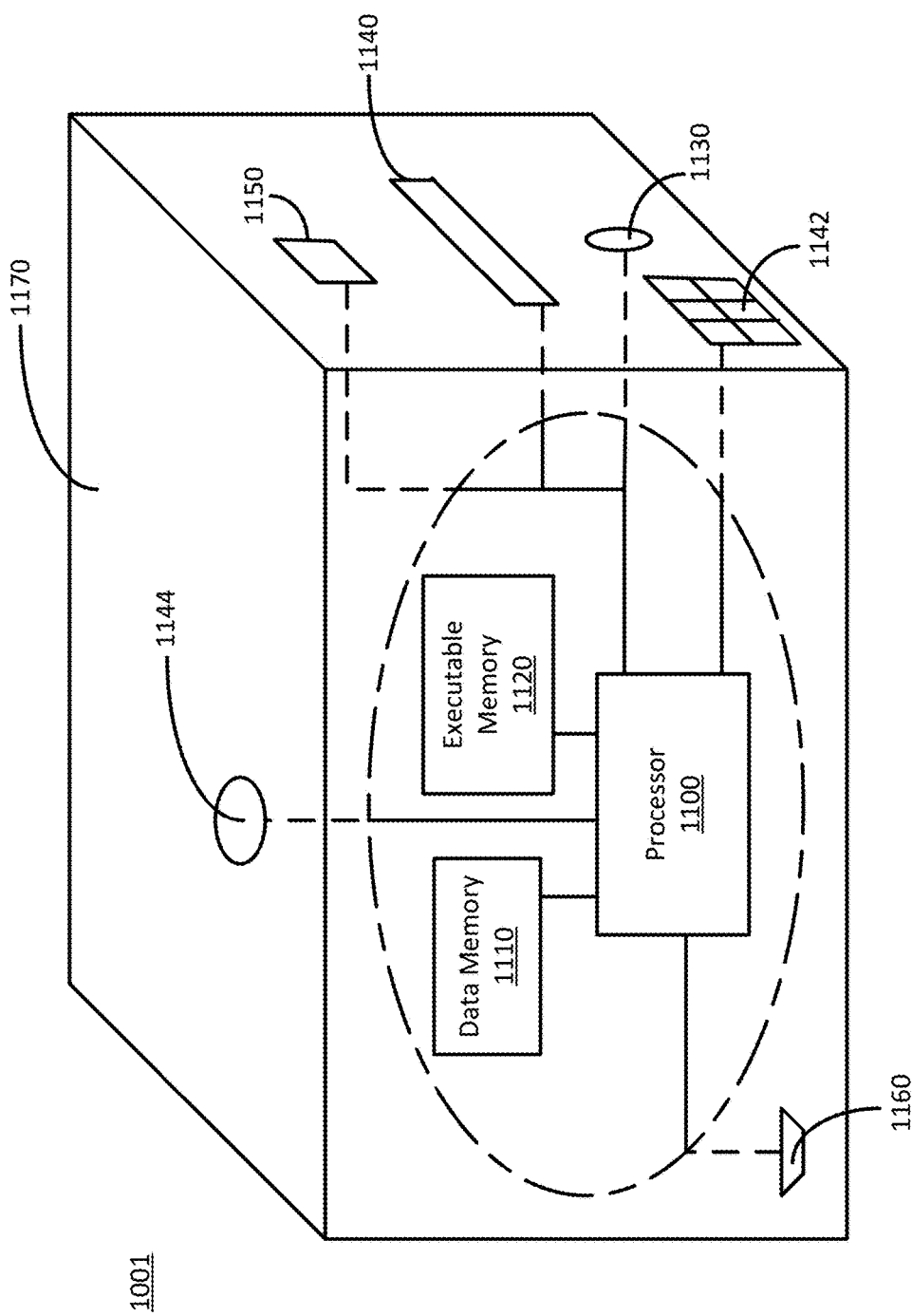

FIG. 32 illustrates one embodiment of a system of the invention in which solid-state memory and a processor are used to generate and manage unique scannable codes.

Figure 33:
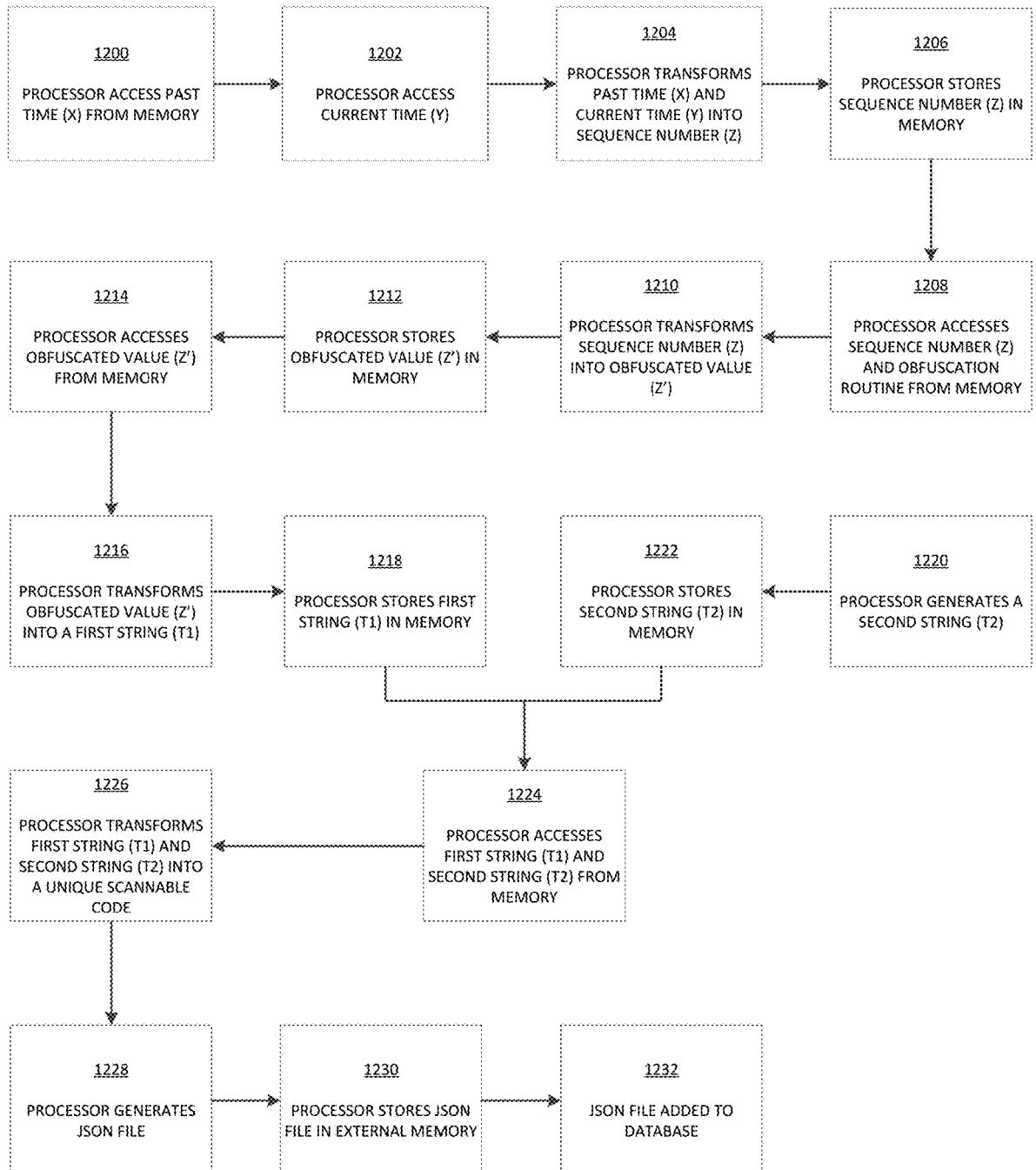

FIG. 33 is a block diagram of a system and method of the invention for creating unique scannable codes.

Figure 34:
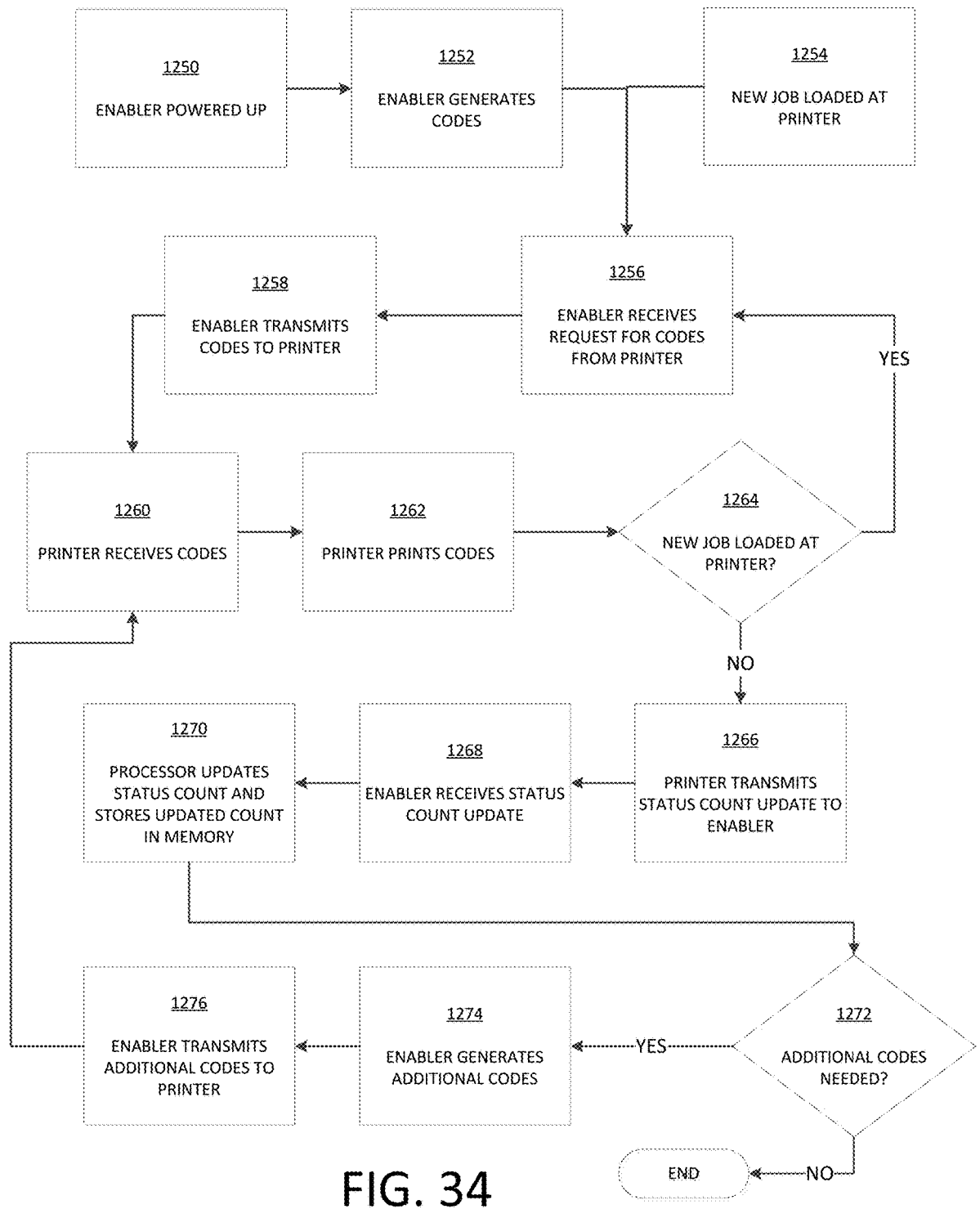

FIG. 34 is a block diagram of a system and method of the invention for managing applying unique scannable codes to product packaging.

Figure 35:
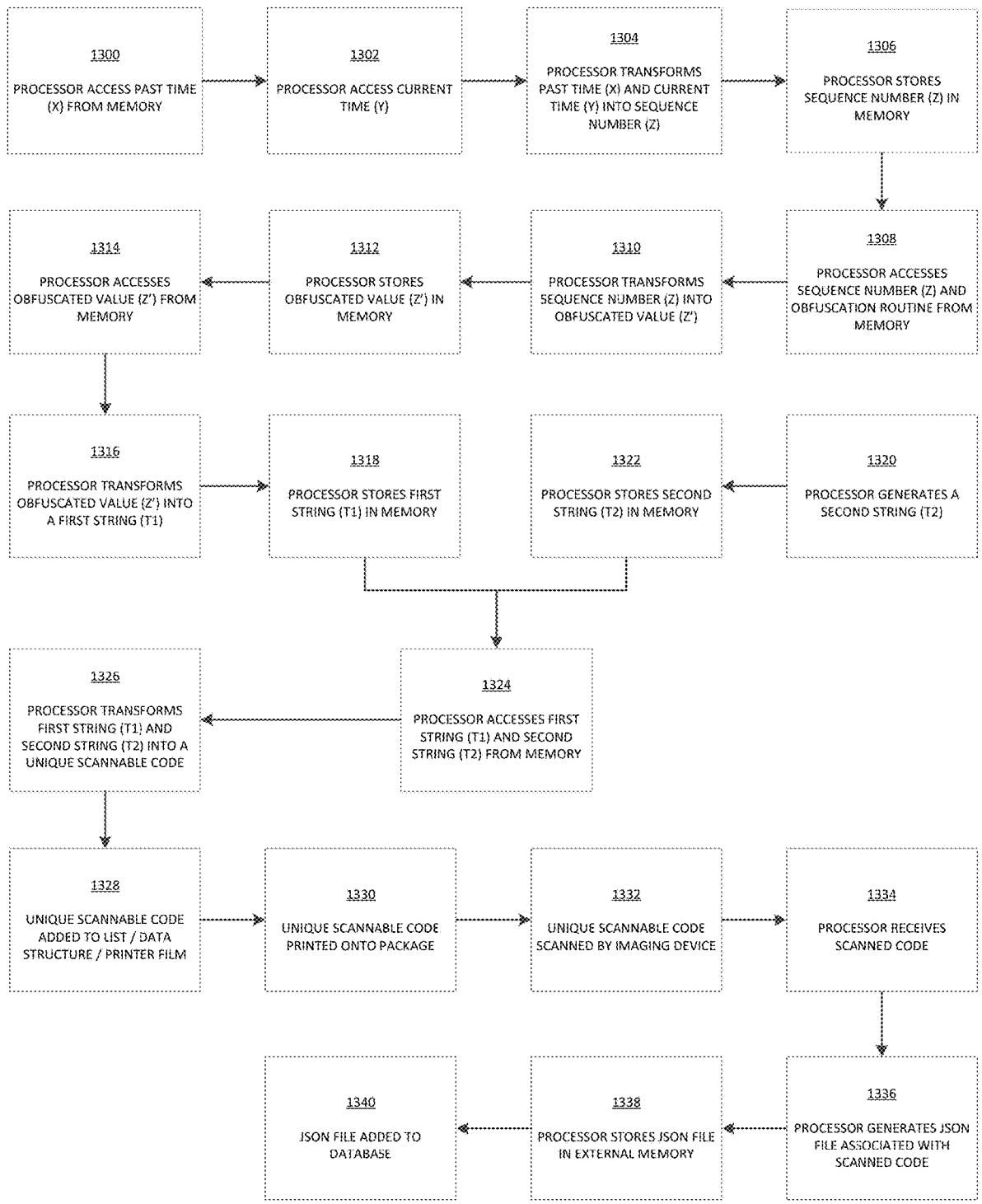

FIG. 35 is a block diagram of a system and method of the invention for creating, printing, and managing unique scannable codes.

Figure 36:
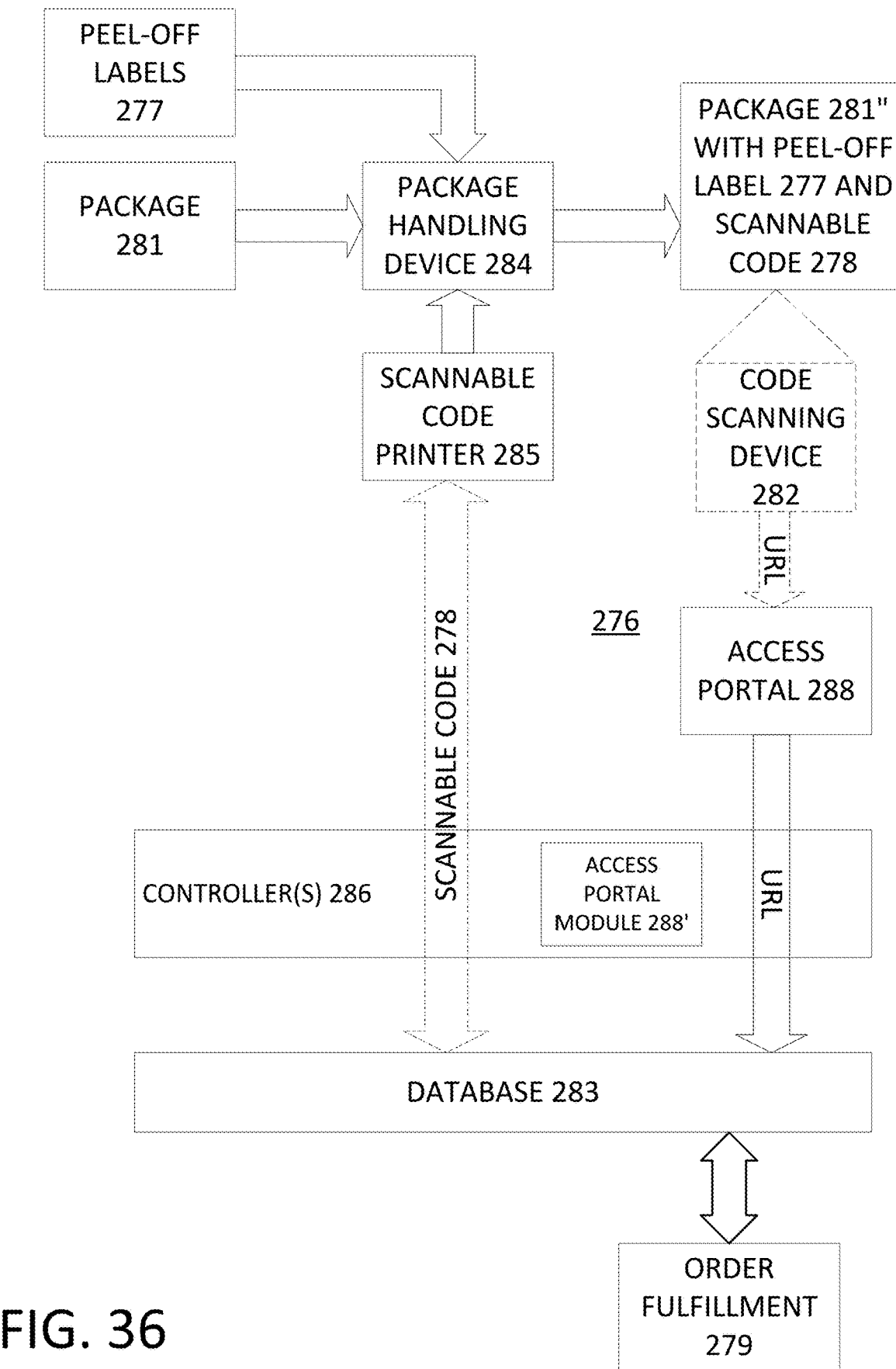

FIG. 36 illustrates one embodiment of systems and methods for use with product packages having scannable codes and peel-off labels for use with a code scanning device for scanning the scannable codes of the product packages.

Figure 36A:
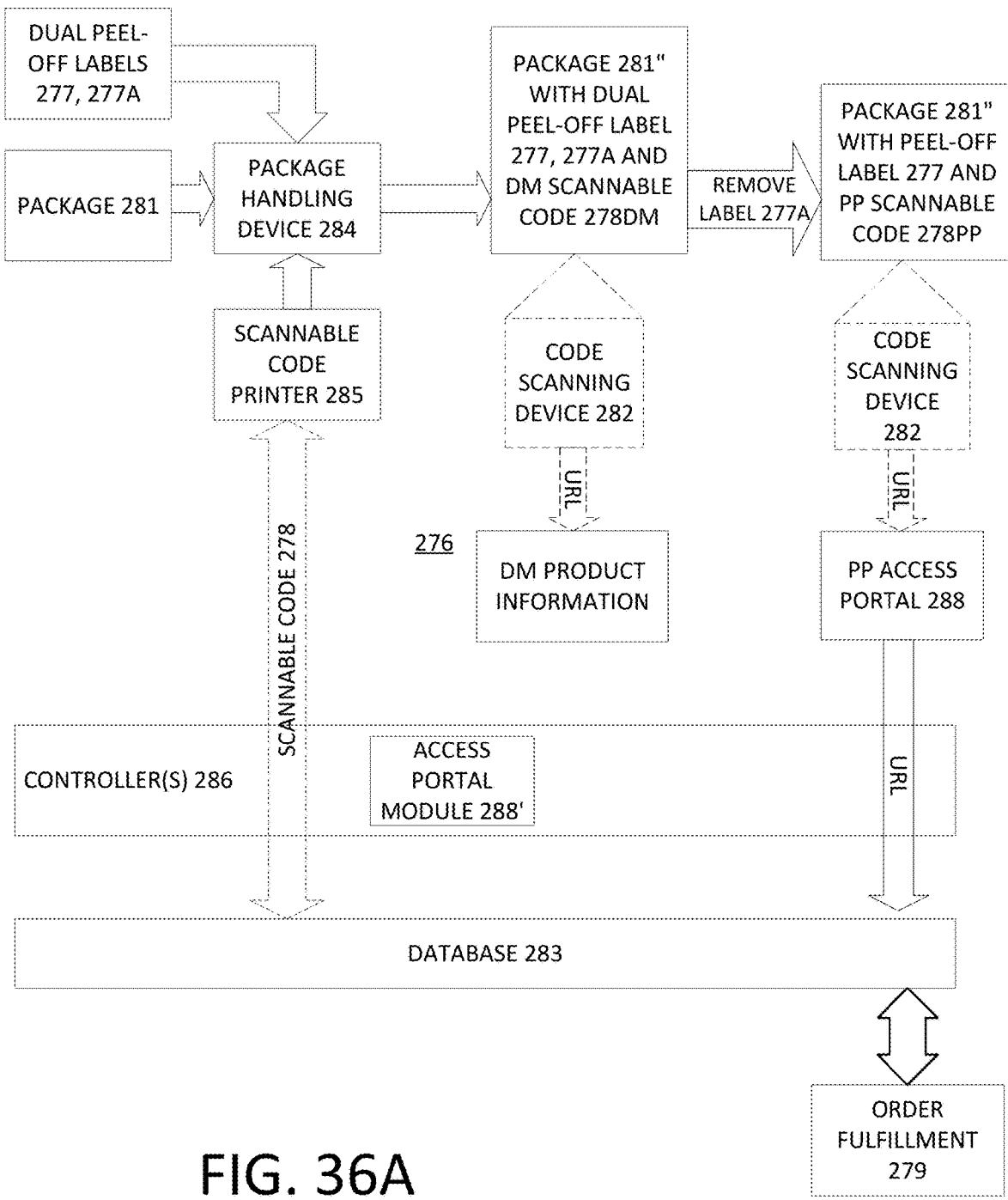

FIG. 36A illustrates one embodiment of systems and methods for use with product packages having a peel-off layer having dual layers 277, 277A.

Figure 37:
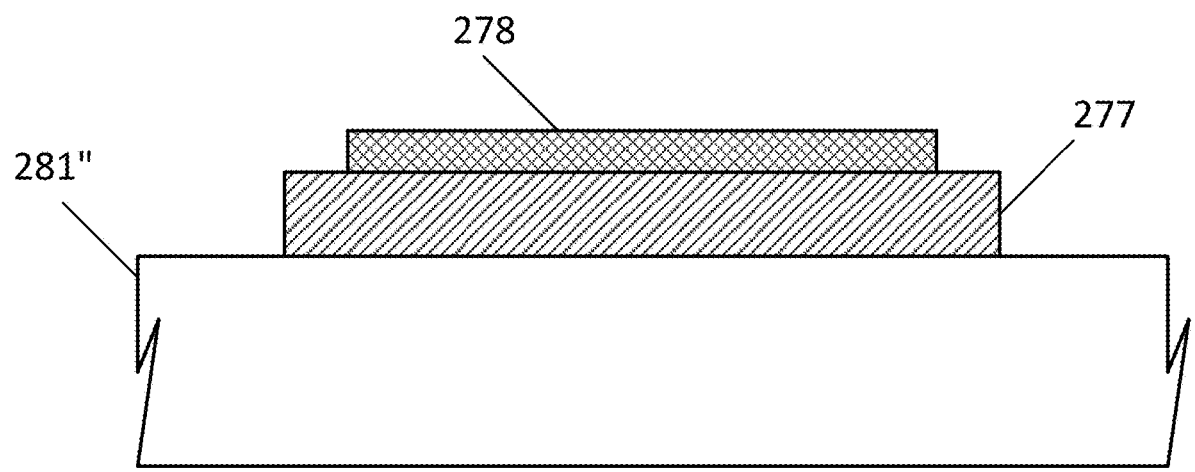

FIG. 37 illustrates a cross-section view of a product package a peel-off label 277, a unique scannable code 278, and a product package 281", according to one embodiment of the invention.

Figure 37A:
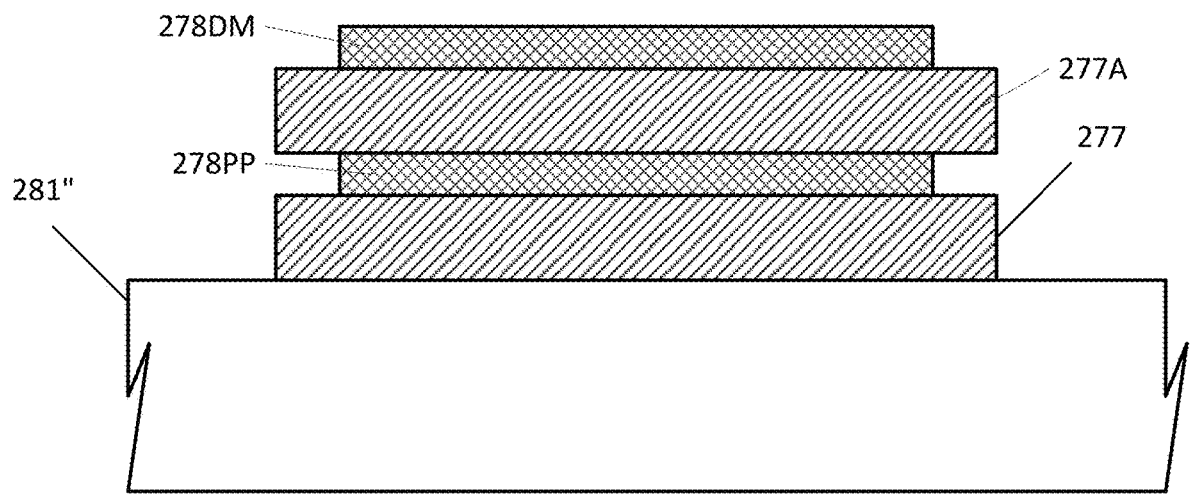

FIG. 37A illustrates a cross-section view of a product package having a lower peel-off layer 277 (i.e., substrate), a unique scannable code 278PP (e.g., PACKPRINT) on the lower layer 277 which is applied to a product package 281", according to one embodiment of the invention.

FIG. 38 is a block diagram of a system and method of the invention illustrating interaction with social media.

DETAILED DESCRIPTION

The present invention includes inline filling and packaging process systems and methods which allow customized products to be tailored to each store, which matches preferences to local store demographics and/or which supports the local causes in which shoppers are interested. Systems and methods of the invention enable manufacturers to produce retail-ready personalized packaging (RRPP) which are produced and may be tracked from the beginning of the manufacturing process through to the retail outlet. In addition, the systems and methods provide marketing tools to track feedback by the consumer regarding a specific customized product (e.g., customized package) received by the consumer. In one form, RRPP is defined as: consumer package paid acts which have been produced to provide custom content which may include individualized, variable, internal configurations as well as variable imaging on the packaging which is targeted to a geographic or demographic market segment, produced in such a way that on-the-fly production is sequenced for efficient delivery with bulk shipping units (pallets). The pallets are constructed such that they require minimal handling for the retail environment while maintaining superior marketability, RRPP is produced through a continuous process, minimizing or eliminating costly factory line changeovers.

Figure 1:
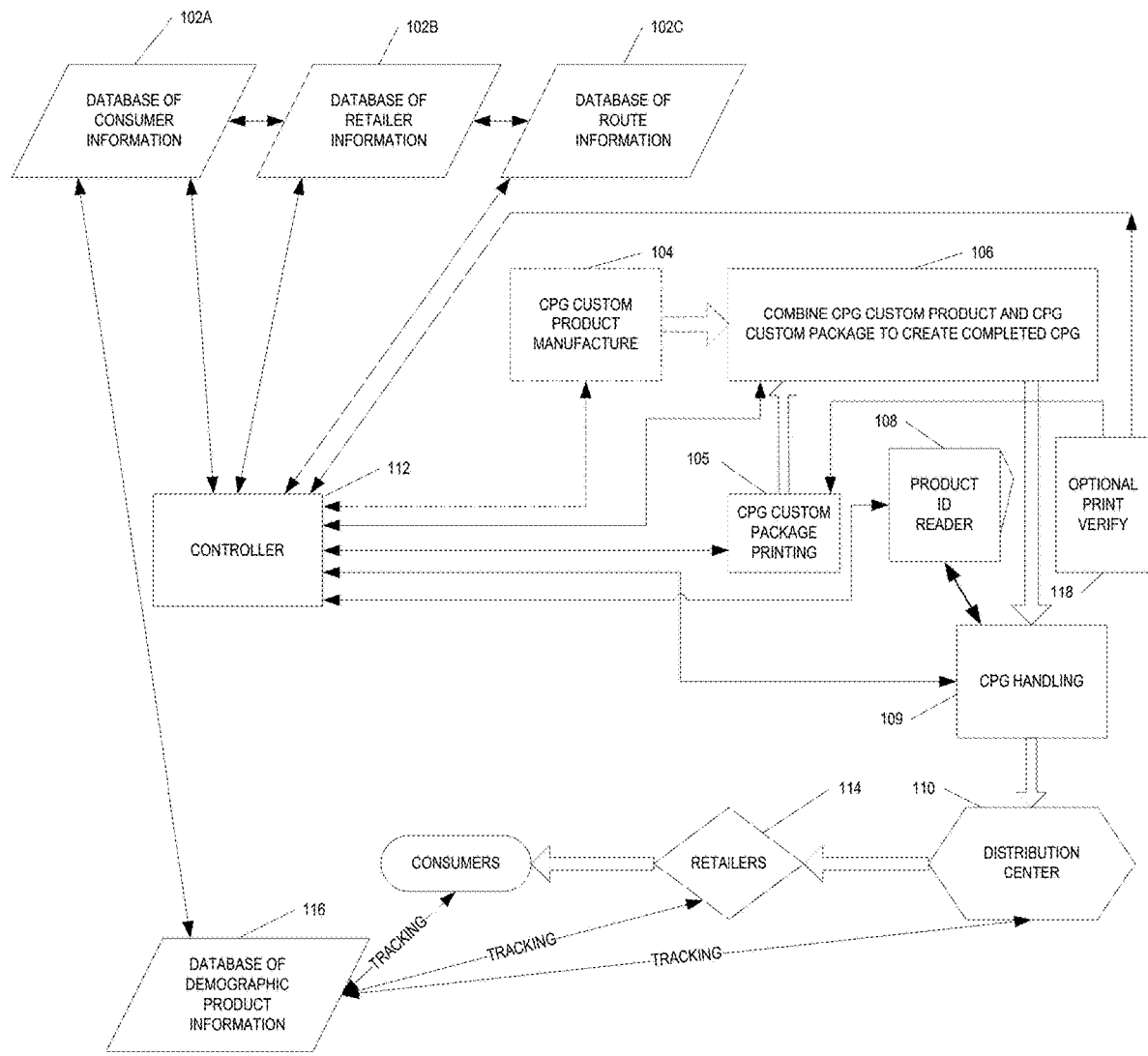
FIG. 1 is a block diagram of one embodiment of a systems and methods and method of the invention for the manufacture of custom products anchor custom packages based on consumer and retailer information and based on demographic product and/or package information.

Database Driven Systems and Methods for Customizing and Routing (FIG. 1)

The present invention includes inline filling and packaging process systems and methods which allow customized products to be tailored to each store, which matches preferences to local store demographics and/or which supports the local causes in which shoppers are interested. Systems and methods of the invention enable manufacturers to produce retail-ready personalized packaging (RRPP) which are produced and may be tracked from the beginning of the manufacturing process through to the retail outlet. In addition, the systems and methods provide marketing tools to track feedback by the consumer regarding a specific customized product (e.g., customized package) received by the consumer. In one form, RRPP is defined as: consumer package products which have been produced to provide custom content which may include individualized, variable, internal configurations as well as variable imaging on the packaging which is targeted to a geographic or demographic market segment, produced in such a way that on-the-fly production is sequenced for efficient delivery with bulk slopping units (pallets). The pallets are constructed such that they require minimal handling for the retail environment while maintaining superior marketability. RRPP is produced through a continuous process, minimizing or eliminating costly factory line changeovers.

Systems and methods of the invention enable manufacturers to create precise retailer-specific, demographically tailored RRPP unique to channel and trade partners, and uniquely compelling to consumers. In one embodiment, systems and methods of the invention enable manufacturers to create products matched to individual shopper psychographics and palletized to specific store-level demographics and produced in delivery route sequence. In some embodiments, systems and methods of the invention enable manufacturers to build mixed-case pallets in the warehouse for each account and load trucks based on stops, rather than by SKU. Instead of a forecast-order-shipping model, systems and methods of the invention enable manufacturers to implement a replenishment model based on actual demand. The manufacturer may then replenish stock every few days or even every day based on what is sold and adjusted for special circumstances, like a promo.

In general, in one aspect, systems and methods and method of the invention individually track each product from manufacture to its destination on the pallet. This allows the systems and methods to produce individually customized products wherein each product may have a different version. Different versions of a product include:
  (a) products having different internal configurations and different packaging (e.g., variable imaging on the packaging), or
  (b) products having the same internal configuration and different packaging, or
  (c) products having different internal configurations and the same packaging.

For example, if the product is a sport drink, it could have different colors (e.g., ingredients) and different packaging or it could have the same color with different packaging or it could have different colors and the same or similar packaging.

Thus, systems and methods of the invention can produce the following types of route sequenced customized pallets:
  (1) one pallet having multiple versions of a product (e.g., different ingredients and/or different packaging) on the same pallet. This one pallet has products for delivery to multiple destinations. For example, certain tiers or cases from the pallet are intended for delivery to a particular retailer. Other tiers or cases from the same pallet are intended for delivery to a different retailer. Each tier or case may be composed of the same or different versions of a product.
  (2) one pallet having multiple versions of a product on the same pallet. This one pallet is for delivery to one retailer. For example, one pallet intended for a particular retailer would have different versions of a product.
  (3) multiple pallets and multiple versions of a product are produced with only one version of the product on each pallet. Each pallet would have a specific destination. For example, one pallet having one version of a product would go to the one retailer and another pallet having a different version of the product would go to a different retailer.

In this embodiment as illustrated in FIG. 1, a database driven systems and methods of consumer based information is used to control and produce on the fly variable imaging of product packaging and on the fly routing of products after imaging so that individual products may be tracked. This intelligent systems and methods include a database having regional information and/or individual information about consumers. This information would be linked to various individualized or regionalized packaging graphics to be added to packages. For example, the packaging could be customized for a particular retail outlet based upon known demographics or database. Various levels of granularity are contemplated. The database would also provide routing information (which could be printed on the packaging) to direct the customized products to stores in specific geographic locations adjacent to specific demographic concentrations. As a specific example, packaging may be customized for a particular local event, such as a music festival, i.e., localized segmenting, to provide a personal experience and ties to the community. Alternatively, the database information could be used to direct custom printed packaging into batches of products, each batch to be sent to one of various, particular locations such that they are produced on the line in Route Sequenced order. Route sequenced order provides the additional efficiency of being able to deliver targeted product (retail ready pallets) to end destinations without extra handling. Alternatively, packaging may include customized tracking which may or may not be embedded in coupon information.

Further to the description of embodiment, above, the manufacturing process may be controlled to provide customized product makeup or content based upon information contained within the database, such that each individual destination could have a customized makeup or selection of components within the package which in turn contains the database driven imaging. This technique could also be utilized on a product by product basis and combined with the variable imaging to produce several unique products concurrently from a single manufacturing line. The synchronization of the customized product makeup and customized imaging provide additional benefits over each component separately.

As illustrated in FIG. 1, systems and methods 101 includes a database 102 including consumer, retailer and/or route information. For example, the database 102 may have a data record A of a consumer A served by a first retailer, a data record B of a consumer B served by the first retailer, a data record C of a consumer C served by a second retailer and data record D of a consumer D served by the second retailer, wherein the data records are different from each other, wherein the consumers are different from each other, and wherein the retailers are different from each other. The systems and methods also include a product supply system 104 for supplying a product A associated with the data record A, for supplying a product B associated with the data record B, for supplying a product C associated with the data record C, and for supplying a product D associated with the data record D. In one embodiment, the supply system 104 may be a CPG custom product manufacturing system, although it is also contemplated that products may be pre-manufactured.

Next, a marking system 106 applies a unique identifier to each unit of the products. The identifier may be a variable image printed on the packaging or on a label applied to the existing packaging of the product. For example, the identifier may be one or more of: a QR (quick response) 2-dimensional bar code; an RFID tag or code; a unique pattern or graphic which can be uniquely identified (e.g., a picture of a person which can be identified by face recognition software); an infrared code; and/or other markings, either visible or not within the visible light spectrum. Alternatively or in addition, systems and methods can also track unit products by encoding, tracking and monitoring the linear movement of each uniquely identified unit thereby knowing the location of each unit at any instant in time. Alternatively or in addition, the marking may be a label having one or more of the above.

In addition, the marking system 106 may combine a consumer package goods (CPG) custom product with a CPG custom package to create a completed CPG with unique elements. For example, the marking systems and methods applies an element A including information A from the data record A to the product A, applies an element B including information B from the data record B to the product B, applies an element C including information C from the data record C to the product C, and applies an element D including information D from the data record D to the product D, wherein the information is different from each other and wherein the elements are different from each other, and/or wherein the products are different from each other. As shown in FIG. 1, it is also contemplated that the marking system 106 may be part of a CPG custom package printing 107. Alternatively, the marking system 106 may have several subsystems and methods located at different places. For example, the CPG custom product manufacturing system 104 may add the unique identifier to each product and the CPG custom package printing systems and methods and/or the marking system 106 may applied the unique elements to each package, based on the package record.

Next, an identification system 108, such as a product ID reader, identifies each of the products A, B, C, D so that CPG handling 109 via a distribution center 110 is able to individually distributes each of the identified products A and B to the first retailer and for distributing the identified products C and D to the second retailer. In one embodiment, the distribution systems and methods would include a CPG handling systems and methods and a distribution center.

Database Populated Based on Product Tracking and Feedback (FIG. 1)

In this embodiment as illustrated in FIG. 1, product packaging is imaged with variable content prior to delivery to the packing line. Each product package type is uniquely identified so that each type of product package can be tracked. As each product is produced the individual identification is read by the identification system 108 and associated with the database 102 which may contain package parameters related to the date, time of manufacture, the machine which produced the product, raw materials or components used in the production, quality parameters reported from the production process as well as package parameters for custom content, image files and package parameters which may be printed on the product during the manufacturing and packaging process. Logistical information related to distribution such as the intended destination is tracked by the controller 112 and the line is controlled to provide route sequenced product pallets.

Products are shipped to distribution centers 110 and then delivered to retailers 114. When products are scanned and sold by a retailer, the information is collected by the retailer and provided as feedback to be added to a database 116. The product packaging may also include a coupon or other feature such as a barcode or a QR code that can be tracked when redeemed or scanned by a consumer 120. The feature would provide feedback for database 116. The database 116 would allow the collection of logistical information regarding the point of purchase as compared to the demographic information connected to various products, packaging, customers and their locations. For example, a certain area having a high purchase rate of a particular type of product and/or packaging would suggest that other similar products and/or packages should be targeted to the certain area. The feedback and tracking information in database 116 may be used by database 102 to provide similar products and/or packages in the future so that future products are produced and distributed based on the feedback and tracking information. Also, database 116 can easily define quantities needed at a particular location and the most effective product mix based on past sales and feedback.

In one embodiment, the packaging may include promotions which direct a consumer to a website (e.g., a social networking site such as facebook.com) to provide direct consumer feedback. When using the website, the user would identify the particular package by its codes, such as by scanning or providing the number of the code. Thus, the feedback provided by the consumer could be matched to individual package.

Figure 2:
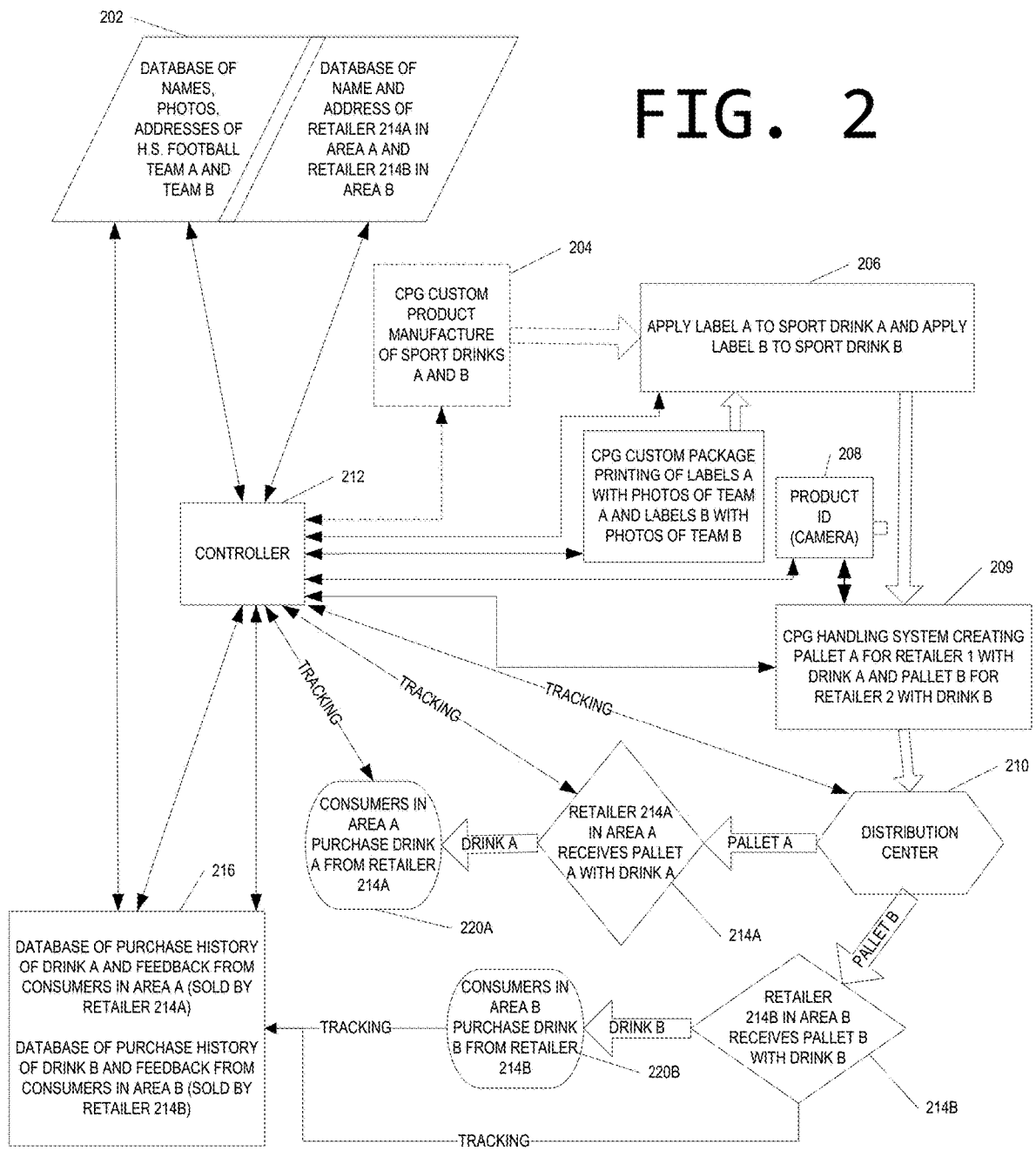
FIG. 2 is a block diagram of one embodiment of a systems and methods and method of the invention for the manufacture, distribution and tracking of a custom sports drink with custom marks based on local teams and retailer information and based on previous purchase history of the sports drink.
Figure 3:
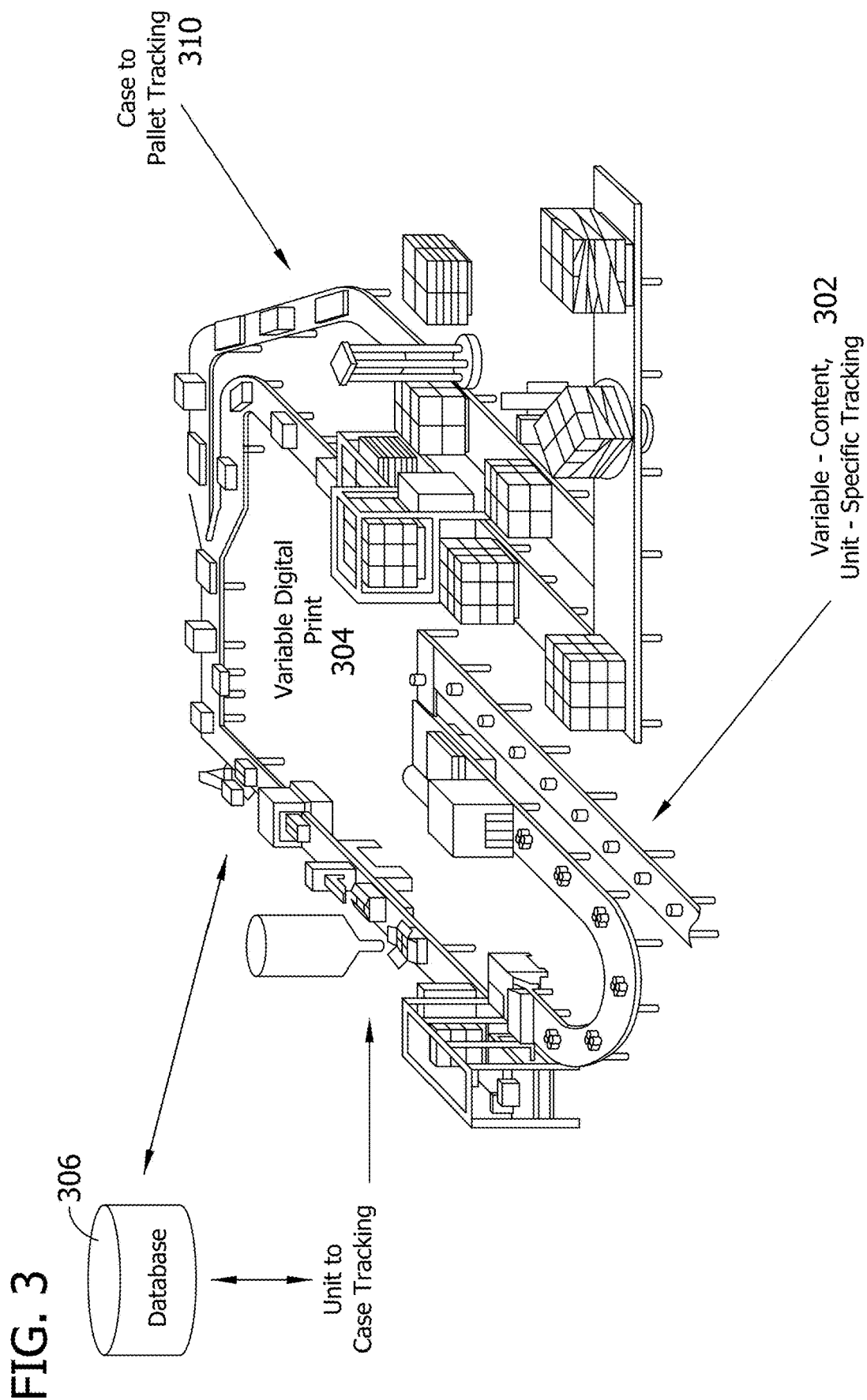
FIG. 3 is a perspective view of one embodiment of a product line according to the invention.

Variable Package Parameters Printing—Tracking Each Product (FIGS. 1-3)

Historically, variable print applications within the CPG processes relate to time, lot or batch and are not product specific on an individual, on-the-fly, piece by piece basis. An important feature of implementation of embodiments of the invention is that the variable print by the marking system 106, which may include a CPG custom package printing system, be controlled by controller 112 on a piece by piece basis, driven from a database file of database 102. According to the invention, each individual product (not a batch) is individually tracked throughout the process and systems and methods as shown in FIGS. 1-3. One way of tracking is that each individual product carries a unique, individual identifier, such as a bar code, a QR (quick response) mark, a 2-d bar code, an RFID tag, a pattern or graphic which could be matched (e.g., image recognition), an infrared code, some other marking not within the visible light spectrum or any other marking or tracking. For example, the systems and methods can also track each product by its unique chain space position (linear tracking) as it progresses through the systems and methods.

Each individual product has an individual data file unique to it and associated with it. The data file contains package parameters, the print data, sequencing information and other control information which is further disclosed and described herein.

In one embodiment, the mark used to track each product is applied to the product as part of its manufacture by system 104 and/or as part of the printing of is packaging as printed by system 107. Alternatively or in addition, pre-printed packaging or labels may be used to uniquely identify each package.

Historically, CPG processes utilize a homogenous product and process, such that each product that comes off of the line is as like the next as possible. The RRPP process provides for the ability to create product (e.g., packaging) which may vary in content, or appearance on a piece by piece basis, although it is contemplated that two different uniquely marked products may have at least some similar aspects or may be identical except for their unique id mark. The specific variable content may include an individual component, ingredient or a selection of physical components and can also include messaging, imaging, or attaching supplemental marks and is an integral part of each data record within the database. The database file for a particular product may include a PCT (Product Configuration Type) Code which may include a binary map to indicate which components, ingredients, or processes each piece will receive or which may include a discrete code which is referenced to a data table which contains the specific content for each PCT.

Synchronous and Asynchronous Process Tracking

Individualized and customized products require precise tracking of each individual piece throughout the manufacturing process. Tracking individual products is done with one or more of the following schemes.

Synchronous product tracking methodology includes using incremental and absolute positioning encoders to track motion of the products and manufacturing lines. For example, photocells and cameras (product verification devices) are used in conjunction with discrete tracking logic to verify that products reach each check point (product verification check-point). If a product does not reach a verification point within a predetermined window of machine motion, it is faulted and no further processes will be initiated on that product/position on the line. The product that was faulted will be reordered and remanufactured based on the information for that product within, its individual data file of package parameters.

Asynchronous product tracking methodology includes using variable data print technology to print a specific number or code to identify each individual piece. The code is referenced back to the database so each time that product, code is detected via a barcode reader or camera based vision device, it can be validated for proper sequence, position and can be resynchronized for additional product specific process to be applied to the product.

Fields for Database Driven Manufacturing

The production of customized sequenced products requires the associated database 102 which contains the specific instructions on how the product will be customized, processed and handled. These instructions are encoded within fields within the database 102. These fields may include but are not limited to:

Data Fields: Package parameters fields contain printable text and may also contain specific format information related to the text regarding font, size, orientation, and position of each unique unit of product.

Image Fields: Similar to data fields, image fields include variable images for each unit of product and may be cross linked to an associated image file. Using this methodology keeps the database smaller in size by putting the large graphic files in a separate file which may be stored in a separate location or even on the printer which will print the image. Storing the data on the printer also minimizes the amount of data which must be transferred for each product/print event.

PCT Field: Product Configuration Type fields contain the information which drives the variable content and process controls.

Packaging Control: This field contains information that is used for subsequent processing including stacking, carton and pallet control. The designations within this field are used to determine the end of carton/destination groupings for the control of downstream handling devices. In addition in the event of a reorder, when the replacement part is made, it is referenced to the products currently being manufactured to determine if it needs additional handling or if it can be included in the current destination grouping.

Location Fields: This field identifies pallet location and product location on the pallet.

Destination Field: This field identifies the final destination of a product or pallet.

Types of Records

In one embodiment, the data format defines types of records which are used by the controller 112 and/or by one or more of local controllers of the various subsystems and methods (e.g., manufacture 104, marking 106, identification 108, CPG handling 109), including one or more of:

Production Records
Customer/Profile Records
Delivery Route Information
Retail Unit Information
Message Records
Setup Records
File Identification Records
Block Status Records A Production Record contains most or all of the data needed to produce one product. It contains the data for one subscriber or customer such as name and address. The format and contents of Production Records are discussed later in this document.

A Message Record contains fixed text data that may be used for one or more products. It contains fixed text data such as a message or announcement that is to be printed on multiple products. The format and contents of Message Records are discussed later in this document.

A Setup Record contains system setup data. For example, this data may specify demographic makeup codes and pocket assignments, or the placement of print on the products. Various production runs may require different system setups. The operator could enter this data by hand via the user interface, or load a setup file instead. The format and contents of Setup Records are discussed later in this document.

A File Identification Record (or File ID Record) contains identification information about the disk or tape file. On magnetic tape media, a File ID Record separates the tape files in a multi-file volume. The format and contents of File ID Records are later in this document.

A Block Status Record applies to disk files only. It is used to delimit a disk file in a way that is similar to the blocking method of records on a magnetic tape. When transferring a tape file to disk, there would be one Block Status Record for each Physical Tape Block (PTB) on the magnetic tape. The Block Status Record contains the tape read status for the corresponding PTB. The format and contents of Status Records are discussed later in this document.

FIG. 2—An Example of One Embodiment

FIG. 2 is a block diagram of one embodiment of a systems and methods of the invention for the manufacture, distribution and tracking of a custom sports drink with custom marks based on local teams and retailer information and based on previous purchase history of the sports drink.

In FIG. 2, a systems and methods 200 includes a database 202 of information regarding a first demographic group A in a first area A and a second demographic group B in a second area B. In particular, database 202 includes the names, photos and addresses of high school football team A and team B. The database 202 also includes a listing of first retailers 214A in the first area and second retailers 214B in the second area. In particular, first retailers 214A are located in an area where team A plays and second retailers 214B are located in an area where team B plays.

The system 200 also includes a supply systems and methods 204 for supplying a first product according to information in the database regarding the first demographic group and for supplying a second product according to information in the database regarding the second demographic group. In particular, supply system 204 supplies sports drink A which targets team A and supplies sports drink B targeting team B. A marking system 206 applies a first mark to the first products and applies a second mark to the second products. The first mark includes information front the database regarding the first demographic group and the second mark includes information from the database regarding the second demographic group. In particular, marking system 206 applies photos of team A to the first products and applies photos or team B to the second products. As noted above, the photos come from the database 202 and are organized by demographic and/or geographic information (e.g., team A in area A and team B in area B).

An identification system 208 identifies the first and second products. In particular, sport drink A is identified and tracked and sports drink B is identified and tracked. Each individual drink container may carry a unique code to identify it. Alternatively, the custom printing on each individual package could be scanned and evaluated. For example, the identification system 208 may include image recognition software which could be matched against the database 202. Since the pictures of team A are on sports drink A and since pictures of team B are on sports drink B, identifying the picture on each individual drink package indicates whether it drink A or drink B.

A CPG handling system 209 via a distribution center 210 distributes the identified first products to the first retailers in the first area and distributes the second products to the second retailers in the second area. A controller linked to the database 202 and the identification system 208 provides information to and controls the operation of the supplying system 204, the marking system 206 and the distribution center 210. In particular, the distribution center 210 separates and routes drink A onto pallet A for shipping to retailer 214A in area A where team A plays. Consumers 220A in area A are then able to purchase drink A which has been targeted to area A and the drink A includes pictures of their local football team A. Similarly, the distribution center 210 separates and routes drink B onto pallet B for shipping to retailer 214B in area B where team B plays. Consumers 220B in area B are then able to purchase drink B which has been targeted to area B and the drink B includes pictures of their football team B.

As noted above, the database 202 may include a database 216 of purchase history of drink A and feedback from consumers in area A sold by retailer 214A. This information allows the drinks A and B to be distributed in the future based on the feedback information. For example, if sales are increasing in area A and decreasing in area B, more of drink A could be manufactured and delivered to area A and less of drink B to area B.

Figure 4B:
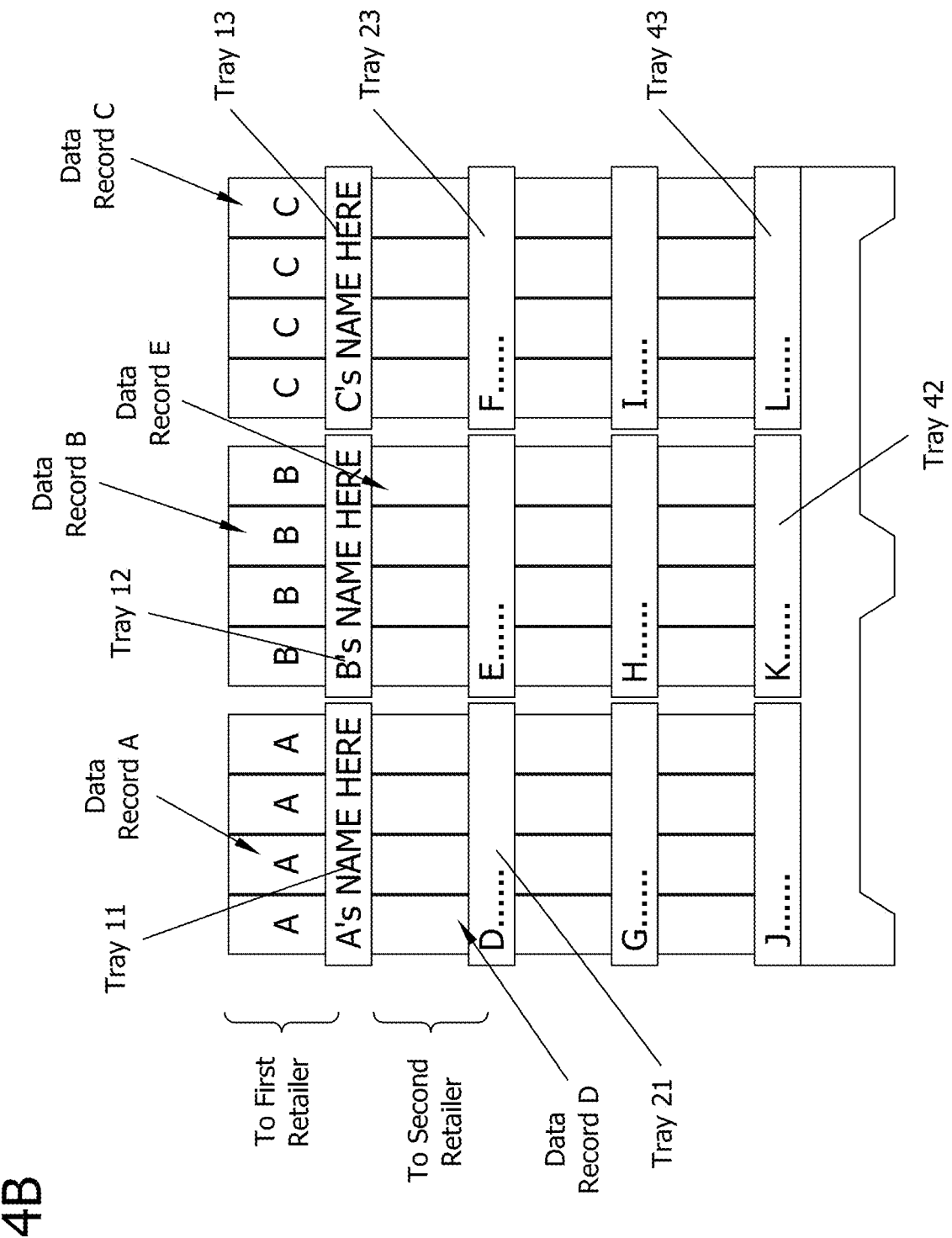

Route Sequenced Customized Pallet (FIGS. 4A and 4B)

As shown in FIGS. 4A and 4B, the distribution of the products may be controlled at a pallet level. FIG. 4A is an illustration of one embodiment of a route sequenced, customized pallet according to the invention.

In this embodiment, the boxes are manufactured to correspond to the carrier which is specific to a specific demographic group (school in this embodiment). The cases are grouped vertically to correspond to a second demographic (school district). Multiple school districts are combined based upon demographics into a single pallet built for a specific retail outlet. The demographic/geographic profile of the retail outlet determines the schools and school districts that will be represented on the pallet.

The above components of the systems and methods are coordinated and eon trolled by a controller 112 linked to the database 102, and linked to the identification system 108 for controlling the operation of the product supply system 104, the marking system 106 and the distribution center 110.

Thus, in one embodiment, the invention comprises a systems and methods, such as illustrated in FIGS. 1-3 for producing a store specific pallet in route sequence as illustrated in FIG. 4A. In particular, as shown in FIG. 1, the database 102 contains multiple files needed for producing RRPP. Zip codes may be used to designate specific geographical areas for this embodiment but other geographical designations are envisioned. Demographic/Psychographic coded customer databases (AAA, BBB, CCC, for illustration) contain geographic zip-code designations as well as personal information 102A. Retail outlets are associated with the zip-code areas that the retail outlets primarily serve 102B. Further, retail outlets are grouped by route and indexed by delivery order 102C. To create a run sequence file, the quantity of product for each retail unit, and the demographic group(s) which are to be targeted for each specific retail unit are used in conjunction with the database to produce a specific run sequence that delivers product grouped at the retail level containing the demographic groups selected within the retail units zip-codes that it serves. Further, the sequences in which the retail unit groupings are produced are in order relative to delivery route. For example, in one embodiment the invention comprises a systems and methods, such as illustrated in FIG. 1 for producing a store specific pallet in route sequence as illustrated in FIG. 4A or 4B.

In particular, as shown in FIG. 1, the database 102 provides information regarding the demographic groups and quantity for each retail destination. For illustration retailer A requires 5000 units of product and serves 53168, 53179, 53104, 53105 and 53139. The promotion for the product is tailored for three specific demographic groups (AAA, BBB, CCC). The systems and methods will scan the database of demographic groups and build a run file for that retail unit that includes only the intersection of specified database elements. In the event that the quantity of product needed is greater than the intersection of the selected variables, items may be duplicated. As FIG. 1 illustrates, database 102 contains elements of customer information 102A (demographic information). Retailer Information 102B (demand and location), and delivery route information 102C. The controller 112 uses these elements to create a specific product production list. As production is started products having custom variable images and data 104 are printed to the standard packages 105. Where downstream processes are not linearly tracked (asynchronous to the print), an extra code is added to the product such as a barcode so that it may be specifically identified later in the process. As packages are printed the print verify function 115 is executed which assures that the controller 112 can correctly associate the proper database information to a specific product/package. The custom printed packages are combined with the products 106. The printing of the package may occur before or after the product has been combined with the package. Product is tracked through the machine to the handling process where it is grouped and packed for distribution. Product tracking may not always be possible using linear motion tracking. When this is the case, products are identified at critical sortation points along the process utilizing a product ID reader (typically a camera). As product is tracked through the CPG handling 109, the processes is controlled so that product is grouped/stacked/palletized based upon the database/retail/route information such that each final bulk unit (pallet) is retail unit specific with specific content based on the local demographic profile.

Thus, in another embodiment, the invention comprises a systems and methods, such as illustrated in FIGS. 1-3 for producing a route sequence pallet as illustrated in FIG. 4B. For example, the top tier may include product A within tray 11 and product B within tray 12. Trays 11 and 12 including products A and B would be delivered to a first retailer. Similarly, the second tier may include product C within tray 12 and product D within tray 23. Trays 12 and 23 including products C and D would be delivered to a second, different retailer. Tray 11 could have products printed with custom graphics A and the tray could be printed with the same or related graphics. Similarly, tray 12 could have products printed with custom graphics B and the tray could be printed with the same or related graphics.

In particular, as shown in FIG. 2, the database 202 provides information regarding the first demographic group A in the first area A, the second demographic group B in the second area B, the first retailers 214A in the first area A and the second retailers 214B in the second area B. The marking system 206 applies the first mark (label A) to the products wherein the first mark targets the first demographic group A in the first area A. The marking systems and methods also applies the second mark (label B) to the products wherein the second mark targets the second demographic group B in the second area B. The identification systems and methods (camera 208) identifies the first products (drink A) having the first mark (label A) and identifies the second products (drink B) having the second mark (label B). The distribution system 210 distributes the identified first products (drink A) to the first retailers 214A in the first area A and distributes the second products (drink B) to the second retailers B in the second area B. The controller 212 is linked to the database 202 and is responsive to the identification system 208 for controlling the operation of the marking system 206 and the distribution system 210. As shown in FIG. 4B, drink A would be positioned on the top tier for delivery to the first retailer 214A and drink B would be positioned on the second tier for delivery to the second retailer 214B. Retailer 214A would get the first delivery of the top tier followed by retailer 214B getting the next delivery of the second tier. As a result, the pallet of FIG. 4B comprises a route sequenced, customized pallet, customized for sequential delivery to retailer 214A and then to retailer 214B. This results in a destination specific customized product package uniquely positioned on the route sequenced, customized pallet.

It is also contemplated that only certain parts of a tray would have drink A for delivery to retailer 214A. It is also contemplated that a tray may include both drinks A and B for delivery to a retailer. For example, if a retailer sells more of drink A than drink B, a tray could be configured to have more of drink A (e.g., a tray of 16 could have 10 of drink A and 6 of drink B).

FIG. 3

FIG. 3 is a perspective view of one embodiment of a product line according to the invention. At 302, products are supplied to the line having variable content with markings that permit unit-specific tracking, as noted herein. At 304, two variable digital print stations print information such as tracking marks and/or demographic specific information on the products (or labels for the products), each product having a unit-specific marking. The database 306 is linked to the systems and methods to provide unit to ease tracking of each unit of product and to provide the demographic information. Finally, the distribution systems and methods 310 provides case to pallet tracking of each individual unit.

The route sequenced, customized pallet may be configured with tiers and/or trays (carriers) that are designated for delivery at different locations. The pallets are loaded in reverse order to permit sequential delivery without the need to re-assemble or reorganize the pallet alter each delivery.

Optional Feature: Print Verify

Historically, variable print applications within CPG processes relate to time, lot or batch and are not product specific on an individual piece by piece basis. Essential to the implementation of certain embodiments of the invention is an assurance that the specific information on each piece be correct on a piece by piece basis. Variable inkjet printing is not by itself reliably deterministic that a given message/image/data will be printed on the piece the control systems and methods has sent the data for. An optional but important aspect of embodiments of the invention is a print verification system 118 and/or process, for example, an inkjet printer may be monitored by the print verify system 118 for several signals and protocol elements. It is the combined monitoring of these signals which provides the assurance and confirmation from the print verify system 118 to the controller 112 that the expected print is on the expected product. If the processing of a given piece is in error, corrective action is taken based upon the type of error and machine parameters.

Optional Feature: Reorder and Re-Sequencing

Historically, variable print applications within CPG processes relate to time, lot or batch and are not product specific on an individual piece by piece basis the result of this is that an improperly printed message or damaged product is of no consequence to the manufacturing process. An optional but important implementation of embodiments of the invention includes the methodology and systems and methods within the controller 112 which not only identifies bad, damaged, or missing product but which allows for that specific product to be re-entered (reordered) into the manufacturing process. This assures that all products are completed. Products that, are reordered may not be able to be put back into the original sequence position. For example, the system 101 may have algorithms that allow it to handle this situation in the most efficient way possible which may include separate processing of the reorder, diverting it for alternate handling or delaying the reorder to be batched with other reorders. Control algorithms within the system 101 make adjustments for the missing process for subsequent processes such as stacking and palletization devices.

Figure 5:
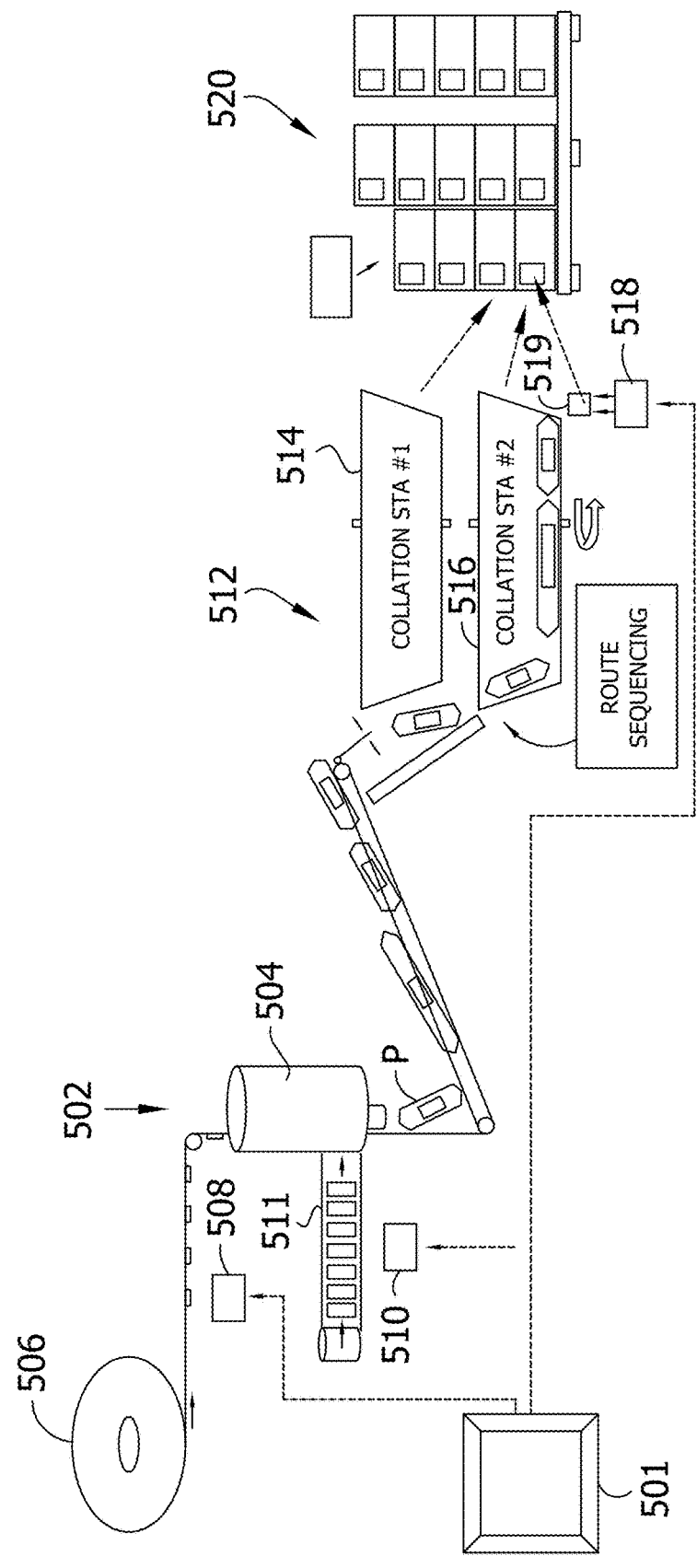
FIG. 5 is an illustration of one embodiment of the invention incorporated within a packaging line providing products with a private label gaming and targeted promotion initiative for a convenience store. In particular.

FIG. 5—Convenience Store Illustration

FIG. 5 is an illustration of one embodiment of the invention within a packaging line providing products with a private label gaming and targeted promotion initiative for a convenience store. FIG. 5 embodies one possible implementation of an embodiment with applied scratch-off layer printed on a package. Other implementations may be phased or partially implemented. Custom content may be added at any one or more of three locations.

Although illustrated as part of a form, fill and seal process, any manufactured product or process 502/504 may be substituted according to the systems and methods as illustrated in FIG. 5. The systems and methods are controlled by an imaging package line controller 501 which interfaces with a database or an existing manufacturing execution system (MES) planning system. Such MES system typically comprise a manufacturing tool designed and built for manufacturing. Most manufacturing companies use a planning process to determine what products are to be manufactured. Once that plan has been developed, there must be a translation of the plan that deals with real resources that are currently available. What is necessary is a systems and methods to take input from the planning system and translate that plan into a language that fits the plant floor and the resources required to execute the plan—a major role for the MES. Interlacing the packaging and imaging control 501 with MES is an aspect of the database interface. The quantity of product to be made, status information and raw material information may all be associated with the products created by the packaging and imaging control system. This provides a mechanism where individual products may be tracked back to not only the time and manufacturing or packaging line from winch it was produced, but also the raw materials used and other variables that part of that process.

Product from a core manufacturing process 502 (e.g., corn chips supplied by a batching process) are supplied to a packaging machine such as a form, fill, seal and label machine 504 which creates individual packages P from a packaging roll 506 of a web of sequential packages. In phase 1, a printer 508 prints an individual, unique promotional code or other promotional feature on each, sequential individual package of the continuous web of sequential packages which is formed by the form, fill and seal machine into individual products. The code or feature may be covered by a scratch-off layer. At Custom Content Location #2, a high resolution variable imaging printer 510 prints onto a peel off label applied at 511 with unique, variable printed information which is applied to each unique, individual package.

Next is the area where delivery route and/or store sequenced layering and palletization is implemented. A conveyor transports each unique, individual package to an existing pallet stacking system 512 (e.g., a versioning and package flow separator which diverts products to particular stations). Optionally, in Route Sequencing (custom content location #3), collation stations #1, #2 (e.g., a routing bin or turntable) 514, 516 will create delivery route store-sequenced pallets 520 wherein each layer is slated for delivery to a particular retailer. In general, route sequencing includes route and store sequenced cartoning and palletization with targeted custom content. An identification system identifies each unique package so the routing bin/turntable 514 knows where to place each unique package within the stack of the pallet. In one embodiment, the identification system includes a variable image carton label printer 518, with embedded pallet position and/or delivery route detail, which prints or embeds a pallet position label 519 on each unique package in accordance with a delivery route detail. Communication between the various components may be via a wired or wireless high-speed Ethernet network or a Profibus™ communication backbone network.

Mobile Personalization Module Embodiment (FIGS. 6-13)

FIG. 6 is an illustration of one embodiment of the invention added to an existing packaging line, such as a form, fill and seal machine. In this embodiment, a mobile personalization module (MPM) 602 is added to the existing packaging line to add a private label, gaming and/or targeted promotion or other initiative to the packaging of products as the products are being manufactured. In particular, FIG. 6 illustrates an embodiment with an applied thermal transfer overprinting (TTO) layer applied to packaging (and/or labels) on the fly as the packaging is being prepared to receive products. Alternatively, the MPM may be positioned after a product is packaged to mark the packages of the product.

The existing packaging systems and methods as shown in FIG. 6 includes a packaging roll unwind 604 which will provide a plastic film such as Mylar® to be formed into a bag or to be used as some other package. The typical machine is loaded with a continuous flat roll of a web of plastic film, which will have labeling and artwork applied to the exterior or interior of the film. Note that while plastic is the most commonly used packaging material in the food industry, the technology can also be used to form continuous paper and fabric product containers by changing the edge sealing/seaming systems and methods. In general, almost every type of packaging allows printing and/or adding unique identification marks as noted herein.

For a form, fill and seal machine, after printing by an existing TTO layer application device, the film approaches the back of a long hollow conical tube, and when the center of the plastic is near the tube, the outer edges of the film form flaps that wrap around the conical tube. The film is pulled downward around the outside of the tube and a vertical heat-sealing bar clamps onto the edges of the film bonding the film by melting the seam edges together.

To start the bagging process, a horizontal sealing bar clamps across the bottom edge of the tube, bonding the film together, and cutting off any film below. The sealed tube end is then lowered onto a precision weighing table and the product to be bagged is dispensed through the long conical tube in the center of the bag.

When the gross weight of the product-filled bag is reached, filling stops, and the horizontal sealing bar seals the top of the bag, and simultaneously forms the bottom of the next bag above. This bag is then cut off from the tube and is now a sealed package, ready to advance onward into the product boxing and shipping processes.

During the final sealing process, the bag may be filled with air from a blower or from an inert gas supply. Inflating the bag helps reduce the crushing of fragile products such as potato chips, while inflating with an inert gas helps drive out oxygen and retards the growth of bacteria that would spoil the product.

In one form, the invention is a portable, modular, self standing unit (herein a MPM or mobile personalization module) MPM 602 that can be temporarily or permanently located between the existing packaging roll unwind and the bagging process. Generally, but not necessarily, the MPM 602 would be positioned along a film 606 being unwound from the packaging roll unwind 604 after printing of the film but before forming of the film into a package. The MPM 602 may include a database of information regarding various demographic groups in various neighborhoods, and also includes information regarding various retailers in various neighborhoods. The database may be resident within the MPM 602 or it may be remote from the MPM, accessible by the MPM via a wired or wireless network. The MPM 602 also includes a marking system for applying unique, individualized marks such as 2-D bar codes to at least some of the sections of the film that will be formed into a package. Individualized marks are applied to target demographics group, to target consumers of each retailer and/or to target neighborhoods. The MPM 602 would include one or more cameras or readers for reading the printing on the packaging and/or for reading the marks.

Coordination between the MPM 602 and a controller of the packaging machine (e.g., the form, fill and seal machine) can be accomplished is various ways, in one embodiment, the MPM 602 and the packaging machine may am independent of each other. In another embodiment, the MPM 602 may control the rate at which the web proceeds through the packaging machine so that the MPM 602 has auxiliary control of the packaging machine or other OEM equipment, resulting in the printing, labeling and packaging being coordinated. In another embodiment, the packaging machine may control the rate at which the web proceeds through the MPM 602. Any of these embodiments may require a buffer or intermediate control between the MPM and the packaging machine.

For example, the MPM illustrated in FIG. 6 includes a TTO Promo Print-On-Pack device 608 positioned along the film followed by camera #1, followed by a Scratch Off Layer (SOL) Device 610 for applying SOLs followed by camera #2. In this configuration, the TTO Promo Print-On-Pack device 608 would include the database or means for accessing the database. The TTO Promo Print-On-Pack device 608 would provide information to the Scratch Off Layer Device 610 regarding the specific 2-D marking to apply to a particular section of film. The specific marking would be associated with a specific demographic or retailer or neighborhood.

Camera #1 would continuously read the position of the film and provide the position information to the Scratch Off Layer Device 610 and would activate the device when a mark should be printed. Camera #1 could read registration marks on the film or it could be looking for a particular graphic printed on the film in order to orient the location of the film relative to the Scratch Off Layer Device. Optional camera #2 is positioned after the TTO layer and scratch off layer are applied to the film 606 by the Scratch Off Layer Device 610. Camera #2 verifies the mark and could look to verify that the applied mark is in the right location, that the mark is readable, and that the mark includes the proper information. Camera #2 is connected to an archive which cross references the mark and thus the particular package to the demographic, retailer or neighborhood being targeted.

The mark applied to the film 606 may involve gaming or couponing or other promotions. Preferably, the mark it related to a program of target marketing and/or cross branding. One purpose of the program may be to provide shopper loyalty and insight into a shopper's buying preferences. Because each mark is unique (or each group of marks may be unique), the MPM 602 facilitates versioning by neighborhood and tracking of each product. Although the above indicates the mark as a TTO layer, the mark may be any unique indicator, such as a serial number, a variable QR code or a simple or complex bar code.

Individual products may be tracked as noted herein. For example, the product can be tracked at the point of sale or it can be tracked when a consumer responds to the TTO layer or when the consumer otherwise takes advantage of the promotion related to the TTO layer. This tracking information is matched to the original archived record of the mark to provide feedback and additional information regarding demographics, neighborhoods, retailers and/or preferences to further define and modify the program being implemented. In this way, future packaging cap be more or less specifically targeted depending on the feedback and the program involved.

The MPM 602 may be on wheels, on a palette or otherwise movable and positionable along the film. In one embodiment, the MPM 602 is configured for use with various types of films and packaging system so that it can be moved from one packaging line to another line to mark products. It is also contemplated that the MPM 602 may be configured for a specific line and used intermittently with the line. In this configuration, the MPM would be selectively moved into position to mark selected products runs made on the specific Sine.

FIG. 7 illustrates a stand-alone mobile personalization module (MPM) 700 for use in conjunction with a typical roll 701 of product packaging material (PPM) packages. MPM 700 may be an add-on feature to an existing manufacturing process line, giving added value, intelligence, additional utility and functionality to the line without the need to modify the line. The module 700 comprises the next generation retail ready personalized packaging (RRPP) module, also referred to as an "on pack mobile personalization module," The module 700 includes an adjustable frame assembly 702 for positioning one or two or more "Communicator II" thermal transfer overprinting devices 704, or some other printer, along a web 705 provided by the roll 701. After printing and layering, the web 705 may be provided to a typical bagger unit (not shown) or it may be provided to a rewind roll 706 having a driver 707, such as a motor, for revolving the rewind roll 706 to pull the web 705 through the module 700 and to take up the web after printing and layering.

The web 705 unwinds from roll 701 and passes through an adjustable film feed guide 708. The web is supported by rollers 710, 712 and the TTO printers 704 are positioned by the subassembly 702 between the rollers. Additional rollers (not shown) may be used to support the web. Adjacent, the lower TTO printer 704A is a first camera 714 for reading the web position as the web 705 moves past the TTO printer 704A and first camera 704. The camera 714 may read a graphic, a mark printed by TTO printer 704A and/or an index mark on the web to track web position. Based on the information provided by the first camera 704 to a processor of a controller module (see FIG. 11), an ST 1010 label applicator 718 or some other layering device is energized to selectively apply scratch off labels supplied by a label roll 719 to the web 705 at appropriate positions on the web, essentially one label of each successive package unit along the web.

A second, optional camera 720 along the web 705 after the label applicator 718 reads the scratch off label to confirm that it has been properly positioned at the correct location on a package of the web 705.

The web is fed over the rollers 712 to a packager or bagger (not shown) or to the rewind roll 706 for use by a packager or bagger, such as a form, fill and seal machine, and for distribution.

FIG. 8 is a view of the stand-alone module of FIG. 7 taken along lines 8-8 of FIG. 7. The web 705 is a continuous, sequential series of packages P1-P5. As the web progresses upward as indicated by the arrows and as each package progresses through module 700, the lower TTO printer 704A applies a first promotion code image 750 and a first promotion image 752 to the package P1 and to the web 705. Optionally, a first ID code image 754 may also be applied. The first ID code image 754 may be a 2-dimensional UPC or QR code used for tracking the particular package and, optionally, as a registration mark 755. The first promotion code image 750 and a first promotion image 752 may be a UPC code along with text image such as "YOU WIN A FREE DRINK" (described below in more detail with regard to FIGS. 11 and 12). As the web 705 moves upward, camera 714 (and/or camera 720) monitors the position of the packages of the web 705 relative to the TTO printers 704 and labeler 718. For example, the camera 714 may read a graphic on package P1, and/or it may read the images 750, 752, 754 to determine the position of package P1 relative to the camera 714 and relative to the TTO printers 704 and to confirm the position of images 750, 752, 754. Alternatively, a photoeye or other reading device may be used in place of either or both cameras.

Next, labeler 718 applies a scratch off layer or label 756 over the first promotion code image 750 and/or the first promotion image 752 to hide one or both. Next, camera 720 may read a graphic on package P1, and/or it may read the images 750, 752, 754 to determine the position of package P1 relative to the camera 714 and relative to the TTO printers 704 and to confirm the position of the scratch off label 756. Either camera 714 or 720 is optional as one camera may be employed to track web, image and label positions. Alternatively, if some other rime of registration systems and methods are used to determine web positions, both cameras may be optional as the image and label positions do not need to be confirmed. Next, an optional upper TTO printer 704B applies a message M on the scratch off label 756. The upper TTO printer 704B is optional. For example, the labels 756 may be pre-printed with a message on them, a message may be printed on the packaging or no message is may be used. Alternatively, the labels may be printed before application to the web 705. For example, printer 704B may be supported by an adapter plate (not shown) attached to the labeler 718 and print on the label while it's on the label roll in the labeler 718 before the label is applied to the web 705.

FIG. 8 also illustrates one embodiment of the subassembly 702 in the form of a vertical support member 760 which supports TTO printer 704A, camera 714, labeler 718, camera 720 and TTO printer 704B. The posit ion of the TTO printer 704A, camera 714, labeler 718, camera 720 and TTO printer 704B each may be moved or adjusted vertically relative to member 760 so that their relative positions may be adjusted, depending on the packaging spacing and other image location factors. The vertical support member 760 is held in place by upper and lower horizontal members 762 which engage a frame 764. The vertical support member 760 moves horizontally relative to the upper and lower horizontal members 762 so that the TTO printer 704A, camera 714, labeler 718, camera 720 and TTO printer 704B move in unison to the right or left to posit ion them laterally relative to the width of the web. In one embodiment, the horizontal members 762 comprise a threaded shaft engaging a nut 763 on vertical support member 760. By rotating the members 762 such as by cranking handles 766 (or by activating motors) the vertical member 760 is moved laterally left to right, or vice versa. As a result, cranking the handles 766 simultaneously moves TTO printer 704A, camera 714, labeler 718, camera 720 and TTO printer 704B left to right, or vice versa to position them relative to the width of the web. As a result, the cameras can be properly positioned to read the graphics or other indexing marks on the web and the printers and labeler can be positioned to print and label the appropriate locations on the web.

FIGS. 9-10 further illustrate the elements (e.g., printing, layers, labels) applied to the web by the module 700. FIG. 9 is a partial, exploded side view of the stand-alone module 700 of FIG. 7, illustrating the various elements of printing and labels applied to the web 705. FIG. 10 is an exploded, partial side view of the thermal transfer overprinting (TTO) printer 704B and the web 705 of PPM package after the images and scratch layer have been applied.

As the web 705 is pulled upward (arrow 722) by the rewind roll 706, five different elements are applied to each package, although some of these elements are optional. As the web progresses upward and as each package progresses through module 700, the lower TTO printer 704A applies the first promotion code image 750 and the first promotion image 752 to the web 705 on the fly. The optional first ID code image 754 is also be applied. As the web 705 moves upward, camera 714 (and/or camera 720) monitors the position of the packages of the web 705 relative to the TTO printers 704 and labeler 718. Next as the web moves up, labeler 718 applies a scratch off layer or label 756 over the first promotion code image 750 and/or over the first promotion image 752 to hide them both. Next, camera 720 may read a graphic on package P1, and/or it may read the images 750, 752, 754 to determine the position of package P1 relative to the camera 714 and relative to the TTO printers 704 and to confirm the position of the scratch off label 756. Next, the upper TTO printer 704B applies a message M on the scratch off label 756 on the fly.

FIG. 11 is a plan view of an image on a web, according to one embodiment of the invention. All five elements have been applied to the web but only the scratch off label 756, message M on the scratch label and the first ID code image are visible. FIG. 12A is a plan view of the image of FIG. 12A. A portion of the scratch layer 756 within area 757 carrying the message M has been removed, so that FIG. 12A illustrates the first promotion code image 750 and the first promotion image 752. FIG. 12A also illustrates an optional registration mark 755. The size, position, content and/or other features of these elements may vary.

FIGS. 12B and 12C are a plan view of an instant win version and a non-instant win version of FIG. 12A. In this embodiment, certain products are marked and tracked to include an instant win indication as illustrated in FIG. 12B. A scratch off layer 112 covers a coupon 774 including a code 775 which when scanned provides the bearer with a benefit, in this example 50 cents off a regular drink. In this embodiment, certain other products are marked and tracked to include a non-instant win indication as illustrated in FIG. 12C. A scratch off layer 776 covers a coupon 778 including a code 779 which when entered at a website (e.g., enteracode.com) may provide the bearer with a benefit. After the bearer enters the code 779 at the website, the hearer may be provided with a coupon or other benefit and/or the bearer may be provided with a questionnaire which elicits information from the bearer to assist its providing demographic or preference information useful for offering future products, services and/or promotions. In addition, the information provided by the bearer may allow detailed tracking of the individual product from manufacture to purchase to the end user. A unique, additional tracking code (not shown) may be added to each product or package for tracking and/or identification purposes.

FIG. 13 is a block diagram of the stand-alone module 700 of FIG. 7, according to one embodiment of the invention in which a processor 800 controls and coordinates operation of the various components. The processor 800 accesses a database or memory 802 including data files (records) of information including codes and messages to be applied to a web. An operator uses a keypad 804 and display 806 to input and view various parameters of the module 700. The processor 800 may be connected to a driver controller 808 which controls the driver 707 driving the rewind roll 706, although the driver 707 may operate independently of the processor 800. Driver controller 808 is shown in phantom as it is an optional part of the module 700. Since the cameras 714, 720 are monitoring web and image location, the processor 800 does not necessarily need to control the driver 707.

In one embodiment, the driver 707 is set to drive the rewind roll 707 at a constant speed and the processor 800 turns the driver on and off. In response to the sensed position of the web 705 as indicated to the processor 800 by either or both cameras 714, 720, the processor 800 instructs the lower TTO printer 704A to print the first promotion code image 750, the first promotion image 752 and the first ID code image 754 on the web 705 at the appropriate location. Also, in response to the sensed position of the web 705 as indicated to the processor 800 by cameras 714, 720, the processor 800 instructs labeler 718 to apply the scratch off label 756 over the first promotion code image 750 and the first promotion image 752 to hide them both. Next, in response to the sensed position of the web 705 as indicated to the processor 800 by cameras 714, 720, the processor 800 instructs the upper TTO printer 704B to print the message M on the label 756 at the appropriate location. As noted herein, the printing and label applications occur on the fly as the web 705 moves upward through the module 700. In some configurations, an input/output module may be located between the processor 800 and one or more of the other components illustrated in FIG. 13 in order to condition processor signals provided to one of the components and/or in order to condition signals provided by one or more of the components to the processor. Also, in order to facilitate timing of the various components, a real time kernel clock, e.g., Ardence RTX, may be used to provide a time reference for the systems and methods of FIG. 13. Not all images and codes are required, depending on the type of promotion or tracking desired.

In one embodiment, the invention comprises a systems and methods for promoting and tracking products and for receiving feedback from consumers of the products. For example, bags of potato chips to be provided to a particular store may have several different promotions. Each bag or group of bags is marked with a unique ID code image 754 which may be used to track and sort the bags for delivery at the particular store location. Each bag or group of bags is also marked with a unique promotion code image 750. The bags may have the same or different promotion images 752 and the same or different messages M. When a consumer purchases a bag and scratches off the SOL 756, the consumer responds to the promotion image 752. This means the consumer may "cash in" on an offer or discount that is provided and/or the consumer may be directed to a website (e.g., a social networking site). If the consumer accesses the website, the consumer may be provided with a survey to obtain consumer preferences and/or the consumer may be rewarded with additional promotions. At the website, the consumer may be requested to provide a scan of the unique ID code image (or provide its number or other identifying aspect) on the consumer's package and/or to provide a scan of the unique promotion code image (or number) on the consumer's package. As a result, the bag supplier is able to track individual bags and obtain feedback as to which products and promotions are preferred or not preferred by consumers.

As another example, bags or group of bags of potato chips to be provided to a particular store may be have several different promotions and bags or group of bags of pretzels to be provided to the same particular store may have several different promotions. Each bag or group of bags is marked with its unique ID code image 754 which may be used to track and sort the bags for delivery at the particular store location, as noted herein. Each bag or group of bags is also marked with its unique promotion code image 750. Sales of the bags can be monitored to determine consumer preferences to potato chips vs. pretzels and to particular promotions provided with each. As a result, the bag supplier is able to track individual bags and obtain feedback as to whether chips or pretzels and their related promotions are preferred or not preferred by consumers. Depending on the type of feedback desired and types of promotions, sorting bags for delivery may be optional.

As yet another example, bags or group of bags of potato chips to be provided to a particular store may have several different promotions and bags or group of bags of pretzels to be provided to the same particular store may have several different promotions. Each chip bag or group of bags is marked with a first unique ID code image 754 which may be used to track and sort the bags for delivery at the particular store. Each chip bag or group of bags is also marked with a first unique promotion code image 750. Each pretzel bag or group of bags is marked with a second unique ID code image 754 which may be used to track and sort the bags for delivery at the particular store. Each pretzel bag or group of bags is also marked with a second unique promotion code image 750. Sales of the bags can be monitored to determine consumer preferences to potato chips vs. pretzels and to particular promotions provided with each. As a result, the bag supplier is able to track individual bags and obtain feedback as to whether chips or pretzels and their related promotions are preferred or not preferred by consumers. Routing and delivery of bags may also be controlled by the unique ID code images so that certain bags may be sent a particular location. For example, chip bags may be sent to one location and pretzel bags to another or certain chip bags certain pretzel bags can be sent to one location and other bags can be sent to other locations.

In general, the first promotion codes may be different from the second promotion codes; the first 3D codes may be different from the second ID codes; and the first promotions may be different from the second promotions.

Each of the first and second promotion codes may be unique; each of the first and second ID codes may be unique; and each of the first and second promotions may be unique. Alternatively, the first promotion codes may be the same as the second promotion codes, the first ID codes may be different from the second ID codes; the first promotions may be the same as the second promotions; each of the first and second promotion codes may be the same; each of the first and second ID codes may be same; and each of the first and second promotions may be same. Any combination of the above scenarios is also contemplated and is possible with the invention, particularly because the invention in one form is database driven to apply the codes and promotions on the fly and the ID codes allow tracking of each product or group of products.

In summary, the module 700 is for use with a product packaging delivery system for supplying a plurality of product packaging material (PPM) packages such as a web 705 of continuous packages. The module 700 includes the memory 802 including a first data record for first products and defining the first ID code, the first promotion and the first promotion code. In addition, the memory includes a second data record for second products and defining the second ID code, the second promotion and the second promotion code. The first products may be same or different than the second products. A printing system such as TTO printer 704A apply to a selected number of the PPM packages a first image comprising the first ID code image 754 corresponding to the first ID code, the first promotion image 752 corresponding to the first promotion, and the first promotion code image 750 corresponding to the first promotion code. In addition, the printing system applies to a selected number of the PPM packages a second image comprising the second ID code image 754 corresponding to the second ID code, the second promotion image 752 corresponding to the second promotion, and the second promotion code image 750 corresponding to the second promotion code.

In one form, the invention comprises a method of marking individual products, distributing the marked products, tracking the marked products, managing product parameters and/or collecting feedback from consumer of the marked products.

For simplicity and convenience as described herein, the module 700, systems and methods of the invention have been described with regard to two different types of products with two different types of packaging. It is also contemplated that the module 700, systems and methods of the invention is applicable any number more than two types of products. Alternatively or in addition, the products may all be the same and each package may have its own data file and may be unique from every other package, having different codes and/or promotions. For example, each package of a product would have its own unique ID code, promotion code and promotion. Other combinations are also contemplated wherein some but not all packages would have the same ID code but different promotions and promotion codes, or some but not all packages would have the same promotion code but different promotions and ID codes, and/or some but not all packages would have the same promotions but different promotion codes and ID codes. Furthermore, messages on the SOLs, if there are any, may be the same or different. All these variations allow a supplier to test market various products in various channels of distribution with various promotions or incentives. The unique codes allow tracking of the products after purchase as the products can be identified when promotions are redeemed or when a customer provides information via a website (e.g., a social networking site) or questionnaire site or feature or mobile phone app.

As noted herein, the various combinations also allow control and tracking of the distribution of products so that particular products, particular packaging and/or particular promotions may be targeted to a specific geographic area and/or to a specific consumer or group of consumers.

A layering system such as SOL labeler 718 applies a removable layer (SOL 756) over a portion of the first image so that the applied removable layer (SOL 756) covers the first promotion image 752 and covers the first promotion code image 750 but does not cover the first ID code image 754. The layering system also applies the removable layer (SOL 756) over a portion of the second image so that the applied removable layer covers the second promotion image 752 and covers the second promotion code image 750 but does not cover the second ID code image 754. An additional printing system for applying a message image on each of the removable layers.

A controller 800 is linked to the memory 802, the printing system 704A, the layering system 718 and the additional printing system 704B for controlling the operation of the printing system 704A, the layering system 718 and the additional printing system 704B to print the first image on some of the PPM packages partially covered by the removable SOL, to print the second image on the remainder of the PPM packages partially covered by the removable SOL, and to print the message image on each of the removable SOLs. As a result, the first number of the PPM packages for use with the first products have the first ID code image and the removable layer having the message visible thereon and having the first promotion image and the first promotion code image under the removable layer and not visible. Similarly, the second number of the PPM packages for use with the second products have the second ID code image and the removable layer having the message visible thereon and having the second promotion image and the second promotion code image under the removable layer and not visible.

In one embodiment, the module 700 is linked to a distribution system which reads the first ID code image 754 of the first PPM packages of the first products and distributes, in response to reading the first ID codes, the first products to a first retailer. Similarly, the distribution system reads the second ID code image of the second PPM packages of the second products and distributes, in response to reading the second ID codes, the second products to a second retailer different from the first retailer. In this embodiment, information identifying the destination retailer of each product is part of the date record in the memory which is associated with each product.

As illustrated, the PPM packages may be a web of continuous packages and any imaging system may be used for monitoring images on the web to identify the location of the images on the web relative to the printers 704A, relative to the layering device 718, and relative to the additional printer 704B. The controller 800 is linked to and responsive to the imaging system for controlling the operation of the printer 704A, the layering device 718, and the additional printer 704B.

In one embodiment, the web includes a registration mark or other indicator instead of or in addition to the ID code for indicating a location of packages of the web. The imaging system monitors and is responsive to the registration indicator and/or ID code.

As noted above, the relative alignment of the printers, labeler and cameras is important. Thus, a frame assembly may be used for supporting the printers 704 and the layering device 718 relative to the web. The frame assembly includes a subassembly connected to the printers and the layering device for simultaneously moving the printers and the layering device at a single unit relative to the web.

In one embodiment, the printer comprises a first TTO printer 704A for printing the first code image 750 and the first promotion image 752 on the web 705, the layering device comprises a scratch off label applicator 718 applying a scratch off label 756 to the web to cover the printed first code image 750 and to cover the pruned first promotion image 752, and the additional printer comprises a second TTO printer 704B for printing the message image M on the scratch off label 756.

In general, the systems and methods of the invention may include any imaging system for monitoring images on the web 705 to identity the location of the images 750, 752, 754 on the web relative to the printers 704 and relative to the label applicator 718. The controller 800 is linked to and responsive to the imaging system for controlling the operation of the printers and the label applicator.

Custom Ingredients (FIG. 14)

FIG. 14 is a block diagram of one embodiment of a system 900 and method of the invention for the manufacture of CPG products having custom (variable) ingredients, optionally based on at least one of consumer information, retailer information, demographic product information and/or demographic package information. This systems and methods are applicable for the production and distribution of products to various consumers that have a sensitivity to ingredients. Such products are frequently made with a variable ingredient list and/or a date driven ingredient list. Date driven lists may change based on the date of production or various lists may have different expiration dates. The ingredient list may also change based on available ingredients at the time of production.

The system 900 includes a product supply device such as a device 904 which selectively combines one or more of ingredients A, B . . . , N in order to deliver a CPG product with custom ingredients. The device 904 sequentially, continuously supplies a plurality of products, each having a particular, unique set of ingredients. Each set of ingredients is different than another set of ingredients. For example, some products may have a set of ingredients which include wheat while others may be wheat-free. As another example, some products may have a set of ingredients which include peanuts while others may be peanut-free. As another example, some products may have a set of ingredients which include gluten while others may be gluten-free.

As a specific example, the same basic product may have different ingredients. Two types of potato chips may be sold in the same packaging. The only difference in the packaging is that packages with one type of chips would have one type of ingredients printed thereon and packages with the other type of chips would have the other type of ingredients printed thereon. One type of chips may be cooked in peanut oil whereas the other type of chips may be cooked in canola oil. Packages with the peanut oil chips would have ingredients including peanut oil printed thereon and packages with the canola oil chips would have ingredients including canola oil printed thereon. Optionally, the packages may be custom marked to indicate which type of oil was used for cooking.

A package supply device 901 supplies a plurality of packages, one package for each of the plurality of products, simultaneously with the supply of custom ingredient products supplied by the product supply device 904. Frequently, these packages are a pre-printed web with the product name and related graphics. The supplied packages may all be the same or they may vary. A CPG custom package printing device 905 prints on each respective package the particular set of ingredients of the product to be associated with the respective package. The printer 905 may have a built-in camera (not shown) for reading the pre-printed product on the package and printing a corresponding ingredient list, thereon. Alternatively or in addition, a printing device 905A and/or printer 902A may be located after a combining device 906 combines the products and packages to provide the printing of customized ingredients or other custom information.

In one alternative embodiment, a unique QR code is also printed on each package by a printer 902 so that each package is unique and different from every other package and each package can be individually tracked. Printer 905 may also have a built-in camera (not shown) to read packaging. Alternatively, a QR may be printed on the package which corresponds to the ingredients of the package so that products with the same ingredients would have the same QR code.

After printing of the ingredients by CPG custom package printing device 905, the combining device 906 inserts or otherwise associates each unique CPG product having a unique set of custom ingredients with the custom printed packages supplied by the package supply device 901. As a result, each custom product is associated with its custom package having its unique custom ingredients printed thereon. As an alternative, it is also contemplated that either printers 902, 905 may print the QR code and/or custom ingredients onto a label applied to the package before or after the product is associated with the package.

A controller 912 is connected to the product supply device 904, the package supply device 901 and printers 902, 905 (e.g., via the product supply device 904) and the combining device 906. The controller 912 coordinates the sequential operation of the product supply device 904, the package supply device 901, the printers 902, 905 and the combining device 906 so that each custom product is associated with its custom package having the custom ingredients printed thereon.

If a QR code printer 902 is employed, either before or after the combining device 906, an optional product QR reader 908 may be located thereafter to verify that the QR code has been printed accurately and/or to track each product. Either before or after the combining device 906, an optional verifying reader 918 may be located thereafter to verify that the custom ingredients have been printed accurately and/or to track each product based on their ingredients. The reader 908 and verifying reader 918 may be the same device or separate devices located at the same or different locations.

As the illustrated in phantom in FIG. 14, it is contemplated that one or more of the CPG handing 109, distribution center 110 and databases 102, 116 may be implemented in conjunction with the variable ingredient systems and methods of FIG. 14. The implementation would be substantially the same as illustrated and described above regarding FIGS. 1-2. For example, certain products with certain ingredients may be targeted to one retailer having certain customers whereas other products with other ingredients may be targeted to another retailer having other customers. If the products are palletized for distribution, one tier of certain products may be stacked for the first retailer and another tier of the other products stacked for another retailer, both tiers on the same pallet. Alternatively, a variety of different products with different ingredients may be targeted to a particular retailer. In this scenario, a tier having both certain and other products would be stacked on one tier of a pallet for the particular retailer.

In one embodiment, a data record stored in a tangible computer readable medium (CRM) 920 (i.e., a storage device) indicates a first number of first products having a first set of ingredients and indicates a number of second products having a second set of ingredients. The first set of ingredients is different than the second set of ingredients. The controller 912 is responsive to the data record to instruct the product supply device 904 to supply the first number of first products having the first set of ingredients. The controller is also responsive to the data record to instruct the product supply device 904 to supply the second number of second products having the first set of ingredients. In addition, the controller is responsive to the data record to instruct the printing device 905 to print the first set of ingredients on the first packages of the first products and to print the second set of ingredients on the second packages of the second products.

In one embodiment, the product supply device 904 sequentially supplies on-the-fly a first product having a first set of ingredients, a second product having a second set of ingredients, a third product having the first set of ingredients, a fourth product having the second set of ingredients from a continuous web of successive, sequential packages. The first set of ingredients is different than the second set of ingredients. In this embodiment, the printing device 905 prints the first set of ingredients on the packages associated with first and third products and prints the second set of ingredients on the packages associated with second and fourth products.

In yet another embodiment, the printing device 905 is configured for printing on each respective package the particular set of ingredients of the product to be associated with the respective package. In this embodiment, the combining device 906 is configured for associating each of the products to one of the packages after printing.

FIGS. 15-21

FIGS. 15-21 illustrate a front perspective view another embodiment of a stand-alone module 100 similar to module 700 for use in conjunction with a typical web of product packaging material (PPM) packages, according to one embodiment of the invention, in FIGS. 15-21, the following are illustrated:

Extrusions: 1, 2, 6, 7, 9-14, 22-24, 35, 41-43
Brackets: 2-4, 25, 45, 52
Anodized Rollers: 20, 21, 29, 31
Mounting Plates: 28, 30, 40, 46, 47, 49, 55
Electrical Enclosure 8
Caster Gusset 15
Light Tower 16
Casters 17
DataFlex Plus Video Jet Bracket Assembly 18
Slotted Mounting Plate 19
Slotted Mounting Plate 32
DataFlex Plus Video Jet Interface Bracket 33
DataFlex Plus Video Jet Interface 34
Encoder 36
Photo Eye Sensor 37
Computer Monitor 38
Computer Keyboard 39
Smart Vision Lights 40
DataFlex Plus Bracket Assembly 48
Red Rubberized Roller 50
Dataflex Label Applicator Interface Panel 51
Hammond Light 53
Stainless Steel Roller 54

In FIGS. 15-21, module 100 adds a layered promotion on-the-fly to a continuous moving web of sequential, individual, successive product packages. The electrical enclosure holds a computer with a memory including a plurality of data records defining a plurality of promotion codes and at least one additional data record defining a non-promotion code. The extrusions, brackets, rollers and related components noted above comprise a frame for receiving and supporting the web of packages including guides for guiding the web through the frame as the web moves through the frame. A printer (such as a Dataflex Plus Video Jet printer, not shown; see, for example, printer 704 above) is supported by brackets and an interface of the frame for printing one of the codes to one of the packages of the web. A layering device (such as a Data flex Label Applicator; see labeler 718, above) is supported by brackets and an interface of the frame for applying a removable layer (such as a SOL) to one of the packages over each of the printed codes of the packages.

A tracking system (such as a photo eye, encoder, smart vision light and/or imaging devices; for example, one or more of cameras 714, 720, above) is supported by the frame for tracking the position of each product package of the web relative to the printer and the layering device. The photo eye sensor 37 reads indexing marks on the edge of the web indicating the start or position of each package. The encoder 36 includes a friction wheel which tracks web movement and web position between indexing marks so that the position of the web and the packages relate to the printer and label application is known at any point in time. The lights illuminate the web to allow imaging devices to capture images of the graphics on the web to verify web position, proper printing and/or proper label application.

The computer held in the electrical enclosure comprises a controller linked to the memory, the printer, the layering device and the tracking system. The controller controls the timing and the operation of the printer to print the printed code at a selected location on each package. Simultaneously, the controller synchronously controls the operation of the layering device to apply one of the removable layers over the printed code at the selected location on each package. Optionally, a second printer (not shown; see for example printer 704B above) is supported by the frame and synchronously controlled by the controller for printing on the removable layer after the layering device applies the removable layer to one of the packages.

As illustrated in FIGS. 1-6, the invention includes systems and methods comprising a database, a product supply system, a marking system, an identification system, a distribution system, and a controller.

The database includes a data record A of a consumer A served by a first retailer, a data record B of a consumer B served by the first retailer, a data record C of a consumer C served by a second retailer and data record D of a consumer D served by the second retailer. The data records are different from each other, the consumers are different from each other, and the retailers are different from each other.

The product supply system supplies a product A associated with the data record A, supplies a product B associated with the data record B, f supplies a product C associated with the data record C, and supplies a product D associated with the data record D, The marking system applies a unique identifier to each product and applies an element corresponding to its unique identifier. The marking system applies an element A including information A from the data record A to the product A having unique identifier A, applies an element B including information B from the data record B to the product B having unique identifier B, applies an element C including information C from the data record C to the product C, and applies an element D including information D from the data record D to the product D, wherein the information is different from each other and wherein the elements are different from each other.

The identification system identifies each of the products A, B, C, and D. The distribution system applies the identified products A and B to the first retailer and applies the identified products C and D to the second retailer. In general, the distribution system collects and/or distributes the packages in some intelligent scheme as noted herein to various locations according to the variable images, including selective grouping, cartoning, and/or palletizing for distribution to various locations according to the variable images on the packages.

The controller linked to the database and linked to the identification system controls the operation of the product supply system, the marking system, and the distribution system.

Optionally, the database includes distribution systems and methods information, retailer information and/or consumer feedback information regarding the products from the distribution system, retailers and/or consumers of the products. The products are distributed based on the feedback information.

Optionally, the product supply system comprises a product manufacturing system manufacturing the product A in accordance with data record A, manufacturing the product B in accordance with data record B, manufacturing the product C in accordance with data record C, manufacturing the product D in accordance with data record D, wherein each of the products is different from each other.

Optionally, a print verification system monitors the product marking to confirm that each product has the correct element which corresponds to the identifier on the product.

Optionally, the controller reorders product out of order and/or re-sequences product out of sequence.

As illustrated in FIGS. 1-6, the invention includes a system comprising database, a supply system, a marking system, an identification system, a distribution system, and a controller.

The database stores information regarding a first demographic group in a first area, a second demographic group in a second area, first retailers in the first area and second retailers in the second area.

The supply system supplies a first product according to information in the database regarding the first demographic group and supplies a second product according to information in the database regarding the second demographic group.

The marking system applies a first mark to the first products and applies a second mark to the second products wherein the first mark includes information from the database regarding the first demographic group and wherein the second mark includes information front the database regarding the second demographic group.

The identification system identifies the first products and the second products.

The distribution system distributes the identified first products to the first retailers in the first area and distributes the second products to the second retailers in the second area.

The controller linked to the database and the identification system provides information to and controlling the operation of the supplying system, the marking system and the distribution system.

Optionally, the database includes distribution system information, retailer and/or consumer feedback information regarding the products from the distribution system, retailers and/or consumers of the products, and the products are distributed based on the feedback information.

As illustrated in FIGS. 1-6, the invention includes a system for use with products comprising a database, a marking system, an identification system, a distribution system, and a controller.

The database stores information regarding a first demographic group in a first area, a second demographic group in a second area, first retailers in the first area and second retailers in the second area.

The marking system applies a first mark to the products wherein the first mark targets the first demographic group in the first area. The marking system also applies a second mark to the products wherein the second mark targets the second demographic group in the second area.

The identification system identifies first products having the first mark and identifies second products having the second mark.

The distribution system distributes identified first products to the first retailers in the first area and distributes second products to the second retailers in the second area.

The controller linked to the database and responsive to the identification system controls the operation of the marking system and the distribution system.

As shown in FIGS. 1-6, the invention includes systems and methods for use with a database including a data record A of a consumer A served by a first retailer, a data record B of a consumer B served by the first retailer, a data record C of a consumer C served by a second retailer and data record D of a consumer D served by the second retailer, wherein the data records are different from each other, wherein the consumers are different from each other, and wherein the retailers are different from each other. A product A associated with the data record A is supplied. A product B associated with the data record B is supplied. A product C associated with the data record C is supplied. A product D associated with the data record D is supplied.

A mark A including information A from the data record A is applied to the product A, A mark B including information B from the data record B is applied to the product B. A mark C including information C from the data record C is applied to the product C. A mark D including information D from the data record D is applied to the product D. The information is unique and different from each other and the marks are unique and different from each other.

Each of the products A, B, C, and D is identified. The identified products A and B are distributed to the first retailer and the identified products C and D are distributed to the second retailer, different from the first retailer.

The product supply, the mark application and the distributing are controlled as a function of the database and as a function of the identifying of each of the products.

As illustrated in FIGS. 1-6, the invention includes a method comprising:
  supplying a plurality of products, each having a unique identifier;
  providing a database including a unique data record for each of the plurality of products, each data record corresponding to one of the supplied products;
  reading the unique identifier of each of the products and in response thereto applying a unique mark to each of the products including information from the record corresponding to each product;
  reading the unique identifier of each of the unique products and in response thereto distributing a first group of the unique products to a first retailer based on the records corresponding to the first group and distributing a second group of the unique products to a second retailer, different from the first retailer, based on the records corresponding to the second group; and
  controlling the product supply, the mark application and the distributing as a function of the database and as a function of the identifying of each of the products.

As shown in FIG. 14, the invention includes a systems and methods comprising a product supply device, a package supply device, a printing device, a combining device, and a controller.

The product supply device sequentially, continuously supplies a plurality of products, each having a particular set of ingredients wherein each set of ingredients is different than another set of ingredients.

The package supply device supplies a plurality of preprinted packages, one package for each of the plurality of products.

The printing device prints on each respective package the particular set of ingredients of the product associated with the respective package.

The combining device associates each of the products to one of the packages.

The controller is connected to the product supply device, the package supply device and the combining device for coordinating the sequential operation of the product supply device, the package supply device and the combining device.

Optionally, a data record stored in a tangible computer readable medium and indicates a first number of first products having a first set of ingredients and indicates a number of second products having a second set of ingredients. The first set of ingredients is different than the second set of ingredients. The controller is responsive to the data record to instruct the product supply device to supply the first number of first products having the first set of ingredients. The controller is also responsive to the data record to instruct the product supply device to supply the second number of second products having the first set of ingredients. The controller is also responsive to the data record to instruct the printing device to print the first set of ingredients on the first packages of the first products and to print the second set of ingredients on the second packages of the second products.

Optionally, the product supply device sequentially supplies a first product having a first set of ingredients, a second product having a second set of ingredients, a third product having the first set of ingredients, a fourth product having the second set of ingredients, wherein the first set of ingredients is different than the second set of ingredients; and The printing device prints the first set of ingredients on the packages associated with first and third products and prints the second set of ingredients on the packages associated with second and fourth products.

Optionally, the printing device is configured for printing on each respective package the particular set of ingredients of the product to be associated with the respective package; and wherein the combining device is configured for associating each of the products to one of the packages after printing.

In one form, a system comprises;
  A product supply system for supplying a plurality of products, each having a unique identifier;
  A database including a unique data record for each of the plurality of products, each data record corresponding to one of the supplied products;
  A marking system for reading the unique identifier of each of the products and for applying a mark to each of the products including information from the record corresponding to each product;

A distribution system for reading the unique identifier of each of the unique products and for distributing a first group of the unique products to a first retailer based on the records corresponding to the first group and for distributing a second group of the unique products to a second retailer, different from the first, retailer, based on the records corresponding to the second group; and A controller linked to the database for controlling the operation of the marking system and the distribution system based on the data records in the database.

In another form, the invention includes a systems and methods for use with a product packaging delivery system for supplying a plurality of product packaging material (PPM) packages, including a memory, a printing system, a layering system, an additional printing system and a controller.

The memory includes a first data record for first products and defining a first ID code, a first promotion and a first promotion code. The memory also includes a second data record for second products and defining a second ID code, a second promotion and a second promotion code.

The printing system applies to a first number of the PPM packages a first image comprising a first ID code image corresponding to the first ID code, a first promotion image corresponding to the first promotion, and a first pro-notion code image corresponding to the first promotion code. The printing system applies to a second number of the PPM packages a second image comprising a second ID code image corresponding to the second ID code, a second promotion image corresponding to the second promotion, and a second promotion code image corresponding to the second promotion code.

The layering system applies a removable layer over a portion of the first image so that the applied removable layer covers the first promotion image and covers the first promotion code image but does not cover the first ID code image. The layering system also applies the removable layer over a portion of the second image so that the applied removable layer covers the second promotion image and covers the second promotion code image but does not cover the second ID code image.

An additional printing system applies a message image on each of the removable layers.

A controller linked to the memory, the printing system, the layering system and the additional printing systems and methods controls the operation of the printing system, the layering system and the additional printing system to print the first image on some of the PPM packages partially covered by the removable layer, to print the second image on the remainder of the PPM packages partially covered by the removable layer, and to print the message image on each of the removable layers.

As a result, the first number of the PPM packages for use with the first products have the first ID code image, the removable layer having the message visible thereon and having the first promotion image and the first promotion code image under the removable layer and not visible. The second number of the PPM packages for use with the second products have the second ID code image, and the removable layer having the message visible thereon and having the second promotion image and the second promotion code image under the removable layer and not visible.

In another form, the invention includes systems and methods for use with a product packaging delivery system for supplying a plurality of product packaging material (PPM) packages comprising a memory, a printing system, a layering system and a controller.

The memory includes a first data record for first products which data record defines a first ID code and a first promotion. The memory also includes a second data record for second products which data record defines a second ID code and a second promotion.

The printing system applies to a first number of the PPM packages a first image comprising a first ID code image corresponding to the first ID code and a first promotion image corresponding to the first promotion. The printing system also applies to a second number of the PPM packages a second image comprising a second ID code image corresponding to the second ID code and a second promotion image corresponding to the second promotion.

The layering system applies a removable layer over a portion of the first image so that the applied removable layer covers the first promotion image but does not cover the first ID code image. The layering system also applies the removable layer over a portion of the second image so that the applied removable layer covers the second promotion image but does not cover the second ID code image.

A controller linked to the memory, the printing system, and the layering system controls the operation of the printing system, and the layering system to print the first image on some of the PPM packages partially covered by the removable layer, and to print the second image on the remainder of the PPM packages partially covered by the removable layer.

As a result, the first number of the PPM packages for use with the first products have the first ID code image and the removable layer having the first promotion image under the removable layer and not visible. The second number of the PPM packages for use with the second products have the second ID code image and the removable layer having the second promotion image under the removable layer and not visible.

It is also contemplated that the above is applicable to a continuous on-the-fly product line other than a web of packages. For example, cups and cans are frequently produced by a continuous on-the-fly product line. The above systems and methods are applicable to such product lines so a promotion, unique tracking code and layer may be applied to cups and cans before, during or after the cups and cans are formed or filled, during the continuous on-the-fly manufacture of such cups and cans.

Form, Fill & Seal Machine (FIGS. 22-25)

In one form, a database driven system 950 and method as illustrated in FIG. 22 are provided for use with a continuous, in-line moving web 952 provided by a roll 953 of flexible, continuous packing material from which successive product packages 954 are formed and filled with products. For example, the web may be part of a form, fill & seal machine 955. The system 950 includes an address database memory device 956 storing a plurality of addresses and a graphics database memory device 958 storing a plurality of images. Devices 956 and 958 may be a single device. A frame 960 engages the FFS machine 955 and receives and supports the web 952 of package forming material. It has guides (e.g., rollers R) for guiding the web 952 through the frame 960 as the web moves through the frame.

A printer 962 supported by the frame 960 adjacent the web 952 prints the images and the addresses on the web packages 954 on-the-fly as the web 952 moves through the frame 960. A sensor 964 supported by the frame 960 senses a location of the web 952 relative to the printer 962. A system controller 966 linked to the sensor 964, linked to the database memory devices 956, 958 and linked the printer 962, controls the operation of the printer 962 in response to the sensor 964.

As a result, the printer 962 prints one or more selected images from the graphics database 958 and a selected address from the address database 956 at locations along the web 952 to provide individual, successive product packages on the web. Each package includes an address and the selected image(s).

For example, FIG. 23 is a photo of an exemplary web 952 for use in a form, fill & seal machine for create a package, the web having an address 968 and a graphics image 970 printed thereon in accordance with the systems and methods herein. FIG. 24 is a photo of the front 972 of an exemplary form, fill & seal package having a lotion sample therein and having been formed from the web pictured in FIG. 23. The front 972 includes the graphic image 970. FIG. 25 is a photo of the back 974 of the exemplary form, fill & seal package having a lotion sample therein pictured in FIG. 24 and having been formed from the web pictured in FIG. 23. The back 974 includes the address 968.

In one form, the printer comprises an integrated printer-labeler as described above, so that printing occurs on either a blank or templated label as an in-line pre-operation on a web before it is formed into package and sealed. The printing and/or labeling is sequentially applied to the packaging material prior to creating a package by forming, filling and sealing the web.

Optionally, the systems and methods further comprises a distribution system for collecting and distributing the packages by mail (or similar direct-to-consumer distribution organization or methodology) to various locations according to the addresses.

In one form, the systems and methods further comprises a packaging machine for filling the packages, a packaging machine controller for controlling the operation of the packaging machine.

In one form, the controller coordinates with the packaging machine controller so that printing, and packaging are coordinated as part of one in-line, on-the-fly system.

Optionally, the systems and methods further comprises a form, fill & seal (FFS) machine having a controller for controlling its operation and further comprises a link 976 between the FFS controller and the system controller. The FFS controller is responsive to the system controller to control the operation of the FFS machine.

In one form, the systems and methods further comprises a database storing data indicative of the content of individual packages. The system controller controls the printer to create individual packages having an image and an address for a certain content. The system controller via the link indicates to the FFS controller the content to be provided to each of the individual packages.

In one form, the content of the package comprises at least one of:
  A product;
  Printed materials;
  A sample (e.g., laundry soap, lotion);
  Nutrition Sublimates; and
  A powdered drink.

In one form, the image in the graphics database is at least one of:
  A coupon;
  A game;
  A link;
  A personalized content relating to the corresponding address on the package;
  A targeted Team logo (e.g., a local sports team logo of the addressee); and
  Map graphic to local store or location.

Optionally, each of the addresses in the address database memory device corresponds to a particular image in the graphics database memory device, wherein each of the addresses corresponds to a content to be placed in a package to the address, wherein the system controller controls the printer to print each address and its corresponding image as one the packages to formed from the web and wherein the system controller controls the FFS controller to form, fill & seal the web into a package having the corresponding content, having the corresponding address and having the corresponding image.

The sensor comprises at least one of:
  An encoder for sensing a position of the web relative to the printer,
  A mark reader for sensing registration, index or other mark on the web, and
  A sensor for sensing movement of the web relative to the printer.

In one form, each of the addresses in the address database memory device corresponds to a particular image in the graphics database memory device. The system controller controls the printer to print each address and its corresponding image as one the packages is formed from the web.

In one form, the above systems and methods comprises a database driven system for use with a form, fill & seal (FFS) machine having moving web from which successive product packages are formed, filled and sealed.

In one form, an add-on systems and methods to be added to a form, fill & seal machine is provided.

In one form, an apparatus comprising a form, fill & seal (FFS) machine with the system as noted above is provided.

A database driven method for use with a form, fill & seal (FFS) machine having a moving web from which successive product packages are formed, filled and sealed, is provided. The method for use with an address database memory device storing a plurality of addresses, and a graphics database memory device storing a plurality of images.

The method, comprises:
  receiving and supporting the web of packages including guiding the web as the web moves;
  printing the images and the addresses on the packages on-the-fly as the web moves;
  sensing a location of the web; and
  controlling the printing in response to the sensing to print a selected image and a selected address at locations along the web to provide individual, successive product packages on the web wherein each package includes an address and an image.

FIGS. 26-30

FIG. 26 illustrates one embodiment of systems and methods for use with product packages having scannable codes and for use with a code scanning device for scanning the scannable codes of the product packages. In one form, each scannable code is a unique graphic image printed on a package for separately tracking each package and its specific contents.

As illustrated in FIG. 26, a system 280 is for use with product packages 281 and a code scanning device 282. A database device 283 stores a plurality of data records comprising package parameters and a plurality of unique URLs. Each data record corresponds to (e.g., is cross-referenced to) only one of a plurality of different, unique, individual scannable codes. Each scannable code corresponds to a unique URL so that each data record corresponds to a unique URL.

A package handling device 284 receives the product packages 281 and guides the packages 281 through the package handling device 284. A printer 285 associated with the package handling device 284 prints one of the scannable codes on each package 281 as the packages are guided through the package handling device 284 to result in product packages 281″, each having a unique scannable code.

A controller 286 (e.g., an access control server) is linked to the database device 283. The controller 286 comprises one or more processors, servers or computers programmed to operate as described herein. For example, the controller 286 comprises a processor programmed to manage the content of data records and control access to the data records within the database device 283 thus controlling the content of the database device 283 such as the cross-referencing of parameters to scannable codes/URLs.

A parameter portal 287 is a physical I/O (input/output) port linked to (e.g., connected to) a network such as the World Wide Web via the controller 286. The controller 286 executes a parameter portal module 287′ of software instructions stored in a tangible memory device so that the parameter portal 287 is adapted to provide to the database device 283 individual package parameters which correspond to the individual scannable code on each individual package 281′. The package parameters are added to a particular data record which corresponds to a particular individual scannable code on the particular individual package.

An access portal 288 is a physical I/O (input/output) port linked to (e.g., connected to) a network such as the World Wide Web via the controller 286. The controller 286 executes an access portal module 288′ of software instructions stored in a tangible memory device so that the access portal 288 is adapted to manage the database device 283 to control selective access to at least some of the individual package parameters stored in the database device based on the unique URL provided in response to the code scanning device.

Thus, each portal is an input/output (I/O) port of the database device 283. The controller 286 is programmed with modules to manage and control changes to the data records and access to the data records in the database device 283 via each portal.

In one form, a manufacturer or distributor applies the scannable code to the product packages 281 and accesses the database device 283 via the parameter portal 287 to store package parameters in the database device 283 which are cross-referenced to the seasonable code and its URL. The package parameters can be supplied to the database device 283 automatically via a link 289 by a processor of the package handling device 284 and/or by the printer 285 which prints the scannable code. Alternatively or in addition, the package parameters can be supplied to the database device 283 by manually entering the package parameters, although such manual entry would be significantly more time consuming than supplying the parameters automatically. The manufacturer and/or distributor also has access to some or all of the package parameters via the access portal 288.

A consumer having the product package 281′ with the scannable code can use a code scanning device 282 (e.g., a smart phone or other mobile device) to scan the code on the package 281′. The code scanning device 282 scans the code and determines the URL encoded or represented by the scannable code on the package 281′. The code scanning device 282 uses the URL via the access portal 288 to access at least some or all of the of the package parameters.

In particular, the code scanning device 282 can be configured by an application (a mobile "APP") to scan a particular scannable code on a particular package 281′ to determine the unique URL corresponding to the scanned particular scannable code. In addition, the application configures the code scanning device 282 to connect to the database device 283 via the access portal 288. As a result, the database device 283 receives via the access portal 288 the unique URL from the code scanning device 282 and provides via the access portal 288 to the code scanning device 282 at least some of the package parameters of the data record corresponding to the received unique URL. The provided package parameters are displayed to the consumer on a display of the code scanning device 282.

Optionally, the controller 286 can be linked at 290 to the printer 285 to supply to the printer at least one of the scannable codes and/or the unique URLs stored in the database device 283 for use by the printer 285 in printing the scannable codes on the packages 281. The link at 290 can be direct or indirect. A direct link includes wired or wireless communication between the printer 285 and the controller 286. An indirect link includes a transfer of codes and/or URLs via a flash drive, bulk transfer, or manual transfer.

In one form, the invention comprises database systems and methods for use with product packages 281 and a code scanning device 282. The database system includes the device 283, the controller 286 linked to the database device 283, the parameter portal 287 linked to the database device 283 via the controller 286, and the access portal 288 linked to the database device 283 via the controller 286.

In one form, the data record comprises package parameters including one or more of the following:

Package details (e.g., brand, product name)
Images of the package
Marketing Information (e.g., slogans, product description, product uses, optional offers and/or incentives)
Other Descriptive Information (e.g., flavors, care and handling; preservatives)
Manufacturing Details
Package Information (e.g., length, height, width, type (glass, plastic), size, capacity, net weight)
Product Category (e.g., fruits, nuts, baking ingredients)
Packaging Details
Logistical parameters
Retail parameters
Directions (e.g., use, recycling)
Ingredients (e.g., materials, components, additives, organics, allergens)
Nutritional Facts (e.g., calories, fat, carbs, protein)
Package Details (e.g., identification numbers)
Dates (e.g., time-based parameters, timestamps, creation, expiration)
Handling (e.g., refrigeration, hot or cold limits)
Recall Details (e.g., recall date, reason for recall)
Other Product Codes (e.g., UPC, Lot number)
Additional Messages
Tracking Points
Product Origin
Materials Origins
Processing Information
Packaging Information
Warehouse/Distribution Information
Retail Information
Last scanned location
My Product Journey Operator Details
Logistics Details
Cross-Merchandising
Gaming or Reward Systems FIG. 27 is a diagram illustrating various database inputs and their sources. A package 200 including custom printing and PACKPRINT™ code (e.g., a scannable code) begins at job planning 291 based on a library of product line detail 292. Manufacturing and ingredient detail 293 are used by a manufacturer 294 to manufacture and fill a package at 293. The manufacturer automatically or manually enters product package information relating to the manufacture in database 283. Real weights and measures 295 are determined at manufacturing, filling and/or packaging 296. The packager automatically or manually enters product package information relating to packaging in database 283. At cartoning 297 the packages, late breaking parameters 293 relating to cartoning or other aspects are entered into the database 283. At this point, quality control grouping ID's 299 can be entered into the database 283. Logistics handlers 300 such shippers, and/or other handlers of the packages 290 enter logistical parameters. Similarly, retailers 301 enter retail parameters. See FIGS. 29 and 30, below, for more details. Also, additional information can be entered at any point including after purchase and use by the consumer. For example, parameters can be updated or added and/or the consumer can comment or provide other information.

FIG. 28 is a tracking screen shot of My Product Journey which is an animated map 302 (e.g., Google® Maps) of the journey of each product package from origin to last scanned point. The map 302 can be found as the bottom of a scan or a product page of a user and tracks one or more of the following points:

A—Origin
B—Processing
C—Packaging
D—Warehouse/Distribution
E—Retail
F—Last scanned point It is also contemplated that a mobile application (mobile APP) may be provided to convey product sourcing, key supply chain journey, and to build shopper confidence and trust.

Pan and zoom functions of the map are available. A "Customer|Admin" tab at the top of the page can be added, which tab toggles between a customer view and the admin options for the page. Also, added under the admin options is the ability to add a tracking point for the package. In one form, the admin user would scan the product, navigate to the admin tab, insert the point name (origin, warehouse, etc.) and then the corresponding location (likely their current location) and submit it.

Each consumer or other user can create an account in which all of the user's products are listed. Posts about the products provided by other users are available. For example, comments and/or recipes can be shared among users of the same product.

In general FIGS. 29 and 30 are systems and methods which accumulate and track package parameters regarding individual consumer package goods. The package parameters are linked to a unique, individual, scannable code (e.g., a QR code) on each package. Selected package parameters would be selectively available to entities such as supply chain entities including but not limited to manufacturers, material suppliers, distributors, retailers, brand owners and consumers. For example, certain common package parameters about each package would be available to manufacturers, material suppliers, distributors, retailers, brand owners and consumers. In addition, each entity would have access to unique date. The manufacture would be the only one to have access to certain manufacturing package parameters and certain package parameters relating to the materials in the package and the material suppliers. The distributor would be the only one to have access to certain distribution package parameters and certain package parameters relating to the retailer handling the package. The consumer would be the only one to have access to select package parameters relating to the materials in the package and any offers or recalls relating to the package. The QR code can be scanned by a mobile device of a consumer to access some or all of the information. The package parameters provides marketing, cross-merchandising, and management information, as well as other individualized package information. In one embodiment, consumer would be required to register and/or log-in to obtain access to data. In this way, information could be required from the consumer as part of the registration and/or log-in in order to collect information from the consumer. Information to be collected can include the consumer's rating, use, history, or other details relating to the package goods, and/or information about the consumer such as demographics, buying habits, product use habits, product, reviews, and/or personal information.

FIG. 29 illustrates one embodiment of a system 951 for printing individual QR codes on a continuous web 705 from which individual consumer product packages are formed. A database 953 cross-references the QR code of each package to its unique package parameters. The package parameters includes one of more of manufacturing parameters 955, material parameters 957, distribution parameters 959, marketing parameters, retail parameters, and/or sales parameters provided by either the retailer 977 and/or the brand owner 975, and any other package parameters which relate to each package. In one form, the package parameters in the database 953 is catalogued as a multi-use record in a standard format and would be independent of products and entities involved.

In this context, the individual QR code of a package comprises a "super SKU" with product DNA and unique characteristics at time of manufacturing, filling, distributing and packaging, with lifetime serialization. In one form, the QR code represent a non-sequential code such as an 11-character alpha-numeric code. The non-sequential code is cross-referenced in database 953 to such information as a URL or other addresses, a unique serial number of each package, and/or an expiration date for the package goods. The cross-referenced information may also include a manufacturing date, a lot number, various offers, rebate, and recall information as well as any and all parameters provided by the entities which are part of the system 951. The code can be non-sequential so that a consumer or other entity cannot guess the codes of other similar packages and to minimize the possibility of a random code being entered which corresponds to a valid code. When an offering such as a rebate is available in conjunction with selected packages, non-sequential codes minimize fraud or other misuse.

All of the parameters noted above may be sourced, gathered, consolidated and catalogued by individual QR codes. The variable package parameters in the database 953 can be downloaded from a planning or production MES system. In one form, package parameters are automatically logged from the various systems and methods which are part of the package creation, delivery and use. Alternatively or in addition, an operator can manually enter package parameters before, during or after package creation.

The system 951A of FIG. 30 is for use with a continuous, in-line moving web 705 of successive product packages. Database device 953 stores a plurality of data records defining a plurality of different, unique, individual QR codes. A frame 702 for receiving and supporting the web of packages includes guides for guiding the web through the frame as the web moves through the frame. A printer 704 supported by the frame for printing the individual QR codes on the packages on-the-fly as the web moves through the frame. A tracking system such as camera 714 supported by the frame tracks the position of each product package of the web relative to the printer 704. A controller 961 linked to the database device 953, the printer 704, and the tracking system 714 controls the operation of the printer 704 to print the individual QR codes at a selected location on the packages formed from the web 705.

A parameter link to the database 953 provides to the database individual package parameters which are cross-referenced to the individual QR codes. As shown in FIG. 29, the parameter link comprises one or more of the following: a link providing manufacturing parameters 955 from the manufacturing system 963 and/or the manufacturer 973, a link providing material parameters 957 from the materials system 965 and/or the materials supplier 971, and a link providing distribution parameters 959 from a distribution system and/or the distributor 967 and/or the retailer 977 and/or the manufacture 973. The parameter link can be a direct link with a processor of a manufacturing system 963, a processor of a materials system 965, and/or a processor of a distribution system 967. Alternatively and in addition, the parameter link can be an intermediate systems and methods or processors or a terminal used by an operator for manually providing parameter details.

An access link 969 to the database 953 provides entities access to at least some of the individual package parameters cross-referenced to each of the individual QR codes. The entities include but are not limited to a materials supplier 971 of materials in the package, a package manufacturer 973, a brand owner 975 of a brand on a package, a retailer 977 selling a package, and/or a consumer 979 of the package.

In one form, the system 951, 951A includes a labeling device 718 such as illustrated in FIGS. 7, 8 and 13, linked to and controlled by the controller 761. The labeling device 718 is supported by the frame 702 for applying a removable layer to the packages over the individual QR codes on the packages. The controller 761 controls the operation of the labeling device 718 to apply one of the removable layers over the individual QR codes at the selected locations on the packages.

In one form, the system 951, 951A includes a distribution system (see FIG. 30) of a distributor 967 for collecting and distributing the packages to various locations such as retailers 977 according to the individual QR codes. The distribution system and/or the distributor 967 and/or the retailer 977 supplies individual package distribution parameters 959 to the database 953 via the parameter link. The supplied distribution parameters 959 are cross-referenced to the individual QR codes. In one form, the distribution system 963 includes a camera (not shown) reading the individual QR codes at the time of package distribution so the distribution parameters 959 can be tied, to the QR code of the package.

The distribution parameters 959 comprise one or more of the following:
 a SKU number of each package;
 a destination of each package,
 Handlers of each package during the distribution process, and
 a route by which each package is distributed, and
 handling variables of each package during the distribution process (e.g., temperature, humidity, and/or any other environmental properties).

In one form, the systems and methods includes a manufacturing system 963 of a manufacturer 973 for manufacturing the packages and for supplying individual package manufacturing parameters 955 to the database 953 via the parameter link. The supplied manufacturing parameters 955 are cross-referenced to the individual QR codes so that printing and manufacturing are coordinated as part of one in-line, on-the-fly system. In one form, the manufacturing system 963 includes a camera 981 reading the individual QR codes at the time of package manufacture so the manufacturing parameters 955 and the material parameters 957 can be tied to the QR code of the package.

The manufacturing parameters 955 comprise one or more of the following:
 Package Size,
 Package date and time of creation,
 Expiration date of each package contents,
 Operators/Handlers of each package,
 Location of manufacture of package,
 Actual weight of package,
 Unique characteristics of each package,
 Manufacturing process variables of each package (e.g., temperature, humidity, sterility, cook time), and
 FDA reports relating to each package.
 SQF certifications In one form, the systems and methods includes a materials system 965 for supplying materials for the individual packages and for supplying individual material parameters 957 to the database 953 via a parameter link. The supplied materials parameters 957 are cross-referenced to the individual QR codes.

The materials parameters 957 comprise one or more of the following:
 Type of ingredients in each package,
 Source of ingredients in each package,
 Key ingredients in each package, and
 Ingredient amounts in each package.

A network access link 969 (e.g., the Internet) provides to various entities access to selected package parameters and selected records of each individual package based on the QR code of the package.

FIG. 30 illustrates one embodiment of systems and methods of the invention for printing individual QR codes on individual consumer packages after the packages are manufactured. A database cross-references the QR code of each package to its unique package parameters. The package parameters includes one of more of manufacturing parameters, material parameters and/or distribution parameters.

A system 951A similar to the system 951 of FIG. 29 is illustrated in FIG. 30 for individual consumer product packages 954 which are labeled with QR codes after manufacture. The components in FIG. 30 which are the same as the components of FIG. 29 have been labeled with the same reference character. Thus, system 951A includes a database device 953 storing a plurality of data records defining a plurality of different, unique, individual QR codes. A printer 985 prints the variable QR codes on the packages 954. A controller 961 linked to the database device 953 and the printer 985 controls the operation of the printer 985 to print the individual QR codes at a selected location on the packages 954. A parameter link to the database 953 provides to the database 953 individual package parameters which are cross-referenced to the individual QR codes. An access link 969 to the database provides access to at least some of the individual package parameters cross-referenced to each of the individual QR codes.

Alternatively or in addition, each of the system 951, 951A is adapted to be configured to provide one or more of the following:

- A distributor 967 of a particular package has access to selected package parameters of the particular package;
- A retailer 977 of a particular package has access to selected package parameters of the particular package;
- A manufacturer 973 of a particular package has access to selected package parameters of the particular package;
- A materials supplier 971 of a particular package has access to selected package parameters of the particular package;
- A consumer 979 of a particular package has access to selected package parameters of the particular package;
- A brand owner 975 of a particular package has access to selected package parameters of the particular package.

Alternatively or in addition, each of the system 951, 951A is adapted to be configured to provide one or more of the following:

- A distributor 967 of a particular package provides certain package parameters (e.g., distribution parameters 959) for a particular package and has access to selected package parameters of the particular package;
- A retailer 977 of a particular package provides certain package parameters (e.g., distribution parameters 959, marketing and/or sales parameters 959A such as package advantages, comparisons, discounts, incentives) for the particular package and has access to selected package parameters of the particular package;
- A manufacturer 973 of a particular package provides certain package parameters (e.g., manufacturing parameters 955) for the particular package and has access to selected package, parameters of the particular package;
- A materials supplier 971 of a particular package provides certain package parameters (e.g., material parameters 957) for the particular package and has access to selected package parameters of the particular package;
- A consumer 979 of a particular package provides certain package parameters (e.g., feedback parameters 959F such as ratings, package analysis, and preference,) for the particular package and has access to selected package parameters of the particular package; and
- A brand owner 975 of a particular package provides certain package parameters (e.g., marketing and/or sales parameters 959A such as package advantages, comparisons, discounts, incentives) for the particular package and has access to selected package parameters of the particular package,
- wherein each of the distribution, retailer, manufacturer, materials supplier, consumer and brand owner provides different certain package parameters and accesses different selected data.

Thus, in one form, the database 953 is configured to receive at least one or more of the following:

- one or more particular package parameters born a distributor 967 of the particular package via the parameter portal and only the distributor 967 is provided access to the package parameters of the particular package;
- one or more particular package parameters from a retailer 977 of the particular package via the parameter portal and only the retailer 977 is provided access to the package parameters of the particular package;
- one or more particular package parameters from a manufacturer 973 of the particular package via the parameter portal and only the manufacturer 973 is provided access to the package parameters of the particular package;
- one or more particular package parameters from a materials supplier 971 of the particular package via the parameter portal and only the materials supplier 971 is provided access to the package parameters of the particular package; and
- one or more particular package parameters from a brand owner 975 of the particular package via the parameter portal and only the brand owner 975 is provided access to the package parameters of the particular package.

Each of the distributor 967, retailer 977, manufacturer 973, materials supplier 971, and brand owner 975 provides different certain package parameters and accesses different selected package parameters.

It is contemplated that access to the database 953 can be provided by several different portals. As noted above, the consumer 979 may access certain information by having a feature or application on their mobile device which scans an individual QR code of a particular package and, in response, links to the database 953, presenting the consumer with selected information regarding the particular package or product. Alternatively or in addition, a display of a group of packages may have a proximity beacon or an active RFID device which tracks mobile devices and alerts the consumer via an application or feature on their mobile device to scan a QR code of a particular package for more information.

For example, a mobile device of a consumer would provide an audible alert when receiving a signal from a Bluetooth beacon or other homing device. The consumer is prompted to scan one or more QR codes to find out information about various packages of a display, to compare packages having different models or options, and/or obtain purchase discounts or other incentives (e.g., points for a rewards program). The consumer may also be requested to analyze packages and provide feedback such as ratings or preferences which are stored in the database 953 and available to other entities on a selected basis.

Those skilled in the art will recognize additional ways to engage consumers to (1) provide individualized package information or offers to consumer and/or (2) request information from consumers.

Thus, the systems and methods herein are adapted to be configured to solicit consumer interaction with particular, individual packages, to sample new products, and to promote product knowledge and sales.

The locations of the printers and cameras can be varied. For example, in FIG. 29 the camera 714 may be downstream the printer 704 along the web. Also, the printer 983 and camera 985 of FIG. 30 may have alternative positions. Alternatively or in addition, pre-existing printers and cameras of the manufacturing system 963 may be configured to print the individual QR codes on the individual packages, avoiding the need for a separate additional camera and/or printer.

Some of the features and benefits of systems and methods such as illustrated in FIGS. 29 and 30 include but are not limited to:

1. Direct Mail—list driven, direct to household sample product mailing with key features being address on-pack via individual QR code of a particular package
2. Retail—Shopper Engagement and Trends
   a. Multi-Layered instant, redeemable coupons (IRCs)
   b. Cross Merchandising
   c. Cross Marketing
   d. Expiration Date Driven/Embedded Sell-By Date QR codes that drive increasing value couponing on-pack
   e. Competitive Ingredients Tables On-pack—"Additive" Cross Merchandising Ingredients Tables On-pack
3. Product Tracking/Grouping/Logistics—Intelligent Cartoning & Marking, Versioning, Route Sequenced Palletization
4. On demand print & apply labelling for a wide variety of retail, logistics, FDA conformance & accountability applications; SQF certifications.
5. Camera based product identification, inspection, quality control, package parameters archiving for accountability purposes.
6. Control of and creation of variable size packages on-the-Fly plus proportionately sized & applied package graphics.

In one embodiment, the system 951, 951A are configured for managing offers, rebates, and/or recalls. For example, with regard to offers, selected non-sequential codes can be associated with a discount or other promotion which is offered to a consumer or other entity. From time to time, offers can be pushed by any entity to other entities and/or consumers of certain goods. Rebates can be offered, managed, and/or redeemed via the systems and methods. Recalls can also be managed so that consumers and other entities have up-to-date information regarding the status of specific goods in their possession. By scanning the QR code, any entity can determine the status of a product, such as recalls, rebates, expiration, ingredients, or other parameters as noted herein.

It is also contemplated that the system 951, 951A is configured to be interactive. Any entity may be permitted to contact any other entity. FAQs (frequently asked questions) about goods or entities may be part of the systems and methods. For example, a manufacturer could contact consumers who purchased certain goods at particular times at specified locations by email, text, or other forms of communication. The manufacturer can notify consumer of rebates or recalls with regard to certain goods. In certain configurations, an entity may be permitted to contact other similar entities. For example, a consumer may be permitted to communicate with other consumers or a materials supplier may be permitted to communicate with other materials suppliers. Supply chain entities can follow up with others in the chain as regular intervals or as needed to communicate certain information, such as a product recall.

It is also contemplated that RFID tags can be used in addition to or in place of the QR codes to identify individual packages or individual palettes of packages. As with the QR codes, the RFID tags would each be unique and would be cross-referenced to parameters relating to the package and/or palette to which the RFID tag is attached. When an RFID tag is attached to a palette of goods, each of which has a unique QR code, the RFID tag is cross-referenced to the QR codes of the packages on its palette.

In addition to the above, or instead of the above, it is also contemplated that codes or tags can be applied to a group of two or more packages, such as a carton of packages, a case of packages, and/or a bundle of packages. It is also contemplated that codes or tags can be applied to two or more groups, such as a pallet of cartons of packages, a pallet of cases of packages, and/or a pallet of bundles of packages. It is also contemplated that codes or tags can be applied to two or more pallets, such as pallets of a load, pallets for a particular delivery location, and/or pallets on a truck. Further, the truck can have a linked code or pallet.

In this context, the codes or tags of each package would be linked to the code or tag of their group. Alternatively or in addition, the codes or tags or each group would be linked to the code or tag of their pallet. Alternatively or in addition, the codes or tags or each pallet would be linked to the code or tag of their load or truck. In general, an additional code associated with a group of packages is linked in the systems and methods to the codes of the packages in the group.

This linking facilitates tracking of packages, groups, pallets, and/or loads. Further, it allows for quick location of packages, groups, pallets, and/or loads. As a specific example, recalls and/or rebates are easily managed and tracked by such linking. Such linking also facilitates quality control, inspections, and trackability. In one form, the various codes and/or tags on the various packages, groups, pallets, and/or loads form a matrix of information which is selectively available via the systems and methods.

In one form, the invention comprises a database method for use with product packages 281 and a code scanning device 282. The method comprises:

providing a plurality of data records stored in a database device 283, the data records comprising package parameters and a plurality of unique URLs, each data record cross-referenced to only one of the unique URLs, wherein each unique URL corresponds to one of a plurality of different, unique, individual scannable codes so that each data record corresponds to a scannable code;

providing a parameter portal 287 controlled by a controller providing to the database device individual package parameters which are cross-referenced to only one of the unique URLs and which correspond to an individual scannable code on each individual package; and providing an access portal 288 controlled by the controller providing selective access to at least some of the individual package parameters stored in the database device based on the unique URL.

In one form, the invention composes a non-transitory, tangible computer readable medium storing computer executable instructions for use with product packages and a code scanning device.

A data record module instructions executed by a selective access server manages a plurality of data records in a selective access database. The data records comprise package parameters, each data record assigned to a unique URL. Each unique URL corresponds to one of a plurality of different, unique, individual scannable codes so that each data record is assigned to only one scannable code.

A parameter portal module 287' instructions executed by the selective access server manages a parameter portal of the selective access database to control of the data records. The parameter portal module instructions store individual package parameters for a particular individual package, which package parameters are added to a particular data record which corresponds to a particular individual scannable code on the particular individual package.

An access portal module 288' instructions executed by the selective access server manages an access portal of the selective access database. The access portal module instructions control selective access to at least some of the individual package parameters stored in the database device based on the unique URL provided in response to the code scanning device.

Consumer Accounts

It is contemplated that the database device 283 would optionally store consumer accounts which list each consumer's product. The consumer would be provided with the option to subscribe to notices, recalls, or alerts, as well as marketing discounts and offers. For example, if the consumer purchased a product having an allergen such as peanuts in it and the consumer had registered as allergic to peanuts, systems and methods herein would immediately notify the consumer that the purchased product included an allergen. Also, the consumer can be notified when products purchased by the consumer expire.

In one option, consumer accounts are linked at the point of sale of product packages. At the point of sale when the consumer is purchasing packages, the scannable codes are scanned and aggregated to the consumer's shopping list.

Recall Scenario

Manufacturers, suppliers, distributors, and retailers handle many different types of similar product packages. These product packages may vary in ingredients, labeling, or other details. As the product packages are handled, different lots and groups are frequently split up and recombined into a mixed grouping of product packages is created. It becomes difficult to mark each package with its particular contents and parameters. It also becomes very difficult to track the source of each package that ends up in a consumer's hands. The systems and methods with scannable code noted herein resolves the difficulties by providing each package with a unique, scannable code which provides specific package parameters and which can be tracked from origin to destination. As a result, efficient and effective recalls of specific product packages can be implemented.

For example, consider a package of meat. Farmers at farms A, B, and C grow cows which provide the meat package ingredients. The cows are slaughtered at slaughter houses, D, E, and F, and the various cuts of meat are provided to various butchers G, H, and I by distributors J, K, and L. The butchers G, H, and I package the meat in packaging supplied by M and N and provide the meat packages to shipper O and P for delivery to retailers Q and R, which sell the meat packages to consumers. Suppose the meat needs to be recalled for a particular reason. Under the present systems and methods, it is very difficult to fully and completely notify consumers directly about the recall. Media is used to generally identify the meat and this media approach is a primary way of providing a recall notice.

According to systems and methods of the invention, specific packages which need to be recalled can be identified and the recall notice can be specifically targeted in notify individual consumers. For example, suppose the meat from farm A needs to be recalled. Without using the systems and methods herein, media would advise consumers that purchasers of meat from retailers Q and R is under a recall. However, this includes meat packages from farmers B and C which are not subject to recall. Under systems and methods of the invention, the meat packages which include meat front farm A are identified and labeled in database device 283 as being under recall. Emails, text, or other forms of communication are sent to consumers who have registered with the database. Consumers who have not registered can scan the code on their meat packages to access database device 283 and find out if their particular package originated from farm A and is under recall.

As another example, suppose the meat handled by distributor J needs to be recalled. Without using the systems and methods herein, media would advise consumers that purchasers of meat from retailers Q and R is under a recall. However, this includes meat packages handled by distributor K which are not subject to recall. Under systems and methods of the invention, the meat packages which include meat handled by distributor J are identified and labeled in database device 283 as being under recall. Emails, text, or other forms of communication are sent to consumers who have registered with the systems and methods. Consumers who have not registered can scan the code on their meat packages to access database device 283 and find out if their particular package was handled by distributor J and is under recall.

As another example, suppose the meat handled by shipper O needs to be recalled. Without using the systems and methods herein, media would advise consumers that purchasers of meat from retailers Q and R is under a recall. However, this includes meat packages handled by shipper P which are not subject to recall. Under systems and methods of the invention, the meat packages which include meat handled by shipper O are identified and labeled in database device 283 as being under recall. Emails, text, or other forms of communication are sent to consumers who have registered with the systems and methods. Consumers who have not registered can scan the code on their meat packages to access database device 283 and find out if their particular package was handled by shipper O and is under recall.

Another feature of systems and methods herein is the advantage of time-stamping. If a particular package or group of packages needs to be recalled, other packages have adjacent time-based parameters (e.g., timestamps) can be checked and/or recalled to increase safety.

Systems and methods herein also permit the consumer to be provided with a coupon, discount, or other market feature as a result of a recall. For example, if the consumer had a recalled product, the consumer would be directed to discard the product and would be provided with a coupon to obtain a replacement product at no cost.

FIG. 31

FIG. 31 illustrates one embodiment of systems and methods of the invention in which an enabler 1001 is used to generate codes/URLs and a loader 1004 is used to populate data records corresponding to the codes/URLs. The system comprises one or more PACKPRINT™ code enablers 1001, one enabler located at each product line location. As used herein, a code can be a machine-readable optical label or other scannable code such as a matrix barcode or two-dimensional bar code (e.g., a QR code) containing data defining a URL. The code is for printing on a package (or a code can be a URL which is used to generate a scannable code identifying the URL) so that when the code is scanned, it indicates the URL used to generate the scannable code. In FIG. 31, product lines 1, 2, and N are illustrated. In one form, each enabler 1001 comprises an ultra-low cost computer and/or processor or server having computer executable instructions stored on a tangible memory device and adapted to generate unique data files such as unique JSON files (i.e., JavaScript Object Notation formatted data) representing each individual scannable code/URL when executed by the computer. The scannable codes/URL represented by the generated JSON files are provided by the enabler 1001 to a printer for printing on individual packages, including a printer to be added to a manufacturing line or including an existing printer such as a lot/date code printer 1002 of each manufacturing line. Instead of a JSON file format for files generated by the enabler 1001, other formats such as XML or any other raw data file format may be used. One code is printed on each package. Since each code is unique compared to other codes, each individual package has a unique code that can be tracked.

Each printer 1002 receives from its enabler 1001 a scannable code for printing on a package. Each scannable code includes a URL contained in or embedded in the code (e.g., when a QR code reader scans the code, the reader is directed to the URL embedded in the code). The enabler 1001 includes or embeds a time-based parameter (e.g., timestamp information such as a timestamp of when a code is created or applied to a package) along with other information defining the unique URL within a corresponding JSON file which is transferred via a network connection or via a solid state drive 1003 to a PACKPRINT™ loader 1004 (e.g., a type of client). In one form, each loader 1004 comprises a computer, processor, or server having executable instructions stored on a tangible memory device and adapted to populate the database 1005 when executed by the computer.

For example, the enablers 1001 may be connected to the loader 1004 by a wired or wireless network 1008 for transferring JSON files. Alternatively, or in addition, JSON files may be transferred to a memory device such as a solid state flash drive 1003 (e.g., a USB memory stick). Initially, the flash drive 1003 is connected to the enabler 1001 and JSON files are saved on the flash drive 1003. The flash drive 1003 is physically transported to the loader 1004 and the flash drive 1003 is connected to the loader 1004. Thus, the loader 1004 has access to the JSON files representing the used codes/URLs which are stored on the flash drive 1003. It is also contemplated that the JSON files can be transported by hand carry of a flash drive from the loader 1004 to the enabler 1001 and/or from the enabler 1001 to the printer 1002.

Individual data records corresponding to each code/URL are stored in a cloud based PACKPRINT™ master database 1005. Access to database 1005 can be directly via a portal or access can be managed by one or more servers, processors, and/or computers. The database 1005 is configured as noted herein to be selectively accessible so that only certain entities can edit certain parameters or add certain parameters within the database (e.g., manufacturer, materials supplier, retailer) and only certain entities have access to read-only certain parameters within the database (e.g., consumer, retailer). The loader 1004 populates data files in the database 1005 with the data embedded in the JSON files it receives. Thus, the loader 1004 populates the database 1005 with the URL and timestamp of each code. In one form when the timestamp is embedded in the URL, the loader 1004 is programmed to extract the timestamp from the URL and populate the data file of the URL with the timestamp. Thus, the populated data file includes the timestamp of its corresponding unique package.

In one form, the enabler 1004 defines each JSON file to include a code data identifying the manufacturer, plant, and line, in addition to the timestamp. Alternatively, or in addition, other specific parameters may be used to define the JSON file, such as SKU, product name, or job name.

For example, the JSON file can be defined as follows:
$2.6*10^{20}$ total records (equal to $72^{16}$ total records)
Timestamp every 100th of a second (depending on resolution needed to ensure that each code is unique)
10+ years of sequence codes
Code layout is initially 16 characters: CCCCCsssssssssss
where:
CCCCC is 5 characters which includes the following 9 characters compressed to 5 characters:
5 digit Manufacturer identifier (e.g., 00001-99999)
2 digit Plant identifier (e.g., 01-99)
2 digit Line identifier (e.g., 01-99)
ssssssssss=11 character product sequence number (e.g., 00000000001-99999999999) which includes the timestamp and/or which is based on the timestamp.

The JSON file is compressed to 11 allowable ASCII characters (base 72). The unique set of characters of the JSON file correspond to a unique URL which corresponds to a unique scannable code which is on a unique package.

Optional FIG. 31 Configurations

Optional configurations for the system of FIG. 31 are contemplated. For example, the printer 1002 and enabler 1001 can be combined. As another example, the enabler 1001 and the sensor system 1006 (see below) can be combined. As another example, the enabler 1001 and the loader 1004 can be combined and/or the cloud database 1005 may be directly linked to the enabler/loader.

After the data records stored in the database 1005 are populated by the loader 1004, the data records may be edited or additional information may be added to the data records by various systems or by devices such as by a client and/or a sensor system. For example, each product line may have an optional sensor system 1006 which senses a parameter of each package and populates the data record of the package with the sensed parameter via a network 1008 to the enabler 1001 and/or via a network 1008 to the loader 1004. The sensor system 1006 functions as a data collection device and can sense such parameters as package weight, package location, package temperature, package status (e.g., complete, incomplete, in process), package destination, and/or package handling. Alternatively, the sensor system 1006 can act as a client 1007 and interface directly with the database 1005 as shown by dashed line 1009 to provide selective access and selective editing rights. The sensor system 1006 can be part of a package handling system or device. The sensor system 1006 can include a scannable code reader for identifying each package by its code. For example, she sensor system 1006 can weigh each package, scan it code, and populate the data record of the package via the enabler 1001, the loader 1004, or directly with the database 1005.

As another example of updating the data records in database 1005, a client 1007 may be a distributor 967, a materials supplier 971, a manufacturer 973, a brand owner 975, and/or a retailer 977. Each would have selective access to data records and each could be restricted as to their privileges to edit, add, or delete records, la addition as noted herein, consumers 975 would have limited access to data records, which consumer access can be limited to read-only access only certain records and/or which consumer access can allow the consumer to post comments or other information.

For example, as shown in FIG. 31, after a code is printed on a package, the package goes to a distributor 967 having a scanner which scans the code and is configured to update the data record in the database 1005 which corresponds to the code. The data record may be updated with package location information, package handling information, or other parameters relating to the distributor 967. Next, the package goes to a retailer 977 having a scanner which scans the code and is configured to update the data record in the database 1005 which corresponds to the code. The data record may be updated with package location information, package handling information, or other parameters relating to the retailer 977. Finally, the package goes to a consumer 975 having a scanner which scans the code and is configured to access the data record and provide certain information to the consumer 975. Alternatively and in addition, the consumer 975 can in some scenarios update the data record in the database 1005 which corresponds to the code. For example, the data record may be updated with the consumers location information, or consumer comments.

In the above embodiments, it is also contemplated that the files generated by the enabler 1001 (e.g., the JSON files) may be as simple as the data records and timestamp, with the remaining parameters subsequently added to the master database 1005. For example, the timestamp may relate to creation or editing of the dam record, and/or creation of the package, and/or printing of the scannable code on the package.

FIGS. 32-35

FIG. 32 illustrates one embodiment of the enabler 1001 of FIG. 31. The enabler 1001 of this embodiment includes a processor 1100, a data memory 1110, an executable tangible, non-transitory memory device 1120, an electrical power interface 1130, a Universal Serial Bus (USB) input/output (I/O) interface 1140, one or more discrete I/O interfaces 1142, an indicator light 1144, a network I/O interface 1150, and a printer I/O interface 1160, all of which are contained within a housing 1170. The enabler 1001 allows unique scannable codes to be created "just in time" in line with a manufacturing process, such as a bagger or other package handling device. In this aspect, the enabler 1001 adds functionality to existing printing devices and provides access to the unique scannable codes via an external memory or a network.

In the enabler 1001, the electrical power interface 1130, the USB I/O interface 1140, the discrete I/O interfaces 1142, the indicator light 1144, and the network I/O interface 1150 are all connected to the processor 1100. In addition, the data memory 1110 and the executable memory device 1120 are also connected to the processor 1110. The processor 1110 is connected to the printer I/O interface 1160.

The network I/O interface 1150 is adapted for providing a connection between the processor 1100 and a communications network such as network 1008 (FIG. 31). In one aspect, the network I/O interface 1150 facilitates communication between the enabler 1001 and a communications network according to any data communication protocol. In one embodiment, the network I/O interface 1150 operates according to an Ethernet protocol, such as the IEEE 802.3 standard, in another embodiment, the network I/O interface 1150 operates according to a wireless communications standard, such as IEEE 802.11, for example. The network I/O interface 1150 may also be adapted for providing a connection between the processor 1100 and a camera, such as first camera 714 (FIG. 7) for reading a position of web 705 and/or second camera 720 to verify or monitor print quality.

The USB I/O interface 1140 is adapted for providing a connection between the processor 1100 and an external storage medium. In the embodiment of FIG. 32, the external storage medium is a flash drive. In one embodiment, only one of the USB I/O interface 1140 and the network I/O interface 1150 are used at a time. In another embodiment, the USB I/O interface 1140 and the network I/O interface 1150 are both used simultaneously. The USB I/O interface 1140 may also be adapted for providing a connection between the processor 1100 and a camera, such as first camera 714 (FIG. 7) for reading a position of web 705 and/or second camera 720 to verify or monitor print quality.

The discrete I/O interfaces 1142 are adapted for providing a connection between the processor 1100 and a printing device, such as printer 985 (FIG. 30) or form, fill, and seal machine 955 (FIG. 22). In an embodiment, discrete I/O interfaces 1142 provide a connection for the processor 1100 to receive data from the FFS machine 955 representing registration mark 755 or other indicator on a film for indicating the position of the film. In another embodiment, discrete I/O interfaces 1142 provide a connection for the processor 1100 to receive data from a printing device, such as printer 985, which verifies the status of the printing device. For example, the data may be a semaphore that is utilized to control access to the printing device. In yet another embodiment, discrete I/O interfaces 1142 provide a connection for the processor 1100 to receive data from a printing device, such as printer 985, which indicates that the printing device is ready to begin operations or to begin receiving data from the enabler 1001. Further, the discrete I/O interfaces 1142 may provide a connection for the processor 1100 to transmit data to a printing device, such as printer 985 or FFS machine 955, that represents a print trigger or a machine stop command. The discrete I/O interfaces 1142 may also be adapted for providing a connection between the processor 1100 and a camera, such as first camera 714 (FIG. 7) for reading a position of web 705 and/or second camera 720 to verify or monitor print quality.

The indicator light 1144 is adapted for visually signaling a state or condition of the enabler 1001, or its sub-components, including the processor 1100. The indicator light 1144 may also be adapted for visually signaling a state or condition of a printing device, such as printer 985 (FIG. 30) or FFS machine 955 (FIG. 22). For example, indicator light 1144 may indicate that the enabler 1001 has experienced a fault (e.g., fault indicator) or that a fault is imminent (e.g., warning indicator). In an embodiment, indicator light 1144 is a light-emitting diode (LED). Further, the enabler 1001 may include more than one indicator light 1144, such as both a warning light and an indicator light. In such an embodiment, each indicator light may include distinguishing features, such as each light having a different color.

The electrical power interface 1130 is adapted for providing an electrical connection between various components of the enabler 1001 and an external electrical power source. In one embodiment, the electrical interface 1130 provides an interface for direct current (DC) power. In another embodiment, the electrical power interface 1130 provides an interface for alternating current (AC) power. In yet another embodiment, the electrical power source of the enabler 1001 is contained within the housing 1170, such as a battery or photovoltaic cell.

The printer I/O interface 1160 is adapted for providing a connection between the processor 1100 and a printing device. In one aspect, the printer I/O interface 1160 facilitates communication between the enabler 1001 and a printing device such as printer 1002 (FIG. 31) according to any data communication protocol. In the embodiment of FIG. 32, the printer I/O interface 1160 is a serial port. However, one skilled in the art will recognize that any communication interface may be utilized, including those that facilitate parallel communication.

The housing 1170 is adapted to provide a receptacle which holds various components such that the enabler 1001 is self-contained. In the embodiment of FIG. 32, the housing 1170 is a rectangular aluminum enclosure. Also, in the embodiment of FIG. 32, the housing 1170 is shown in a "cut away" view for illustrative purposes. Advantageously, the housing 1170 provides protection for various components of the enabler 1001 and makes the enabler 1001 user-friendly because a user only needs to make connections at the various interfaces in order to use the enabler 1001. Another benefit of housing 1170 is that it provides a standard size so that designers of various devices that utilize the enabler 1001 can make provisions for the inclusion of the enabler 1001 into the layout of those devices. The housing 1170 also provides a means with which to secure the enabler 1001 to a device or a surface of a device that utilizes the enabler 1001. In some embodiments, the housing 1170 may be utilized to help dissipate heat generated by components of the enabler 1001.

The processor 1100 controls and coordinates operation of the various components of the enabler 1001. The processor 1100 accesses the data memory 1110 and the executable memory device 1120 and sends and receives data via the network I/O interface 1150, the USB I/O interface 1140, and the discrete I/O interfaces 1142 by executing the executable instructions stored in the device 1120. The processor 1100 also sends data to a printing device via the printer I/O interface 1160 by executing the executable instructions stored in the device 1120. The processor 1100 also controls aspects of the indicator light 1144.

The enabler 1001 is connected to a package printer via printer I/O interface 1160 such as a serial port. The data memory 1110 is either pre-loaded with code data or loaded remotely such as via a flash drive connected to port 1140 or via a server connected to port 1150.

In an embodiment, a system for generating and managing unique scannable codes comprises a memory device, such as executable memory 1120, and an enabler processor, such as processor 1100. Further, processor 1100 executes computer-executable instructions stored in executable memory 1120, in which the instructions are configured to generate a first data string of unique characters (e.g., herein sssssssssss) and a second data string representative of a manufacturer identifier (e.g., herein CCCCC), configured to transform the first data string and the second data string into a unique scannable code (e.g., a QR code), and configured to generate a unique data file (e.g., a JSON file) corresponding to the unique scannable code. The system further includes a data memory, such as data memory 1110, for storing the first string and the second string, as well as a network interface, such as network I/O interface 1150, configured to transmit the unique data file to a database, such as database 1005 (FIG. 31). Additionally, the system includes a printer input/output (I/O) interface, such as printer I/O interface 1160, configured to interface with a printer, such as printer 1002 (FIG. 31), and configured to transmit the unique scannable code to a printing device for printing on a unique package. In another embodiment, the first data string may be based on a difference between a current time and a previous time that has already occurred. The second data string may be associated with a plurality of package parameters associated with the unique scannable code.

In an additional embodiment, the system described above may also comprise one or more indicator lights 1144, in which the indicator lights visually signal a state or condition of the system. The system may also include an electrical power interface 1130 providing an electrical connection between the system and an external power source, as well as one or more discrete I/O interfaces 1142 providing a connection between the enabler processor 1100 and the printing device 1002. The system may additionally include a universal serial bus (USB) interface 1140 providing a connection between the enabler processor and an external storage medium.

In a further embodiment, the system also comprises a database device, such as database 1005, configured to link with network I/O interface 1150 to receive from processor 1100 the unique data file. The unique data file may be associated with a data record stored in database 1005 including a plurality of package parameters associated with the unique scannable code which corresponds to the unique data file. The unique scannable code corresponds to a unique URL so that each data record on database 1005 is assigned to a unique URL and is accessible via its unique URL.

In one form, the database 1005 is configured to receive at least one or more of the following from the processor 1100:

one or more particular package parameters from a distributor 967 of the particular package via the parameter portal and only the distributor 967 is provided access to the package parameters of the particular package;

one or more particular package parameters from a retailer 977 of the particular package via the parameter portal and only the retailer 977 is provided access to the package parameters of the particular package;

one or more particular package parameters from a manufacturer 973 of the particular package via the parameter portal and only the manufacturer 973 is provided access to the package parameters of the particular package;

one or more particular package parameters from a materials supplier 971 of the particular package via the parameter portal and only the materials supplier 971 is provided access to the package parameters of the particular package; and one or more particular package parameters from a brand owner 975 of the particular package via the parameter portal and only the brand owner 975 is provided access to the package parameters of the particular package.

Each of the distributor 967, retailer 977, manufacturer 973, materials supplier 971, and brand owner 975 provides different certain package parameters and accesses different selected package parameters.

FIG. 33 illustrates an operation of the embodiment of FIG. 32, in which the processor 1100 of the enabler 1001 generates a unique scannable code, such as a PACK-PRINT™ codes as described herein, by executing programmable instructions stored in executable memory device 1120. At step 1200, the processor 1100 accesses a data value stored in data memory 1110 that represents a particular moment in time in the past or the future, which may be designated as "X" for illustrative purposes. For example, a particular moment in time designated as X may be 6:30:00:00 (GMT-6) on Aug. 21, 2013. It is to be understood by one skilled in the art that the level of temporal resolution may be increased or decreased according to the capability of hardware or software resources. Further, the level of temporal resolution may be increased or decreased according to a number of unique codes that are required for a particular application. The particular moment in time allows the creation of a unique code that never occurs twice. In one embodiment, data memory 1110 is pre-programmed with the data value representing the time designated as X. In another embodiment, the processor 1100 selects or computes the time designated as X and stores that time as a data value in data memory 1110.

At step 1202, the processor 1100 accesses a data value that represents the current time, which may be designated as "Y" for illustrative purposes. In one embodiment, the processor 1100 determines the current time Y from a clock circuit and stores that time as a data value in data memory 1110. In another embodiment, the processor 1100 stores the current time Y as a data value in executable memory 1120.

At step 1204, the processor 1100 transforms the data value representing tune X and the data value representing time Y into a data value representing a sequence number, which may be designated as "Z" for illustrative purposes. In one embodiment, the processor 1100 transforms the data value representing time X and the data value representing time Y by subtracting time Y from tune X to determine the number of ¹/₁₀₀ths of a second between time Y and time X. Thus in this embodiment, Z=Y−X, wherein sequence number Z is the number of ¹/₁₀₀ths of a second between time Y and time X. In one embodiment, the sequence number Z may be designated as an eleven character product sequence number "sssssssssss" (e.g., 00000000001-99999999999) which includes the time-based information resulting from the transformation performed by the processor 1100. At step 1206, the processor stores the data value representing sequence number Z in data memory 1110.

At step 1208, the processor 1100 accesses the data value representing sequence number Z from data memory 1110 and the processor 1100 accesses instructions embodied in computer-readable media that represent an obfuscation routine from executable memory 1120. At step 1210, the processor 1100 transforms the data value representing sequence number Z into a data value representing an obfuscated sequence number, which may be designated as Z' for illustrative purposes. In one embodiment, the obfuscated sequence number Z' may be designated as an eleven character product sequence number "s's's's's's's's's's's'" (e.g., 00000000001-99999999999) which includes the time-based information in an obfuscated form. At step 1212, the processor 1100 stores the data value representing obfuscated sequence number Z' in data memory 1110. In one embodiment, the sequence numbers are obfuscated by applying a data masking or data obfuscation algorithm so that successive packages do not have sequential sequence number or a sequence number that can be anticipated to prevent someone form guessing a sequence number. For example, if a series of sequence numbers are tied to promotions, someone would not be able to determine one of the sequence numbers from another sequence number.

At step 1214, the processor 1100 accesses the data value representing obfuscated sequence number Z' from data memory 1110. At step 1216, the processor 1100 transforms the data value representing obfuscated sequence number Z' into a data value representing a unique character sequencing data string, which may be designated as T1 for illustrative purposes. Exemplary T1 strings include "DjcUUd778Dlks", and "PPPhr1234ngISk". In addition to alphanumeric characters, punctuation symbols including dashes (e.g., "-" and "_"), brackets (e.g., "(" and ")"), equals sign (e.g., "="), semicolon (e.g., ";"), colon (e.g., ":"), tilde (e.g., "~"), comma (e.g., ","), and period (e.g., ".") are also legal symbols. At step 1218, the processor 1100 stores the data value representing alphanumeric sequencing string T1 in data memory 1110.

At step 1220, the processor 1100 generates a data value representing a second alphanumeric data string, which may be designated as T2 for illustrative purposes. In one embodiment, the T2 string is nine characters which have been compressed into five characters. In another embodiment, the nine characters comprise a 5-digit manufacture number, a 2-digit plant number, and a 2-digit machine number. For example, the T2 string may be designated as five characters CCCCC which includes the following nine characters compressed into five characters. 5-digit manufacturer identifier (e.g., 00001-99999), 2-digit plant identifier (e.g., 01-99), and 2-digit line identifier (e.g., 01-99). In another embodiment, the nine characters comprise arbitrarily assigned values. At step 1222, the processor 1100 stores the data value representing alphanumeric string T2 in data memory 1110.

At step 1224, the processor 1100 accesses the data value representing alphanumeric sequencing string T1 and the data value representing alphanumeric string T2 from data memory 1110. At step 1226, the processor 1100 transforms the data value representing alphanumeric sequencing string T1 and the data value representing alphanumeric string T2 into a unique scannable code. In one embodiment, the transforming at step 1226 comprises appending the data value representing alphanumeric string T2 onto the data value representing alphanumeric sequencing string T1. In another embodiment, the transforming at step 1226 comprises concatenating the data value representing alphanumeric sequencing string T1 and the data value representing alphanumeric string T2. For example, a combined string CCCCCDjcUUd778Dlks may be transformed into a unique scannable code representing the combined string. Beneficially, this operation illustrated by FIG. 33 permits the enabler 1001 to create a unique scannable code that never occurs more than once and is difficult to guess.

At step 1228, the processor 1100 creates a JSON file, as described above, containing various product information. In one embodiment, the product information includes a manufacture number, a plant number, a machine number, a PACKPRINT™ ID, a MAC address of an enabler (e.g., PPE), a time, a date, and a job name from a printing device. In one embodiment, the JSON file is compressed to eleven allowable ASCII characters (base 72) and the unique set of characters of the JSON file correspond to a unique URL, which corresponds to a unique scannable code that is on a unique package.

At step 1230, the processor 1100 stores the JSON file in an external memory and at step 1232, the JSON file is added to the database 1005. In one embodiment, the processor 1100 utilizes the USB I/O interface 1140 to store the created JSON file on an external solid-state storage medium, such as a flashdrive. In this embodiment, a user removes the solid-state storage medium from the USB I/O interface 1140 and uses another computing device to add the JSON file, to the database 1005 such that it is then accessible to users via the Internet. In another embodiment, the processor 1100 utilizes the network I/O interface 1150 to transmit the created JSON file to a PACKPRINT™ loader 1004. In this embodiment, the PACKPRINT™ loader 1004 takes the JSON file and adds it to the database 1005 such that it is then accessible to users via the Internet. It is to be understood by one skilled in the art that additional methods may be utilized to transfer a JSON file front processor 1100 to database 1005.

In one embodiment, the enabler 1001 is utilized in conjunction with a printing device, such as the form, fill, and seal machine of FIG. 22. FIG. 34 illustrates a method of utilizing the enabler 1001 with the embodiment of FIG. 22. At step 1250, the enabler 1001 is supplied electrical power via the electrical power interface 1130 and is powered up. At step 1252, the enabler 1001 generates unique scannable codes. In one embodiment, the enabler 1001 generates unique scannable codes in accordance with FIG. 33 and the accompanying paragraphs above.

At step 1254, a new job is loaded at the printer 962. In one embodiment, a user utilizes a graphical user interface (GUI) on the printer 962 to select a new printing job. In another embodiment, a user sends a new printing job over a network to the printer 962. In another embodiment, a user utilizes a removable solid-state external memory device, such as a flashdrive, to load a new job at the printer 962.

At step 1256, the enabler 1001 receives a request from the printer 962 indicating that the printer 962 needs one or more unique scannable codes from the enabler 1001. At step 1258, the enabler 1001 sends the generated unique scannable codes to the printer 962 via the printer I/O interface 1160. In one embodiment, the processor 1100 receives the request from the printer via the printer I/O interface 1160, accesses the data memory 1110 to retrieve the unique scannable codes, and transmits the codes to the printer 962 via the printer I/O interface 1160 and a data cable that is attached to the printer I/O interface 1160 and a processor of the printer 962. At step 1260, the printer 962 receives the transmitted unique scannable codes.

At step 1262, the FFS machine 955 starts and the printer 962 begins printing packages with the unique scannable codes. At step 1264, the printer 962 determines whether a new job was loaded. If a new job was loaded, the process returns to step 1256 and repeats. If a new job was not loaded, the process continues on to step 1266. At step 1266, the printer 962 transmits a status count update to the enabler 1001, and the enabler 1001 receives the status count update at step 1268. In one embodiment, the status count is an indication of a number of codes remaining in a buffer of codes at printer 962. In another embodiment, the status count is an indication of a number of codes used from a buffer of codes at printer 962.

At step 1270, the processor 1100 updates a status count value and stores the updated status count value in data memory 1110. At step 1272, the processor 1100 utilizes the status count value to determine whether additional codes are needed by the printer 962. For example, processor 1100 may execute programmable instructions indicating that printer 962 can hold ten codes in a buffer and the status count may indicate that there are eight codes remaining in the buffer. In such an example, processor 1100 may determine by subtraction, for example, that two additional codes are needed. If additional codes are not needed, the process ends. If additional codes are needed, the process continues to step 1274. At step 1274, the enabler 1001 generates the additional codes and sends the additional codes to the printer 962 at step 1276. The process then continues back to step 1260 where the printer 962 receives the codes and the process continues from that step.

In the embodiment of FIG. 35, the enabler 1001 is connected to and is responsive to an imaging device, such as a camera, so that unique codes can be created and printed on packages as unique scannable codes before JSON files are created. At step 1300, the processor 1100 accesses a data value stored in data memory 1110 that represents a particular moment in time in the past or the future, which may be designated as "X" for illustrative purposes. For example, a particular moment in time designated as X may be 6:30:00:00 (GMT-6) on Aug. 21, 2013. It is to be understood by one skilled in the art that the level of temporal resolution may be increased or decreased according to the capability of hardware or software resources. Further, the level of temporal resolution may be increased or decreased according to a number of unique codes that are required for a particular application. The particular moment in time allows the creation of a unique code that never occurs twice. In one embodiment, data memory 1110 is pre-programmed with the data value representing the time designated as X. In another embodiment, the processor 1100 selects or computes the time designated as X and stores that time as a data value in data memory 1110.

At step 1302, the processor 1100 accesses a data value that represents the current time, which may be designated, as "Y" for illustrative purposes. In one embodiment, the processor 1100 determines the current time Y from a clock circuit and stores that time as a data value in data memory 1110. In another embodiment, the processor 1100 stores the current time Y as a data value in executable memory 1120.

At step 1304, the processor 1100 transforms the data value representing time X and the data value representing time Y into a data value representing a sequence number, which may be designated as "Z" for illustrative purposes. In one embodiment, the processor 1100 transforms the data value representing time X and the data value representing time Y by subtracting time Y from time X to determine the number of $\frac{1}{100}$ths of a second between time Y and time X. Thus in this embodiment, $Z=Y-X$, wherein sequence number Z is the number of $\frac{1}{100}$ths of a second between time Y and time X. In one embodiment, the sequence number Z may be designated as an eleven character product sequence number "sssssssssss" (e.g., 00000000001-99999999999) which includes the time-based information resulting from the transformation performed by the processor 1100. At step 1306, the processor stores the data value representing sequence number Z in data memory 1110.

At step 1308, the processor 1100 accesses the data value representing sequence number Z from data memory 1110 and the processor 1100 accesses instructions embodied in computer-readable media that represent an obfuscation routine from executable memory 1120. At step 1310, the processor 1100 transforms the data value representing sequence number Z into a data value representing an obfuscated sequence number, which may be designated as Z' for illustrative purposes. In one embodiment, the obfuscated sequence number Z' may be designated as an eleven character product sequence number "s's's's's's's's's's's's'" (e.g., 00000000001-99999999999) which includes the time-based information in an obfuscated form. At step 1312, the processor 1100 stores the data value representing obfuscated sequence number Z' in data memory 1110.

At step 1314, the processor 1100 accesses the data value representing obfuscated sequence number Z' from data memory 1110. At step 1316, the processor 1100 transforms the data value representing obfuscated sequence number Z' into a data value representing a character sequencing string, which may be designated as T1 for illustrative purposes. Exemplary T1 strings include "DjcUUd778Dlks", and "PPPhr1234nglSk". In addition to alphanumeric characters, punctuation symbols including dashes (e.g., "-" and "_"), brackets (e.g., "(" and ")"), equals sign (e.g., "="), semicolon (e.g., ";"), colon (e.g., ":"), tilde (e.g., "~", comma (e.g., ","), and period (e.g., ".") are also legal symbols. At step 1318, the processor 1100 stores the data value representing alphanumeric sequencing string T1 in data memory 1110.

At step 1320, the processor 1100 generates a data value representing a second alphanumeric string, which may be designated as T2 for illustrative purposes. In one embodiment, the T2 string is nine characters which have been compressed into five characters. In another embodiment, the nine characters comprise a 5-digit manufacture number, a 2-digit plant number, and a 2-digit machine number. For example, the T2 string may be designated as five characters CCCCC which includes the following nine characters compressed into five characters: 5-digit manufacturer identifier (e.g., 00001-99999), 2-digit plant identifier (e.g., 01-99), and 2-digit line identifier (e.g., 01-99). In another embodiment, the nine characters comprise arbitrarily assigned values. At step 1322, the processor 1100 stores the data value representing alphanumeric string T2 in data memory 1110.

At step 1324, the processor 1100 accesses the data value representing alphanumeric sequencing string T1 and the data value representing alphanumeric string T2 from data memory 1110. At step 1326, the processor 1100 transforms the data value representing alphanumeric sequencing string T1 and the data value representing alphanumeric siring T2 into a unique scannable code. In one embodiment, the transforming at step 1326 comprises appending the data value representing alphanumeric string T2 onto the data value representing alphanumeric sequencing string T1. In another embodiment, the transforming at step 1326 comprises concatenating the data value representing alphanumeric sequencing string T1 and the data value representing alphanumeric string T2. For example, a combined string CCCCCDjcUUd778Dlks may be transformed into a unique scannable code representing the combined string. Beneficially, this operation illustrated by FIG. 35 permits the enabler 1001 to create a unique scannable code that never occurs more than once and is difficult to guess.

At step 1328, the unique scannable code is added to a list or other data structure that allows a printer, such as printer 962, to make film with the unique scannable code on it. At step 330, the unique scannable code is printed onto a package, as described herein. At step 1332, the unique scannable code printed on a package is scanned by the imaging device at the time the package is filled. For example, the cameras discussed in association with FIG. 6, FIG. 7, and FIG. 9 may be used to scan the unique scannable code. At step 1334, the processor 1100 receives the scanned code from the imaging device. At step 1336, the processor 1100 in response to receiving the scanned code creates a JSON file that is associated with the scanned code. In one embodiment, the JSON file contains various unique product information, as described above.

At step 1338, the processor 1100 stores the JSON file in an external memory and at step 1340, the JSON file is added to the database 1005. In one embodiment, the processor 1100 utilizes the USB I/O interface 1140 to store the created JSON file on an external solid-state storage medium, such as a flashdrive. In this embodiment, a user removes the solid-state storage medium from the USB I/O interface 1140 and uses another computing device to add the JSON file to the database 1005 such that it is then accessible to users via the Internet. In another embodiment, the processor 1100 utilizes the network I/O interface 1150 to transmit the created JSON file to a PACKPRINT™ loader 1004. In this embodiment, the PACKPRINT™ loader 1004 takes the JSON file and adds it to the database 1005 such that it is then accessible to users via the Internet. It is to be understood by one skilled in the art that additional methods may be utilized to transfer a JSON file from processor 1100 to database 1005.

The embodiment of FIG. 35 may also be used with products that have not yet been collected at the time the unique scannable code is generated. In this situation, a product collector has a mobile user interface, such as an iPad, and scans the unique scannable codes that are printed on packages when filling those packages with product in order to assign various data about the product with the unique scannable code on the package. At the end of the collection process, the mobile user interface is connected to a loader, such as PACKPRINT™ loader 1004 in FIG. 31, in order to extract the information associated with each unique scannable code and store that information in the database 1005.

Further, there may be additional readers at any point in the processes described herein that can scan and create JSON files. Such readers may add functionality such as waste detection (e.g., scanning dead codes or PACKPRINT™ codes), weight measuring (e.g., scanning the PACKPRINT™ code associated with a product while that product is on a scale), temperature of a machine at the time of a scan, or any other logical data collection throughout the process. The JSON files link the scanned PACK PRINT™ code back to the database combining information.

Peel-Off Labels

FIG. 36 illustrates one embodiment of systems and methods for use with product packages having peel-off labels 277, on which unique scannable codes 278 are printed for use with a code scanning device for scanning the scannable codes on the peel-off labels. In one form, each unique scannable code 278 is a unique graphic image printed on a peel-off label 277 applied to a package for ordering and/or reordering products associated with the package on which the peel-off label is applied.

The package handling device 284 receives the product packages 281 and guides the packages 281 through the package, handling device 284. In an embodiment product packages 281 each have a peel-off label 277 applied to the package before being received by package handling device 284 (not illustrated). In another embodiment, product packages 281 do not have a peel-off label 277 before being received and package handling device 284 applies a peel-off label 277 to each product package 281, as illustrated in FIG. 36. The printer 285 associated with the package handling device 284 prints one of the unique scannable codes 278 on each peel-off label 277 as the packages are guided through the package handling device 284 to result in product packages 281", each having a peel-off label 277 with a unique scannable code 278. The peel-off label 277 with code 278 may be applied to an interior surface and/or an exterior surface of packages 281", as further described herein.

A consumer having the product package 281" can use the code scanning device 282 (e.g., a smartphone or other mobile device) to scan the code 278 on the peel-off label 277. The code scanning device 282 scans the code 278 and determines the URL encoded or represented by the scannable code 278 on the package 281". The code scanning device 282 uses the URL via the access portal 288 to initiate an order of the products associated with the peel-off label 277.

In particular, the code scanning device 282 can be configured by an application (e.g., a mobile "APP") to scan a particular unique scannable code 278 on a particular package 281" to determine the unique URL corresponding to the scanned particular scannable code. In addition, the application configures the code scanning device 282 to connect to the database device 283 via the access portal 288. As a result, the database device 283 receives via the access portal 288 the unique URL from the code scanning device 282. The application utilizes the database device 283 to determine whether the unique code on the printed label 277 has been registered by the consumer. If the unique code has not been registered, the application allows the consumer to initiate a registration process. Once a unique code has been registered, database device 283 sends a request to an order fulfillment provider 279 in response to the code being scanned. In one form, the package 281" contains or encompasses a product or collection of products and the label 277 is affixed to the package. The request to the order fulfillment provider 279 indicates the consumer requests an order of additional units of the product or collection of products contained or encompassed within the package 281" on which the printed label 277 is applied. In an embodiment, database device 283 also sends payment information with the request. In another embodiment, the order fulfillment provider 279 is a third party, such as Fulfillment by Amazon, for example. Optionally, the mobile APP can include a graphical user interface (GUI). After a unique code registered by a consumer is scanned, the consumer is presented by the APP with the GUI giving the consumer purchasing options, such as quantity and/or account to be charged.

It is also contemplated that the unique code on each peel-off label would be dual purpose code which would permit a consumer to obtain product parameter information as noted herein as well as permit the consumer to re-order additional products. For example, the GUI presented to the consumer could provide the product parameter information and provide the consumer re-ordering options.

FIG. 37 illustrates a cross-section view of a product package a peel-off label 277, a unique scannable code 278, and a product package 281", according to one embodiment of the invention. The size, position, content, and/or other features of these elements may vary and are not necessarily represented to scale in FIG. 37. In an embodiment, the peel-off label 277 is applied to the product package 281" with an adhesive that allows the label 277 to be removed from the product package 281" and re-applied to another object or surface where it will be convenient for a user to scan the scannable code 278.

In an embodiment, product packages 281" also have a unique scannable code printed directly on the packaging, as described above with respect to FIG. 26, in addition to the peel-off label 277 and code on the label. In another embodiment, the unique scannable code printed directly on the packaging of a product package 281" is identical to the unique scannable code 278 printed on the peel-off label 277 of the product package 281". In yet another embodiment, the unique scannable code printed directly on the packaging of a product package 281" is different from the unique scannable code 278 printed on the peel-off label 277 of the product package 281", but the two different codes are linked together in database 283, as further described herein. In further embodiments, the unique scannable code 278 printed on the peel-off label 277 is encrypted and/or obfuscated, as further described herein.

In an embodiment, the peel-off label 277 is provided separately to a consumer without a product or package. The separate label 277 could be associated with a particular product and/or package and the consumer would scan the label to reorder the particular product and/or package. Alternatively or in addition, the separate label 277 can be un-associated with a particular product and/or package in which case the consumer would scan the label and register the label to be associated with a particular product and/or package. After registering the separate label 277, the consumer scans the separate label 277 to initiate a reordering process.

System Options

In one option, a pallet, carton, tray, or other group of packages is assigned a scannable group code which is linked to the codes of the packages in the group. When the group is handled by an entity such as a distributor or retailer, the scannable group code is assigned to the entity and all packages within the group are also assigned to the entity. Editing the data record assigned to the group code also edits the data records of the packages within the group. Thus, a group scannable code associated with a group of packages is linked in the system to the scannable codes of the packages in the group. The group scannable code and its linked scannable codes share at least one common package parameter (e.g., location), which can be edited to edit the data records of the packages within the group.

The scannable group code may be determined in various ways. In one embodiment, a first piece of a stream of products is scanned and also a last piece of a stream of products is scanned, which creates two edges. All products between each edge are associated with the same scannable group code. In another embodiment, all products between each edge are associated with the same group, and the unique scannable code for each product contains an association with the group code. In these embodiments, a reader is required to generate JSON files and those files would update the database to create a relationship between individual unique scannable codes. In another embodiment, each individual product's code is scanned as it is put into a group container and the group number is assigned at that time. In a further embodiment, there is a button or method indicating when a carton is full and to index the carton data is assigned to. These embodiments would also require a reader to generate JSON files and those files would update the database to create a relationship between individual unique scannable codes. In another embodiment, an external event occurs which acts as a trigger for an index. For example, an external event may be the result of a manual button press or an imaging device. In another embodiment, a counter is set inside an enabler, such as enabler 1001, where internally the index is changed after a predefined number of products. These embodiments would be implemented with an enabler, such as enabler 1001.

The scannable group code allows one or more of the entities (distributor, 967, retailer 977, manufacturer 973, supplier 971, brand owner 975) to initiate, establish, develop, and maintain a relationship with consumer 979. For example, a convenience store retailer receives a tray of packages and scans the group code on the tray to link the convenience store retailer to the packages. As packages are sold, each consumer scans the code on their package and registers with the database as the consumer of the package. The convenience store retailer is now in a position to market and make offers directly to the consumers that purchased packages at the convenience store retailer. For example, the convenience store retailer can send a discount coupon to its consumers and directly engage the very consumers that have purchased from the convenience store retailer. This allows the retailer to "own" the consumer. The consumer gets very specific marketing offers from their convenience store retailer instead of generic offers. In addition, the convenience store retailer is able to offer its consumers very specific marketing offers instead of offers which are sent to local consumers in general without knowing whether such local consumers are in fact a previous customer of the convenience store retailer.

Codes can be pre-assigned and/or pre-printed in static form or a code generator can be provided with parameters for dynamically, individually printing each unique code or a bulk collection of codes. The codes are not activated until a package is completed or the code or its package enters a supply chain or is otherwise scanned or in use. For example, printing or scanning a code would initiate creating and populating its data record in the database. As another example, pre-assigned codes could have data records in the database which only define the URL and additional parameters would be added to the data record when the code is activated. It is also contemplated that a loader 1004 can initiate the assignment of codes, which codes are provided to the enabler 1001 and/or the printer 1002. The loader 1004 would populate data records of the database with the parameters of the assigned codes.

In one form, it is contemplated that codes and their URLs are non-sequential, hashed codes/URLs so that consumers or others cannot determine a pattern for assigning codes/URLs. As a result, adjacent, previous, or subsequent codes/URLs cannot be anticipated.

As used herein, PACKPRINT™ generally refers to codes, the systems and methods of the invention.

It is contemplated that the scannable code may be embedded in an RFID device or other passive device which is part of a package.

Examples of at least some of the benefits of PACKPRINT™ codes, devices, and systems for private label and/or branded products include one or more of the following;
1. Consumer Confidence
2. Shopper Trust
3. Grocery List Management
4. Single Produce Private Purchase Experience Communication Examples of the value proposition key points of PACKPRINT™ codes on packages, PACKPRINT™ codes on cartons (e.g., CARTONprint™ codes), PACKPRINT™ codes on pallets (e.g., PALLETprint™ codes) include one or more of the following:
1. Recall Management (selective access, password controlled)
   a. "From farm to shelf to pantry" individual package, individual shopper specific assurance
2. Branded Package/Carton/Pallet (PCP)>Automatic Programming To Specific Retailer
3. Product Package Specific Blogging—Shopper Data Collection (Ad Dollars Measurement/Effectiveness)
4. Expiration/Time/On-Demand "Add To Grocery List"
5. Unparalleled, Instantly Accessible Real-Time Quality
   Assurance Product & Package Data
   Continuously Updated Ingredients Sourcing
   Mfg Location
   Machine #
   Shift/Operator
   Actual Package Weights
   Measured Gluten Levels
   Pasteurization Temp. Thresholds
   Refrigeration Temp. Profiles Thru Transit/Storage
   Dates of Manufacture
   Probiotic Measurement All product quality, package characteristics data to be considered for inclusion and subsequently potentially incorporated into each PACKPRINT™ data record is only limited by the product manufacturing and packaging process itself. If a key data element is measurable or reportable in real-time during manufacturing, it can be completely incorporated into the package DNA and PACKPRINT™ product profile.

All data can be selective access, multi-tiered PASSWORD protected not only throughout the supply chain and store level, but also potentially subscribed to if warranted at the shopper at home pantry level.

Examples of some high priority product categories (not all-inclusive) include one or more of the following:
1. MEAT
2. PRODUCE
3. DAIRY
4. BAKERY
5. BABY CARE
6. HEALTH AND BEAUTY Social Media Connection (FIG. 38)

Systems and methods herein encourage a consumer and friends of the consumer to be an advocate and a sales person for a product within a package having a unique code. When the unique code is scanned by the consumer/friend, a communication regarding the product is publicly posted on social media of the consumer/friend. The contest encourages consumers and/or their friends to scan the unique code, resulting in the consumer's/friend's social media repeatedly publicly endorsing and advertising the product.

Referring to FIG. 38, a printer 3802 prints a unique code 3804 on a package 3806 of a product, the code 3804 being unique to any other codes on any other packages so that each package 3806 has its own unique code 3804 and the package 3806 can be tracked and associated with a particular consumer 3808. A consumer 3808 purchases the package 3806 and uses a standard QR scanning APP (application) 3810 executed by the consumers scanning device (e.g., smart phone) 3812 to link the particular package 3806 with the particular consumer 3808. The consumer scanning APP 3810 allows the consumer 3808 to scan the code 3804 which links the consumer to a web page having a user interface (UI) presented by contest server 3816 so that the consumer can register for a contest involving the package 3806. The contest offers a prize 3828 to the consumer 3808 and/or friends 3814 of the consumer 3808 based on scanning of the code 3804 on the package 3806. The consumer APP 3810 communicates with the contest server 3816 having a database and implementing the contest. In the database of the server, the particular consumer 3808 is uniquely linked to the particular package 3806 and vice versa.

The consumer APP 3810 is configured to communicate with social media to endorse and advertise the consumer's connection to the product within the package 3806. For example, the consumer APP 3810 is configured to communicate with the consumer's Facebook page 3818 and/or the Facebook page 3820 of a sponsor of the contest. In one form, the sponsor is a manufacturer, distributor, and/or retailer of the package 3806. It is also contemplated that the contest server 3816 can be configured to communicate with social media such as the consumer's Facebook page 3818 and/or the Facebook page 3820 of the sponsor of the contest to publish the consumer's connection to the package 3806 and to the product within the package, thereby endorsing and advertising the product.

In one form, a friend 3814 of the consumer 3808 uses a friend scanning APP (application) 3822 executed by the friend's scanning device (e.g., smart phone) 3824 to link the particular package 3806 with the particular friend 3814. The scanning APP 3822 allows the friend 3814 to scan the code 3804 which links the friend to a web page having a user interface (UI) presented by contest server 3816 so that the friend can register for a contest involving the package 3806. Alternatively and in addition, the friend can support the consumer 3808 who purchased the package 3806 simply by scanning the QR code 3804. The contest offers a prize 3828 to the consumer 3808 and/or friends 3814 of the consumer based on scanning of the code 3804 on the package 3806. The friend APP 3822 communicates with the contest server 3816 implementing the contest and linking the particular friend 3814 to the particular package 3806.

The friend APP 3822 (which can be the same as the consumer APP) is configured to communicate with social media to endorse and advertise the friend's connection to the package 3806 and to the product within the package 3806. For example, the friend APP 3822 is configured to communicate with the friend's Facebook page 3826 and/or the Facebook page of the sponsor 3820 of the contest. In one embodiment, it is contemplated that the contest server 3816 can be configured to communicate with social media such as the friend's Facebook page 3826 to publish the friend's connection to the package 3806 and to the product within the package 3806. Alternatively, the APP communicates with the 'contest server' (PACKprint Server) and the APP communicates with Social Media. The friend APP 3822 is similarly configured and in addition can communicate with the consumer's social media 3818 to publish their connection thereby endorsing and advertising the product.

One purpose of the system and method herein is to encourage the consumer 3808 to be an advocate and a sales person for the package 3806 and for the product within the package 3806. It is contemplated that the system and method can have several tiers of implementation which can be simultaneously or sequentially implemented, for example, a first tier can involve offering a contest at a point-of-sale display. Consumers 3808 who purchase a package 3806 would be encouraged to download an APP 3810 to their smart phones 3812 to participate in the contest. To register their purchase of the package 3806, the consumer 3808 completes a user interface of the APP 3810 and scans the unique code 3804 of the package 3806 thereby linking the consumer 3808 to the package. The APP 3810 interfaces with the consumer's Facebook 3818 and provides a post to indicate that the consumer 3810 is associated with product within the package 3806.

In another alternative or additional aspect, every time a friend 3814 of the consumer "likes" or otherwise acknowledges the consumer's social media post, the consumer 3808 and/or the friend 3814 is credited with a point or more toward winning a prize 3828. In other words, the unique code 3804 represents the consumer's entry into the contest and can encourage friends of the consumer to get involved in endorsing and advertising the product. For example, a "tweet" posted on the consumer's Twitter account can result in the consumer receiving one or more points in the contest, and a "retweet" by a friend can result in the consumer and/or the friend receiving one or more points in the contest.

A second tier can encourage the consumer 3808 to gain points by marketing the product and soliciting endorsements of the product within the package 3806. Every time a friend 3814 using the APP 3822 scans the unique code 3804, the consumer 3808 is credited with a point or more toward winning a prize. For example, the consumer 3808 could sponsor a party during which friends 3814 scan the unique code 3804. In this way, the consumer 3808 is converted into a local sales person. It is important that each code 3804 on each package 3806 is unique in order to track the consumer's handling of the package 3806 purchased by the consumer 3808. When a code 3804 is scanned, it is also possible to determine the scanning location and thus the location of the package 3806, which could be used to impact the contest. For example, the consumer 3808 could receive extra points for having the unique code 3804 scanned at several different locations.

It is also contemplated that the various social media of the consumer, friend, and/or sponsor can be linked to each other to further promote the product of the package. For example, the consumer's Facebook page 3818 can cause a post to the sponsor's Facebook page 3820 and/or the friend's Facebook page 3822. For example, the sponsor's Facebook page 3820 can cause a post to the consumer's Facebook page 3818 and/or the friend's Facebook page 3822. For example, the friend's Facebook page 3822 can cause a post to the sponsor's Facebook page 3820 and/or the consumer's Facebook page 3818.

In one form, a system 3800 is for use with a package 3806 and for use with a scanning device 3812 of a consumer 3808. A unique code 3804 is printed on the package 3806, the code 3804 being unique to any other codes on any other packages. A contest server 3816 offers a prize 3828 based on the scanning of the unique code 3804 on the package 3806. An APP 3810 is stored in a memory of the scanning device 3812 and is configured for execution by the scanning device 3812 to scan the unique code 3804 on the package 3806. The APP 3810 is configured for communication with the contest server 3816 to link the consumer 3808 to the unique code 3804. In addition, the APP 3810 is configured for communication with social media (e.g., FaceBook, Twitter, and/or media websites) to post a message linking the consumer 3808 and the package 3806.

When the sponsor of the contest server 3816 has a social media presence, e.g., site 3820, and the consumer 3808 has a social media presence, e.g., site 3818, the APP 3810 is configured for communication with the consumer's social media site 3818 to post a message linking the consumer 3808 and the package 3806. The APP 3810 is configured for communication with the sponsor's social media site 3820 to post a message linking the consumer 3808 and the package 3806.

The system 3800 can be for use with a scanning device 3824 of a friend 3814. A friend APP 3822 stored in a memory of the friend's scanning device 3824 is configured for execution by the friend's scanning device 3824 to scan the unique code 3804 on the package 3806. The friend's APP 3822 is configured for communication with the contest server 3816 to link the friend 3814 to the unique code 3804. The friend's APP 3822 is configured for communication with a social media site to post a message linking the friend and the package.

In one form, the contest server 3816 provides the prize 3828 based on a number of scans of the unique code 3804 by the consumers scanning device 3812 and/or based on a number of scans of the unique code 3804 by friends 3814 using their scanning devices 3824. It is contemplated that a contest can be configured in other ways. For example, it may be that each 'point' is an 'entry' or chance to win the prize in the contest—the more points, the more chances to win; however, not necessarily the person with the most points wins.

When the friend 3814 has a social media site, the friend's APP 3822 is configured for communication with the friend's social media site 3826 to post a message linking the friend 3814 and the package 3806. The friend's APP 3822 is configured for communication with the sponsors social media site 3820 to post a message linking the friend 3814 and the package 3806. When the friend 3814 has a social media site 3826, the friend's APP 3822 is confirmed for communication with the consumer's social media site 3818 to post a message linking the friend 3814 and the package 3806.

In one form, a method is for use with a package 3806 and for use with a scanning device 3810 of a consumer 3808. The method comprises the steps of:

providing a unique code 3804 on the package 3806, the code 3804 being unique to any other codes on any other packages;

presenting a contest offering a prize 3828 based on the scanning of the unique code 3804 on the package 3806;

monitoring the scanning device 3812 and monitoring the scanning by the scanning device 3812 of the unique code 3804 on the package 3806;

communicating with the contest to link the consumer 3808 to the unique code 3804; and communicating with social media to post a message linking the consumer and the package 3804.

In one aspect, any communication on social media relating to the unique code and its associated product may result in one or more points toward the contest on behalf to the communicator, the consumer and/or friends of the consumer.

For example, the social media can be personal networks, on-line reviews, social publishing, bookmarking sites, discussion forums, media sharing networks, e-commerce, and or interest based networks. For example, any communication on social media such as a posting relating to the unique code and its associated product can result in points for the contest. Alternatively and in addition, a re-posting on social media and/or a further communication may result in points, such as a "like" on FaceBook; a "retweet" on Twitter, a re-posting on LinkedIn, Pinterest, or Google Plus+; an "ask" or a "chat" on Tumbler; a "share" on Instagram; a "picture" on Flickr; a "looping video" on Vine; a "meeting notice" on Meetup; a "tag" on Tagged; a "question" on Ask.fm; a "location" on MeetMe; and/or a "note" on ClassMates.

Dual Layers with Unique and Informational Codes (FIGS. 36A, 37A)

FIG. 36A illustrates one embodiment of systems and methods for use with product packages having dual layer peel-off layers 277, 277A. FIG. 37A illustrates a cross-section view of a product package having a lower peel-off layer 277 (i.e., substrate), a unique scannable code 278PP (e.g., PACKPRINT) on the lower layer 277 which is applied to a product package 281", according to one embodiment of the invention. In addition, an upper peel-off layer 277A (i.e., substrate) having a scannable information code 278DM (e.g., DIGIMARC) on the upper layer 277 is applied over and on the unique code 278PP and over and on lower layer 277, according to one embodiment of the invention. For example, the scannable information code 278DM can be a watermark or other code winch is hidden to a naked eye and linked to pricing information. As another example, the scannable information code 278DM can be an imperceptible code embedded into an image and/or text on the tipper layer 277A.

The size, position, content, and/or other features of these elements may vary and are not necessarily represented to scale in FIG. 37A. In an embodiment, the peel-off layer 277 is applied to the product package 281" with an adhesive that allows the layer 277 to be removed from the product package 281" and re-applied to another object or surface where it will be convenient for a user to scan the unique code 278PP to reorder the product, as noted herein.

In one form referring to FIG. 36A, each unique scannable code 278PP is a unique graphic image pruned on the lower peel-off layer 277 applied to the package 281" for ordering and/or reordering products associated with the package on which the dual layer peel-off label is applied. The code 278DM is the same code for all labels that are applied to packages having the same or similar content. The code 278DM is applied the upper layer 277A to cover the unique code 278PP and the lower layer 277.

The package handling device 284 receives the product packages 281 and guides the packages 281 through the package handling device 284. In an embodiment, product, packages 281 each have the DUAL LAYER peel-off layer 277, 277A applied to the package before being received by package handling device 284 (not illustrated). In another embodiment, product packages 281 do not have a peel-off layer 277 before being received and package handling device 284 applies the DUAL LAYER peel-off layer 277, 277A to each product package 281, as illustrated in FIG. 36A. The DUAL LAYER peel-off layer 277, 277A may be pre-printed and pre-assembled in advance for application to each package 288".

Alternatively, the lower and upper layers may be sequentially applied to each package 281 by the package handling device. A printer 285 associated with the package handling device 284 prints one of the unique scannable codes 278 on each lower peel-off layer 277 before or after the lower peel-off layer 277 is applied to the package so that each peel-off layer 277 has a unique scannable code 278. The printer 285 associated with the package handling device 284 can also print the scannable codes 278DM on each upper peel-off layer 277A before or after the upper peel-off layer 277A is applied as to the lower layer 277 to result in product packages 281", each having a DUAL LAYER peel-off layer 277, 277A with a unique scannable code 278PP on the lower layer 277 and a code 278DM on the upper layer.

A consumer having the product package 281" can use a code scanning device 282 (e.g., a smartphone or other mobile device) to scan the codes 278DM, 278PP on the peel-off layers 277, 277A. For example, the consumer uses their code scanning device 282 to scan the code 278DM to get general product information. In response, the scanner determines the URL encoded or represented by the scannable code 278DM on the package 281". In addition, the information can direct the consumer to peel away the upper layer 227A and scan the unique code 278PP. In response, the scanner determines the URL encoded or represented by the scannable code 278PP on the package 281". The code scanning device 282 uses the URL via the access portal 288 to initiate an order of the products associated with the DUAL LAYER, peel-off layer 277, 277A.

In particular, the code scanning device 282 can be configured by an application (e.g., a mobile "APP") to scan either or both the scannable code 278DM on the upper peel off layer 277A and the unique scannable code 278PP on the lower peel off layer 277 which is on a particular package 281". When each code is scanned, the device 282 determines the URL corresponding to the scanned code.

When the code 287DM is scanned, the scanning application on the device 282 configures the code scanning device 282 to connect to a URL providing DM product information 288DM. When the unique code 287PP is scanned, the scanning application on the device 282 configures the code scanning device 282 to connect to the database device 283 via the access portal 288. As a result, the database device 283 receives via the access portal 288 the unique URL from the code scanning device 282. The application utilizes the database device 283 to determine whether the unique code 278PP on the printed layer 277 has been registered by the consumer. If the unique code has not been registered, the application allows the consumer to initiate a registration process. Once a unique code has been registered, database device 283 sends a request to an order fulfillment provider 279 in response to the code being scanned to deliver product to the consumer.

In one form, the package 281" contains or encompasses a product or collection of products and the layer 277, 277A is affixed to the package. The request to the order fulfillment provider 279 indicates the consumer request of an order of additional units of the product or collection of products contained or encompassed within the package 281" on which the printed layer 277 is applied. In an embodiment, database device 283 also sends payment, information with the request. In another embodiment, the order fulfillment provider 279 is a third party, such as Fulfillment by Amazon, for example. Optionally, the mobile APP can include a graphical user interface (GUI). After a unique code 277PP registered by a consumer is scanned, the consumer is presented by the APP with the GUI giving the consumer purchasing options, such as quantity and/or account to be charged.

It is also contemplated that the unique code 277PP on each peel-off layer 277 would be dual purpose code which would permit a consumer to obtain product parameter information as noted herein as well as permit the consumer to re-order additional products. For example, the GUI presented to the consumer in response to scanning the unique code 277PP can provide the product parameter information and provide the consumer re-ordering options.

In an embodiment, product packages 281" also have a different, unique scannable code 278PP printed directly on the packaging under layer 277, as described above with respect to FIG. 26, in addition to the peel-oil layers 277, 277A and code 278PP on layer 277, and code 278DM on layer 277A.

In another embodiment, the unique scannable code printed directly on the packaging of a product package 281" is identical to the unique scannable code 278PP printed on the peel-off layer 277 of the product package 281". In yet another embodiment, the unique scannable code printed directly on the packaging of a product package 281" is different from the unique scannable code 278PP printed on the peel-off layer 277 of the product package 281", but the two different codes are linked together in database 283, as further described herein. In further embodiments, the unique scannable code 278PP printed on the peel-off layer 277 is encrypted and/or obfuscated, as further described herein.

In an embodiment, the peel-off layers 277, 277A are provided separately to a consumer without a product or package. The separate layers could be associated with a particular product and/or package.

In use, a consumer would first scan the layer 277A and its code 278DM to obtain product information such as pricing, brand information, recipes, and/or marketing information. This product information can include marketing and/or sales information to encourage the consumer to purchase and/or use the product. In one embodiment, the product information would explain to the consumer how to peel away the layer 277A and scan the underlying unique code 278PP to initiate a re-order of the product. When the consumer is ready to re-order the product, the consumer would peel away the layer 211A and scan the unique code 278PP. If the user had not previously registered the unique code 278PP, scanning the code would provide a UI to allow the user to register the unique code 278PP, to provide payment information for reordering, and to link the code to the consumer and the consumer's address. Thereafter, the consumer is given the option to reorder the product when the code is scanned. Since each code 278PP is unique, only the consumer who possesses the code and registered the code can scan it and initiate a reorder.

If the user had previously registered the unique code 278PP and scans the unique code 278PP, in one embodiment the particular product and/or package is automatically reordered, billed to the consumer, and shipped to the consumer's address. Alternatively, if the user had previously registered the unique code 278PP and scans the unique code 278PP, in one embodiment the consumer is presented with a UI to assist the user in reordering the product.

Alternatively or in addition, the separate layer 277 can be initially un-associated with a particular product and/or package. In this case, the consumer would scan the layer and register the layer to be associated with a particular product and/or package and with the consumer. After registering the separate layer 277, the consumer scans the separate layer 277 to initiate a reordering process for the registered product. As noted herein, since each code 278PP is unique, only the consumer who possesses the code and registered the code can scan it and initiate a reorder.

For purposes of illustration, programs and other executable program components, such as the operating system, are illustrated herein as discrete blocks. It is recognized, however, that such programs and components reside at various times in different storage components of the computer, and are executed by the processor(s) of the computer.

Although described in connection will an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems and methods, environments, and/or configurations that may be suitable for use with aspects of the invention include, but are not limited to, personal computers, server computers, hand-held or laptop devices, multiprocessor systems and methods, microprocessor-based systems and methods, set top boxes, programmable consumer electronics, mobile telephones, network PCs, minicomputers, mainframe computers, distributed computing environments that include any of the above systems and methods or devices, and the like.

Embodiments of the invention may be described in the general context of package parameters and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The Abstract and summary are provided to help the reader quickly ascertain the nature of the technical disclosure. They are submitted with the understanding that they will not be used to interpret or limit the scope or meaning of the claims.

What is claimed is:

1. An on-the-fly package printing system for a variety of packages containing a variety of products, said system for printing on each package of a web of successive packages a permanent record indicative of the product weight and product ingredients in the package, said system comprising:
    a package handling device receiving the web and guiding the web through the package handling device;
    a clock generating a unique series of alpha-numeric times, each representing a chronological time of day;
    a printer system associated with the package handling device and the clock, said printer system configured to generate a plurality of different, unique, individual scannable QR codes embedded with the alpha-numeric time at the time of printing of the QR code and configured to print on each package of the web one of the plurality of different, unique, individual scannable QR codes as the packages are guided through the package handling device;
    a weighing system configured to weigh the product in each package after the package is filled; and
    a database device storing a plurality of data records comprising package parameters, each data record corresponding to one of the plurality of scannable codes, wherein each scannable code corresponds to a unique URL so that each data record is assigned to a unique URL;
    wherein each QR code is printed on-the-fly as the web moves through the package handling device;
    wherein each QR code is an alpha-numeric form of an alpha-numeric time of printing of the QR code on the package as indicated by the clock such that each time of printing each QR code on each package is unique and such that each QR code is unique so no two packages have the same time of printing and no two packages have the same QR code;
    wherein each QR code indicates the weight of the product in the package after the package is filled as indicated by the weighing system; and
    wherein the unique URL comprises 11 ASCII characters compressed from a 16 alphanumeric character code defined as CCCCCsssssssssss wherein:
        CCCCC is 5 alpha-numeric characters which includes 9 alpha-numeric characters compressed to 5 alpha-numeric characters; and
        sssssssssss is 11 alpha-numeric characters based on a timestamp every 100th of a second.

2. The system of claim 1 for handling product packages and responsive to a code scanning device, said system further comprising:
    the package handling device configured to receive the product packages and guide the product packages through the package handling device, each package including a peel-off label;
    the printer system printing one of a plurality of different, unique, individual scannable codes on each peel-off label as the packages are guided through the package handling device, wherein each scannable code corresponds to order initiation information for ordering one or more packages which are the same as or similar to the package having the peel-off label;
    a database device storing a plurality of data records comprising package parameters, each data record corresponding to one of the plurality of scannable codes, wherein each scannable code corresponds to a unique URL so that each data record is assigned to a unique URL, each data record comprising registration data for the corresponding scannable code; and
    an access portal of the database device linked to a network, said access portal controlling selective access to at least some of the individual package information stored in the database device based on the unique URL provided in response to the code scanning device, wherein the individual package information includes the order initiation information.

3. The system of claim 2 for use with a code scanning device:
    wherein the code scanning device is configured to scan a particular scannable code on a peel-off label of a particular package,
    wherein the code scanning device is configured to determine the unique URL corresponding to the scanned particular scannable code, wherein the code scanning device is configured to connect to the database device via a network and the access portal, and wherein the database device is configured to receive via a network and the access portal the unique URL from the code scanning device and wherein the database is configured to initiate the ordering of one or more packages which are the same as or similar to the package having the peel-off label.

4. The system of claim 3 wherein the order initiation information stored in the database includes at least one of delivery information, a consumer's address, payment information, and a consumer's payment information including an account for implementing payment.

5. The system of claim 1 for use with a package and for use with a scanning device of a consumer comprising:

a unique code on the package, the code being unique to any other codes on any other packages;

a contest server offering a prize based on the scanning of the unique code on the package;

an APP stored in a memory of the scanning device and configured for execution by the scanning device to scan the unique code on the package, the APP configured for communication with the contest server to link the consumer to the unique code, the APP configured for communication with social media to post a message linking the consumer and the package.

6. The system of claim 5 wherein a sponsor of the contest server has a social media site and wherein the consumer has a social media site and wherein the APP is configured for communication with the consumer's social media to post on the consumer's social media a message linking the consumer and the package and wherein the APP is configured for communication with the sponsor's social media to post a message on the sponsor's social media linking the consumer and the package.

7. The system of claim 6 for use a scanning device of a friend comprising a APP stored in a memory of the friend's scanning device and configured for execution by the friend's scanning device to scan the unique code on the package, the friend's APP configured for communication with the contest server to link the friend to the unique code, the friend's APP configured for communication with social media to post a message linking the friend and the package.

8. The system of claim 7 wherein contest server provides the prize based on one or more scans of the unique code by the consumer's scanning device and/or based on one or more scans of the unique code by the friend's scanning device.

9. The system of claim 8 wherein the friend has a social media site and wherein the friend's APP is configured for communication with the friend's social media to post a message linking the friend and the package and wherein the friend's APP is configured for communication with the sponsor's social media to post a message linking the friend and the package.

10. The system of claim 9 wherein the friend has a social media site and wherein the friend's APP is configured for communication with the consumer's social media to post a message linking the friend and the package.

11. The system of claim 1 further comprising the package handling device configured to receive the product packages and guide the product packages through the package handling device, each package including a peel-off label;

wherein the printer system printing one of a plurality of different, unique, individual scannable codes on each peel-off label as the packages are guided through the package handling device;

wherein each scannable code corresponds to order initiation information for ordering one or more packages which are the same as or similar to the package having the peel-off label; and wherein the peel-off label comprises:

a. a lower layer having a front side and a back side, the back side adapted to be adhered to the package;

b. a unique code on the front side of the lower layer;

c. an upper layer having a front side and a back side, the back side adapted to be removably adhered to the front side of the lower layer over the unique code;

d. an information code on the front side of the upper layer;

e. wherein the unique code when scanned by a scanning device is adapted to be linked to a user interface for re-ordering the product; and f. wherein the information code when scanned by a scanning device is adapted to be linked to information regarding the product.

12. The system of claim 11 wherein the unique code is linked to only one individual so that scanning the code by a scanning device of the one individual results in the one individual re-ordering the product.

13. The system of claim 12 wherein the unique code is linked to only one package so that scanning the code by a scanning device of the one individual results in the one individual obtaining a data record having specific information regarding the one package.

14. The system of claim 11 wherein the information code is a code which is hidden to a naked eye and linked to pricing information.

15. The system of claim 11 wherein the information code is an imperceptible code embedded into an image and/or text on the upper layer.

16. The system of claim 1 further comprising an ingredients system configured to track the ingredients of the product in each package after the package is filled, wherein each QR code indicates the ingredients of the product in each package as indicated by the ingredients system.

* * * * *